US007275079B2

(12) United States Patent
Brodsky et al.

(10) Patent No.: US 7,275,079 B2
(45) Date of Patent: *Sep. 25, 2007

(54) COMMON APPLICATION METAMODEL INCLUDING C/C++ METAMODEL

(75) Inventors: Stephen Andrew Brodsky, Los Gatos, CA (US); Shyh-Mei F. Ho, Cupertino, CA (US); James Rush Rhyne, II, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 654 days.

This patent is subject to a terminal disclaimer.

(21) Appl. No.: 09/849,107

(22) Filed: May 4, 2001

(65) Prior Publication Data

US 2002/0046294 A1 Apr. 18, 2002

Related U.S. Application Data

(60) Provisional application No. 60/223,671, filed on Aug. 8, 2000.

(51) Int. Cl.
*G06F 15/16* (2006.01)
*G06F 9/44* (2006.01)

(52) U.S. Cl. ............ 709/203; 709/218; 709/219; 709/229; 719/310; 719/315; 719/316; 719/319; 719/320

(58) Field of Classification Search ............... 707/102; 717/108; 709/246, 310, 203, 218, 219, 229; 713/201; 719/310, 315, 316, 319, 320
See application file for complete search history.

(56) References Cited

U.S. PATENT DOCUMENTS 6,094,688 A * 7/2000 Mellen-Garnett et al. ... 719/328

(Continued)

FOREIGN PATENT DOCUMENTS

| EP | 0474340 A2 | 3/1992 |
|---|---|---|
| JP | 09-160847 | 6/1997 |
| JP | 11-288403 | 10/1999 |
| JP | 11-296390 | 10/1999 |

OTHER PUBLICATIONS

James Martin, "Principles of Object-Oriented Analysis and Design", Oct. 29, 1992, Chapter 1-22.

(Continued)

*Primary Examiner*—Rupal Dharia
*Assistant Examiner*—Djenane M. Bayard
(74) *Attorney, Agent, or Firm*—Richard M. Goldman

(57) ABSTRACT

A method of and a system for processing an enterprise application request on an end user application and an application server. This is accomplished by initiating the application request on the end user application in a first language (such as a markup language) with a first application program (such as a Web browser), and transmitting the application request to the server and converting the application from the first language of the first end user application to a language running on the application server, processing the application request on the application server, and transmitting the response from the application server back to the end user application, and converting the response from the language running on the application server to the language of the end user application. The end user application and the application server have at least one connector between them, and the steps of (i) converting the application request from the language of the end user application (as a source language) to the language running on the application server (as a target language), and (ii) converting the response to the application request from the language running on the application server (as a source language) to the language of the end user application (as a target language), each include the steps of invoking connector metamodels of the respective source and target languages, populating the connector metamodels with metamodel data of each of the respective source and target languages, and converting the source language to the target language.

56 Claims, 32 Drawing Sheets

U.S. PATENT DOCUMENTS

| | | | |
|---|---|---|---|
| 6,105,064 A | | 8/2000 | Davis et al. |
| 6,134,559 A | * | 10/2000 | Brumme et al. ......... 707/103 R |
| 6,415,329 B1 | | 7/2002 | Gelman et al. |
| 6,480,860 B1 | * | 11/2002 | Monday ...................... 707/102 |
| 6,711,734 B1 | * | 3/2004 | Baisley ........................ 717/104 |
| 6,738,975 B1 | * | 5/2004 | Yee et al. .................... 719/310 |
| 2002/0112078 A1 | * | 8/2002 | Yach ........................... 709/246 |
| 2003/0191970 A1 | * | 10/2003 | Devine et al. .............. 713/201 |

OTHER PUBLICATIONS

"Quarterdeck Mosaic User Guide", 1995, Chapters 1-7.

ANONYMOUS, "The Common Object Request Broker: Architecture and Specification (2.3.1)", OMG, Oct. 1999, pp. 1-1-pp. 2-18, and pp. 5-9-pp. 5-11, Retrieved from the Internet: URL: http://www.omg.org/cgi-bin/apps/doc?formal/99-10-07.pdf.gz>.

Philippe Merle, "CorbaWeb: A Generic Object Navigator", Computer Networks and ISDN Systems, North Holland Publishing, Amsterdam, NL, vol. 28, No. 11, pp. 1269-1281, May 1996, ISSN: 0169-7552.

Supplementary European search report for application No. 01956109.1—2211 PCT/US0124280, dated Oct. 25, 2006, 3 pages.

Japanese Office Action for Japanese application 2002-517625 dated Jan. 10, 2006.

* cited by examiner

<<enumeration>>
TCommandType

- ClientBid : String
- ServerAvailable : String
- CBresynch : String
- SuspendProcessingForAllTpipes : String
- ResumeProcessingForAllTpipes : String
- SuspendInputForTpipe : String
- ResumeInputForTpipe : String
- SRVresynch : String
- REQresynch : String
- REPresynch : String
- TBresynch : String <<enumeration>>
TPrefixFlag

- StateData : String
- SecurityData : String
- UserData : String
- ApplicationData : String <<enumeration>>
TCommitConfirmationFlag

- Committed : String
- Aborted : String

<<enumeration>>
TChainFlag

- FirstInChain : String
- MiddleInChain : String
- LastInChain : String
- DiscardChain : String <<enumeration>>
TMessageType

- Data : String
- Transaction : String
- Response : String
- Command : String
- CommitConfirmation : String <<enumeration>>
TProcessingFlag

- SynchronizedTpipe : String
- AsynchronousOutput : String
- ErrorMessageFollows : String

| <<enumeration>><br>HLASMAddressType | <<enumeration>><br>HLASMCharacterType | <<enumeration>><br>HLASMFloatingPointRoundType | <<enumeration>><br>HLASMFloatingPointType | <<enumeration>><br>HLASMSizeType |
|---|---|---|---|---|
| addressValue<br>baseRegisterAndDisplacementValue<br>cumulativeExternalDummy<br>externalDummySectionOffset<br>externalSymbolAddress<br>lengthOfClassOrCumulativeExternalDummy<br>psectAddress | ASCII<br>DBCS<br>EBCDIC<br>mixedDBCS<br>unicode | addOneInFirstLostBitPosition<br>roundDown<br>roundUp<br>roundToZero<br>unbiasedNearest | binary<br>hexadecimal | bit<br>byte<br>halfword<br>fullword<br>doubleword<br>quad<br>twodoublewords |

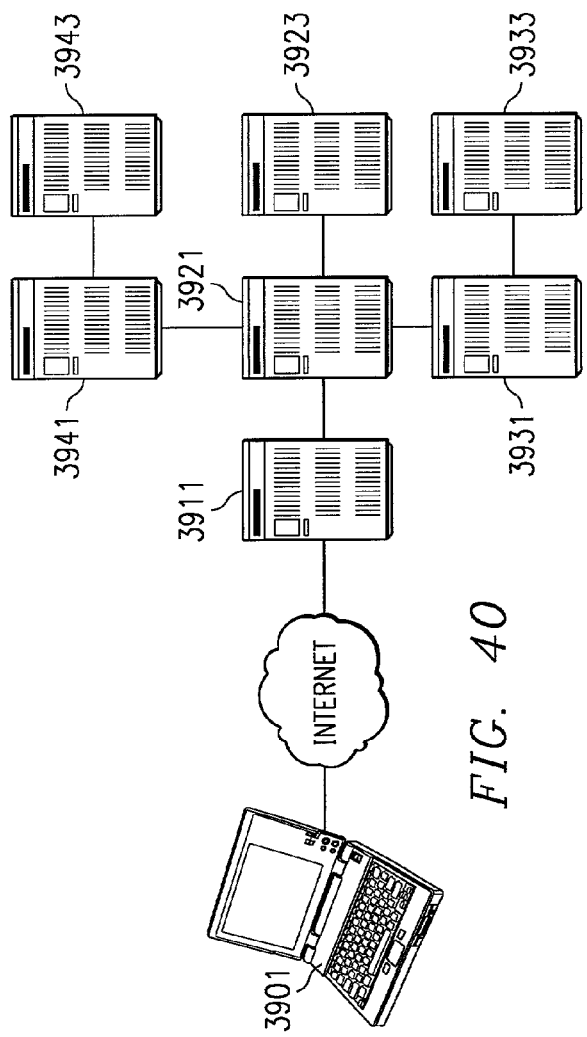

FIG. 40

| BMSMapset |
|---|
| base : String |
| color : BMSColorType |
| control : BMSControlType |
| cursorLocation : boolean |
| data : BMSDataType |
| descriptionAttributes : BMSMapAttributesType |
| extendedAttributes : BMSExtendedAttributesType |
| fieldSeparator : String |
| fold : BMSFoldType |
| highlighting : BMSHighlightingType |
| horizontalTabs : int |
| language : BMSLanguageType |
| logicalDeviceCode : int |
| mapAttributes : BMSMapAttributesType |
| mode : BMSModeType |
| outboardFormatting : boolean |
| outlining : BMSOutliningType |
| partition : String |
| programmedSymbol : String |
| shiftOutShiftIn : boolean |
| storage : boolean |
| suffix : String |
| terminal : String |
| tioaPrefix : boolean |
| transparent : boolean |
| trigraph : boolean |
| type : BMSMapsetType |
| validation : BMSValidationType |
| vericalTabs : int |

| BMSMap |
|---|
| column : String |
| color : BMSColorType |
| control : BMSControlType |
| cursorLocation : boolean |
| data : BMSDataType |
| descriptionAttributes : BMSMapAttributesType |
| extendedAttributes : BMSExtendedAttributesType |
| fields : boolean |
| fieldSeparator : String |
| header : boolean |
| highlighting : BMSHighlightingType |
| justify : BMSJustifyType |
| line : String |
| mapAttributes : BMSMapAttributesType |
| outboardFormatting : boolean |
| outlining : BMSOutliningType |
| partition : String |
| programmedSymbol : String |
| shiftOutShiftIn : boolean |
| size : BMSSizeType |
| terminal : String |
| tioaPrefix : boolean |
| trailer : boolean |
| transparent : boolean |
| validation : BMSValidationType |

| BMSField |
|---|
| attributes : BMSAttributesType |
| case : boolean |
| color : BMSColorType |
| group : String |
| highlighting : BMSHighlightingType |
| initialValue : String |
| justify : BMSJustifyType |
| length : int |
| occurs : int |
| outlining : BMSOutliningType |
| pictureInput : String |
| pictureOutput : String |
| position : BMSPositionType |
| programmedSymbol : String |
| shiftOutShiftIn : String |
| transparent : boolean |
| validation : BMSValidationType |

| BMSStatement |
|---|
| label : String |
| comments : String |

| <<enumeration>> BMSFoldType |
|---|
| lower |
| upper |

| <<enumeration>> BMSLanguageType |
|---|
| assembler |
| c |
| cobol |
| cobol2 |
| pli |

| <<enumeration>> BMSValidationType |
|---|
| mustFill |
| mustEnter |
| trigger |
| userExit |

| <<enumeration>> BMSExtendedAttributesType |
|---|
| no |
| yes |
| maponly |

| BMSJustifyType |
|---|
| left : boolean |
| right : boolean |
| first : boolean |
| last : boolean |
| bottom : boolean |

| BMSPositionType |
|---|
| line : int |
| column : int |
| number : int |

| BMSSizeType |
|---|
| line : int |
| column : int |

| <<enumeration>> BMSDataType |
|---|
| field |
| block |

| <<enumeration>> BMSHighlightingType |
|---|
| off |
| blink |
| reverse |
| underline |

| BMSOutliningType |
|---|
| box : boolean |
| left : boolean |
| right : boolean |
| over : boolean |
| under : boolean |

| <<enumeration>> BMSControlType |
|---|
| print |
| length |
| freekb |
| alarm |
| frset |

| <enumeration> BMSModeType |
|---|
| out |
| in |
| inout |

| <<enumeration>> BMSColorType |
|---|
| default |
| blue |
| red |
| green |
| pink |
| turquoise |
| yellow |
| neutral |

| <enumeration> BMSMapsetType |
|---|
| dsect |
| map |
| final |

| BMSAttributesType |
|---|
| skip : boolean |
| bright : boolean |
| detectable : boolean |
| dark : boolean |
| modified : boolean |
| cursor : boolean |
| normal : boolean |
| numeric : boolean |
| protected : boolean |

| BMSMapAttributesType |
|---|
| color : boolean |
| highlighting : boolean |
| outline : boolean |
| programmedSymbol : boolean |
| sosi : boolean |
| transparent : boolean |
| validaiton : boolean |

FIG. 39A

MFSDeviceField
attributes : MFSAttributeType
extendedAttributes : MFSExtendedAttributeType
length : int
pen : String
position : MFSPositionType
value : String

MFSFormatLibrary
name : String

MFSMessagePointer
name : String

MFSMessageField
attributes : boolean
exit : MFSExitType
extendedAttributes : int
fill : String
justify : MFSJustifyType
length : MFSLengthType
value : String

MFSExtendedAttributeType
color : MFSColorType
extendedGraphicCharacterSet : String
highlighting : MFSHighlightingType
mixed : boolean
outlining : MFSOutliningType
programmedSymbol : String
validation : MFSValidationType

MFSDeviceDivision
type : MFSDescriptorType
compression : MFSCompressionType

MFSDevicePage
cursor : MFSCursorType
fill : String
multiplePages : boolean

MFSSegment
exit : MFSExitType
graphic : boolean

MFSExitType
number : int
vector : int

MFSDeviceType
card : String
dsca : String
features : MFSFeatureType
page : MFSPageType
pen : String
pk : MFSFunctionKeyType
substitution : String
type : String
width : int

MFSLogicalPage
condition : MFSConditionType
promptValue : String

MFSCursorType
row : int
column : int
fieldName : String

MFSConditionType
leftOperand : String
rightOperand : String
operator : MFSOperatorType

MFSStatement
label : String
comments : String

MFSIfCondition
condition : MFSConditionType
action : String

MFSMessageDescriptor
fill : String
ignoreSource : boolean
option : int
paging : boolean
type : MFSDescriptorType

MFSAttributeType
attributeBytes : boolean
detectable : MFSDetectabilityType
intensity : MFSIntensityType
modified : boolean
numeric : boolean
protected : boolean
strip : boolean

FIG. 39B

MFSPositionType
- row : int
- column : int
- physicalPage : int

MFSLengthType
- length : int
- firstByte : int

MFSPageType
- number : int
- formatting : MFSPageFormattingType

<<enumeration>> MFSIntensityType
- normal
- high
- nondisplayable

<<enumeration>> MFSHighlightingType
- default
- blink
- reversevideo
- underline

<<enumeration>> MFSDetectabilityType
- deferred
- immediate
- nondetectable

<<enumeration>> MFSValidationType
- default
- fill
- field
- both

MFSOutliningType
- box : boolean
- right : boolean
- left : boolean
- under : boolean
- over : boolean
- value : String

MFSFunctionKeyType
- fieldName : String

MFSFunctionKeyValueType
- index : int
- function : String

<<enumeration>> MFSDescriptorType
- input
- output
- inout

<<enumeration>> MFSPageFormattingType
- defined
- space
- float

MFSFeatureType
- card : boolean
- dataEntryKeyboard : boolean
- funtionKeys : boolean
- group : int
- ignore : boolean
- pen : boolean

<<enumeration>> MFSColorType
- blue
- red
- green
- pink
- turquoise
- yellow
- default
- neutral

<<enumeration>> MFSCompressionType
- fixed
- short
- all

<<enumeration>> MFSOperatorType
- equal
- notEqual
- greaterThan
- greaterThanOrEqual
- lessThan
- lessThanOrEqual

<<enumeration>> MFSJustifyType
- left
- right

# COMMON APPLICATION METAMODEL INCLUDING C/C++ METAMODEL

CROSS REFERENCE TO RELATED APPLICATIONS

This application claims the benefit under Title 35, United States Code, Sections 111(b) and 119(e), relating Provisional Patent Applications, of the filing date of U.S. Provisional Patent Application Ser. No. 60/223,671 filed Aug. 8, 2000 of Steven A. Brodsky and Shyh-Mei Ho for EAI Common Application Metamodel.

This application is also related to the following U.S. Patent Applications, filed on even date herewith:
  COBOL METAMODEL by Shyh-Mei Ho, Nick Tindall, James Rhyne, Tony Tsai, Peter Elderon, and Shahaf Abileah.
  PL/I METAMODEL by Shyh-Mei Ho, Peter Elderon, Eugene Dongm and Tony Tsai.
  HIGH LEVEL ASSEMBLER METAMODEL by Shyh-Mei Ho, John Ehrman, Benjamin Sheats, and Jenny Hung.
  TYPE DESCRIPTOR METAMODEL by Shyh-Mei Ho, James Rhyne, Peter Elderon, Nick Tindall, and Tony Tsai.
  IMS TRANSACTION MESSAGES METAMODEL by Shyh-Mei Ho and Shahaf Abileah.
  IMS-MFS (MESSAGE FORMAT SERVICE) METAMODEL by Shy-Mei Ho, Benjamin Sheats, Elvis Halcrombe, and Chenhuei J. Chiang.
  CICS-BMS (BASIC MESSAGE SERVICE) METAMODEL by Shyh-Mei Ho, Andy Krasun, and Benjamin Sheats

FIELD OF THE INVENTION

The invention relates to exchanging instructions and/or data between applications to signal readiness to transfer, exchange, or process data, or to establish at least one or more parameters for transferring data between the applications, and controlling the parameters in order to facilitate data transfer and communication. The invention further relates to integrating dissimilar applications one executing within one platform and another executing in another platform, e.g., multiple computers, multiple operating systems, multiple application components, multiple development environments, multiple deployment environments, or multiple testing and processing, establishing a dialog (e.g., a negotiation) with one another in order to establish connectivity for transferring data and/or instructions between the applications so as to facilitate performing tasks on the data or portions thereof to accomplish an overall goal. The parameters may include one or more of format, data types, data structures, or commands.

BACKGROUND

The growth of e-business has created a significant need to integrate legacy applications and bring them to the Internet This is because the current trend for new applications is to embrace Web standards that simplify end user application construction and scalability. Moreover, as new applications are created, it is crucial to seamlessly integrate them with existing systems while facilitating the introduction of new business processes and paradigms.

Integrating new applications with existing applications is especially critical since industry analysts estimate that more than seventy percent of corporate data, including data highly relevant to e-commerce, lives on mainframe computers. Moreover, while many e-commerce transactions are initiated on Windows, Mac, and Linux end user platforms, using a variety of Web browsers, and go through Windows NT and Unix servers, they are ultimately completed on mainframe computers, running mainframe applications, and impacting data stored in mainframe databases.

There are e-business pressures to integrate server level applications and bring them to the Internet. However, there is no complete and easy mechanism to integrate or e-business enable the applications. Integration, whether through messaging, procedure calls, or database queries, is key to solving many of today's business problems.

Integrating legacy applications with new software is a difficult and expensive task due, in large part, to the need to customize each connection that ties together two disparate applications. There is no single mechanism to describe how one application may allow itself to be invoked by another.

One consequence is an e-commerce environment of multiple applications, developed by multiple development teams, running on different platforms, with different data types, data structures, commands, and command syntax's. This environment is stitched together with application program interfaces and connectors. Connectors are an essential part of the total application framework for e-commerce. Connectors match interface requirements of disparate applications and map between disparate interfaces.

This growing interconnection of old and new software systems and applications, has led to various middle ware applications and connector applications, interface specifications, interface definitions, and code, especially for the interconnection and interaction of markup languages (such as HTML, XML, Dynamic HTML, WML, and the like), through object oriented languages such as SmallTalk and C++, with languages of legacy application server applications (such as COBOL). These interface specifications, definitions, and code should apply across languages, tools, applications, operating systems, and networks so that an end user experiences the look, feel, and responses of a single, seamless application at her terminal. Instead, the proliferation of standards, protocols, specifications, definitions, and code, e.g., Common Object Request Broker (CORBA), Common Object Model (COM), Object Linking and Embedding (OLE), SOM, ORB Plus, Object Broker, Orbix, has instead created an e-commerce "Tower of Babel."

Examples of application integration are ubiquitous: from installing an ERP system, to updating an Operational Data Store (ODS) with IMS transactions or invoking CRM systems from MQSeries; each of these requires the same basic steps. First, a user must find the entity she wants to communicate with, then she must figure out how to invoke the entity, and finally she must provide translation from one native representation to another. Today, these steps usually require manual investigation and hand coding-and leave the developers with a rat's-nest of hard-to-maintain connections between applications.

Attempts to remedy this situation involve application program interfaces and connectors, which are frequently built on Interface Definition Languages. Interface Definition Languages are declarative, defining application program interfaces, and, in some cases, issues such as error handling. Most Interface Definition Languages are a subset of C++, and specify a component's attributes, the parent classes that it inherits from, the exceptions that it raises, the typed events that it emits, the methods its interface supports, input and output parameters, and data types. The goal of Interface`

Definition Languages within connectors is to enable collaboration between dissimilar applications without hard coded application program interfaces.

Ideally, the interface definition language, and the connector of which it is a part, should facilitate full run-time software application collaboration through such features as Method invocation with strong type checking, Run-time method invocation with greater flexibility and run time binding, High level language binding, with the interface separated from the implementation.

An interface repository containing real time information of server functions and parameters.

Additionally, the connector and its interface definition language, should be fast, efficient, scalable, portable, support metaclasses, support syntactic level extensions, and support semantic level extensions.

SUMMARY OF THE INVENTION

The problems associated with integrating new applications, for example, e-commerce applications, with legacy applications are obviated by the Common Application Metamodel tool, method, and system described herein. The Common Application Metamodel method, tool, and system of the invention facilitate tooling solutions, data translation, and communication and collaboration between dissimilar and disparate applications, as well as full run-time software application collaboration through an interface with the application server interface domain. This is accomplished through metadata interchange information, method invocation with strong type checking, run-time method invocation, run time binding, and high level language binding, with the interface separated from the implementation, and an interface repository containing real time information of client and server interface parameters.

Additionally, the tool, method, and system of the invention provide fast, efficient, and scalable interconnectivity independently of any tool or middleware, are reusable and portable, and support metaclasses, syntactic level extensions, and semantic level extensions, and are independent of any particular tool or middleware.

The Common Application Metamodel tool, method, and system is especially useful for providing a data transformer that is bi-directional between a client application and a server application, transmitting commands and data both ways between, for example, a Java, HTML, XML, C, or C++ application and a COBOL, PL/I, or High Level Assembler application, or, between an HTML or XML application and a Java, C, or C++ application, or between a Java application and a C or C++ application.

One embodiment of the invention is a method of processing a application request on or between an end user application and one or more application servers. The method comprises the steps of initiating the application request on the end user application in a first language with a first application program, transmitting the application request to the server, and converting the application request from the first language of the first end user application to a language running on the application server. Typically, as described above, the client will be a thin client or a Web browser, the application running on the client will be a Web browser application or a thin client connectivity application, and the language of the client application will be Java, C, C++, or a markup language, as HTML or a derivative of HTML, such as XML or Dynamic HTML or WML, or the like, and the language running on the server may be COBOL, PL/I, HLASM (High Level Assembler) or the like. The invention facilitates transformers which convert the application request from the first language of the end user application to a language running on the application server. After conversion, the converted application request is processed on the application server.

The application processes the request and then sends the response from the application server back to the end user application. Typically, as described above, the application server will be running a COBOL based application, and the client will be a thin client written in Java or C or C++, or a Web browser, running a Web browser application or a thin client connectivity application, in a markup language, as HTML or a derivative of HTML, such as XML or Dynamic HTML, or the like. The invention provides data transformers which convert the response from the language or languages running on the application server or servers to the first language of the first end user application.

The end user application and the application server have at least one data transformer between them. In this way, the steps of (i) converting the request from the first language of the first end user application as a source language to the language running on an application server as a target language, and (ii) converting the response from the language running on the application server, as a subsequent source language, back to the first language of the first end user application, as a subsequent target language, each comprise the steps of invoking type descriptor and language metamodels of respective source and target languages, populating the metamodels with each of the respective source and target languages' data items and types, and converting the source language to the target language.

The end user application is, frequently, a web browser or a thin client. When the end user application is a Web browser, the end user is connected to the application server through a web server. According to a further embodiment of the invention, the web server may comprise the connector, or data transformer. The data transformer integrated with the Web server may directly convert the request, application request, or message from a browser oriented form to an application server language or to an intermediate, business or commerce oriented markup language, such as XML.

The CAM metamodel used to construct the converter comprises an invocation metamodel, an application domain interface metamodel, a language metamodel, and a type descriptor metamodel. Exemplary invocation metamodel includes information chosen from the group consisting of message control information, security data, transactional semantics, trace and debug information, pre-condition and post-condition resources, and user data, etc. Exemplary application domain interface metamodel comprises information chosen from input parameter signatures, output parameter signatures, and return types. Application domain interface metamodel uses one or more language metamodels, such as COBOL and PL/I metamodels.

The type descriptor metamodel defines physical realizations, storage mapping, data types, data structures, and realization constraints.

The method of the invention is applicable to situations where one of the source or target languages is object oriented, and the other of the target or source languages is not object oriented. In this situation, the language metamodel and the type descriptor metamodel together map encapsulated objects of the object oriented language into code and data of the language that is not object oriented. Additionally, the language metamodel and the type descriptor metamodel maps object inheritances of the object oriented language into references and pointers in the language that is not object oriented. The method of the invention is also applicable to situations where different object oriented languages are running on different platforms, and encapsulated objects of the source language (code and data) are mapped into encapsulated objects of the target language. The method of the invention is also applicable where different procedural languages are running on different platforms or applications and commands and data of the source procedural language are mapped into the target procedural language.

According to the method of the invention, there may be a plurality of applications for vertical (sequential, conditional, or dependent) processing, for horizontal (parallel in time) processing, or both horizontal and vertical processing. This is to support rich transactions to and through multiple hierarchical levels and multiple parallel sequences of processing. This may be the case in business to business transactions drawing upon financial, manufacturing, scheduling, supply, and shipping databases and servers, and utilizing various commercial security instruments.

A further aspect of the invention is a client-server processing system having a client, a server, and at least one transformer between the client and one or more servers, A still further aspect of the invention is a processing system configured and controlled to interact with a client application. In this aspect of the invention, the system comprises, a server, and at least one transformer between the server and the client application, where the client has an end user application, and is controlled and configured to initiate a request with the server in a first language with a first application program and to transmit the request through a transformer to the server or servers. The server processes the request in a second software application, using a second language, and returns a response to the client through a transformer.

A further aspect of the invention is a groupware system having a plurality of e-mail enabled end user applications, such as e-mail, word processing, spreadsheet, simple database management (such as Lotus Approach or Microsoft Access), graphics and graphics editing, audio and audio editing, and computer-telephony integration ("CTI"), along with client level content database client services and content replication client services. Groupware integrates these e-mail enabled applications through one or more transformers and application program interfaces with transport services, directory services, and storage services, including content servers and replication servers. The groupware system is configured and controlled to communicate among disparate end user applications, among disparate servers, and between disparate servers and end user applications. The groupware system comprises at least one transformer between a server and an end user application. The end user application is controlled and configured to participate with a server in a first language of a first application program and the server is configured and controlled to participate with the client in a second language of a second program.

The transformer is configured and controlled to receive a request from the end user application, and convert the request from the first language of the first end user application to a language running on the server. The server is configured and controlled to receive the converted request from the transformer and process the request in a second language with a second application program residing on the server, and to thereafter transmit a response through a transformer back to the end user application.

A still further embodiment of the invention is the provision of rich transaction processing. Rich transactions are nested transactions that span to, through, and/or across multiple servers. The spanning across nested servers may be horizontal, that is parallel dependent transactions, or vertical, that is, serial dependent transactions. Rich transactions may be long lived, on-going transactions, or complex business-to-business transactions, especially those with multiple dependencies or contingencies, volume and prompt payment discounts, late delivery and late payment penalties, and with financial processing, such as electronic letters of credit, electronic bills of lading, electronic payment guarantees, electronic payment, escrow, security interests in the goods, and the like. In a rich transaction environment, some transaction servers may be positioned as clients with respect to other transactions for certain sub transactions making up the rich transaction.

A still further embodiment of the invention is a tool, that is, a software developer's kit, characterized in that the program product is a storage medium (as a tape, floppy disks, a CD-ROM, or a hard drive or hard drives on one of more computers) having invocation metamodels, application domain interface metamodels, and language metamodels, and computer instructions for building a metamodel repository of source and target language metamodels. The program product also contains computer instructions for building connector stubs from the metamodels. The program product further carries computer instructions to build a transformer.

While the invention has been described in summary form as having a single level of connectors, it is, of course, to be understood that such connectors may be present at various levels in the processing hierarchy, for example between Web Clients and Web servers, between web servers and application servers, between application servers and database servers, and between application servers or database servers or both and various specialized repositories.

It is also to be understood, that while the invention has been summarized in terms of individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

THE FIGURES

Various elements of the invention are illustrated in the FIGURES appended hereto.

Figure 5:
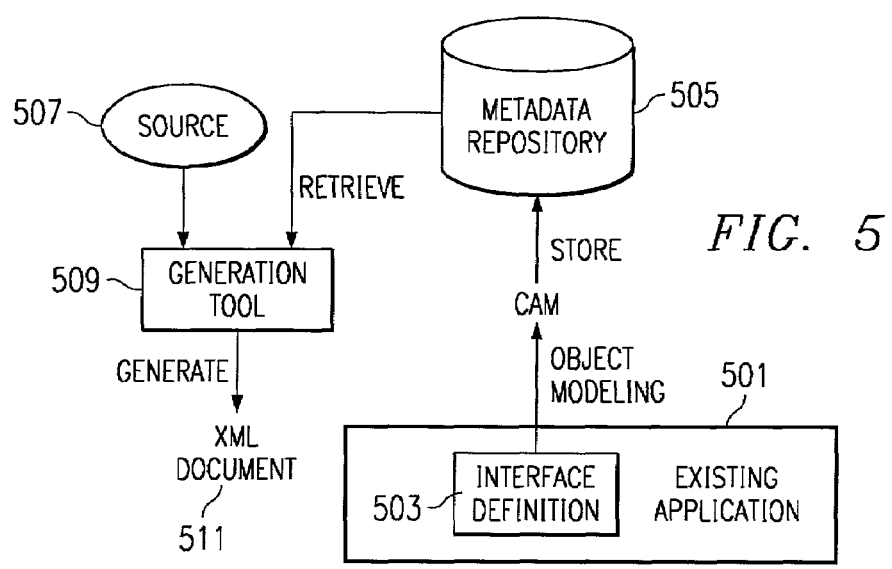

FIG. 5 illustrates how a tool can be used to generate an XML document describing application program interface. First, an object model, i.e., a CAM metamodel, is created to capture interface definitions about an application server. Then a tool reads and parses the source definitions of an application program and generates an XML document by retrieving the object model's information from a repository.

Figure 6:
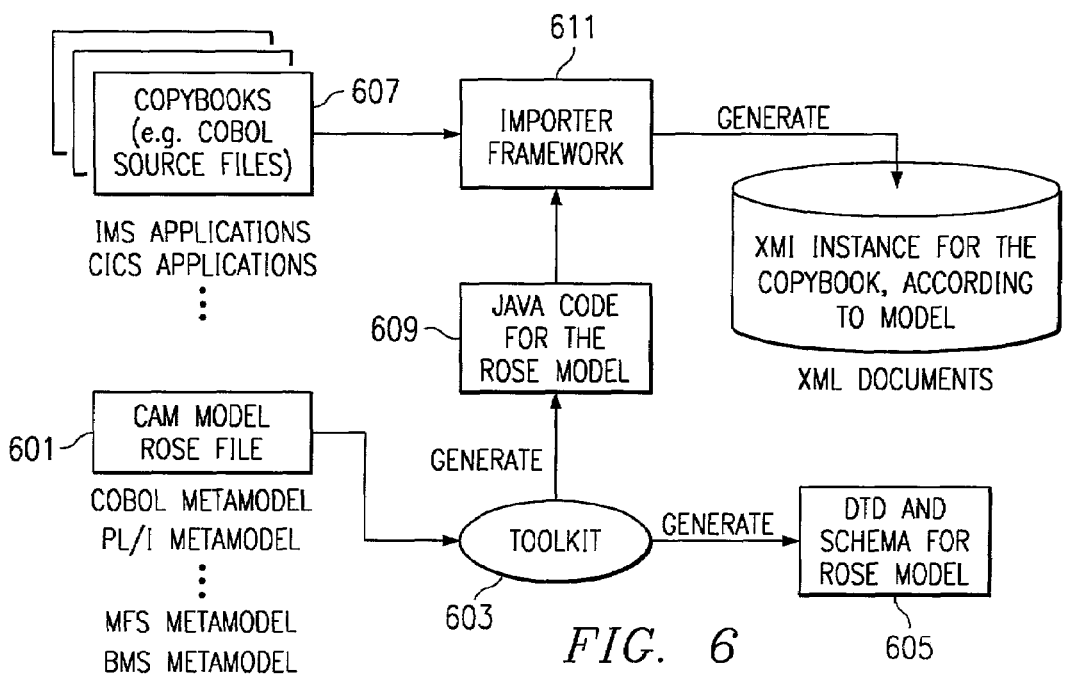

FIG. 6 illustrates a development phase scenario where a Common Application Metamodel Rose file, e.g., a COBOL metamodel, a PL/I metamodel, an MFS metamodel, a BMS model, or the like is read into a toolkit, to generate a DTD and XML schema and Java code for a Rose model. A source file of an application, as a COBOL source file, a PL/I source file, an MFS source file, a BMS source file, or the like, is read into an importer. The importer parses the source code and generates, as output, an XMI instance file, i.e., XML documents, by reading in the Java code of the Rose model of the application source files.

Figure 7:
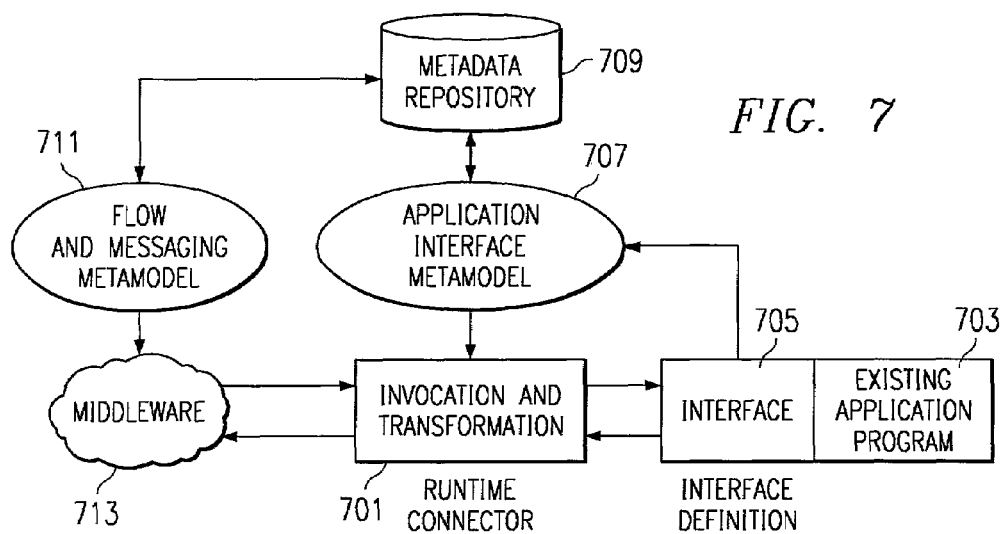

FIG. 7 illustrates a metamodel for application interfaces, which enables integration of application components into an event based messaging model, including flow models. The flow and messaging middle invokes applications through the application interface. These interfaces are access points to the applications through which all input and output is connected to the middleware. The interfaces are described in terms of the Application Interface Metamodels. Transformation processing according to he metamodel could take place in source/client applications, target applications, or a gateway.

Figure 8:
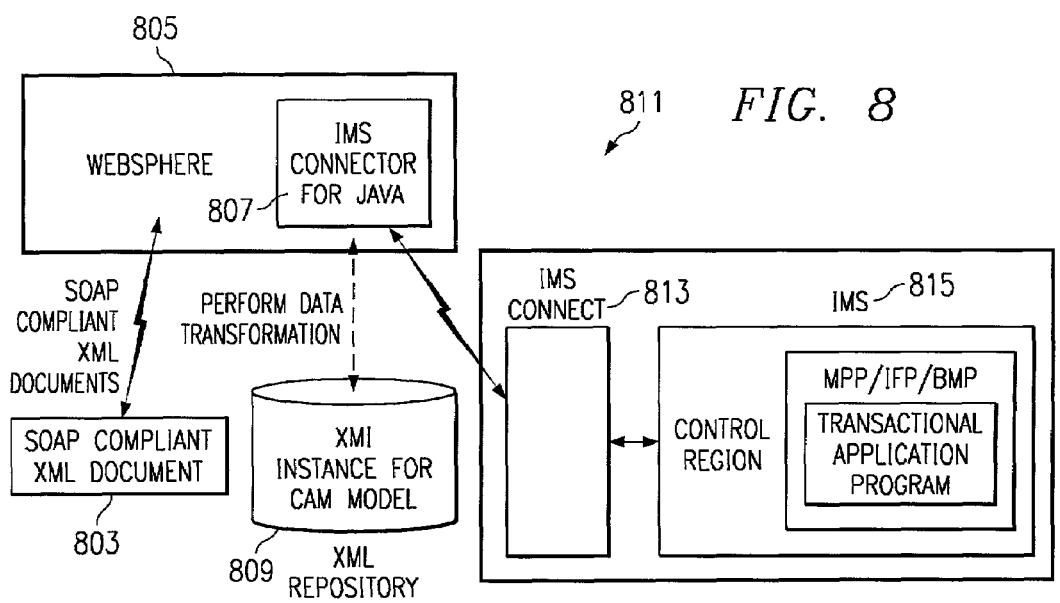

FIG. 8 illustrates the application of the Common Application Metamodel during execution time. As shown, the CAM model facilitates connectivity between a back-end IMS application and a Web file (e.g., SOAP complaint XML documents). This is accomplished by using information captured in the model to perform data transformations from one platform to another in a mixed language environment shown.

Figure 9:
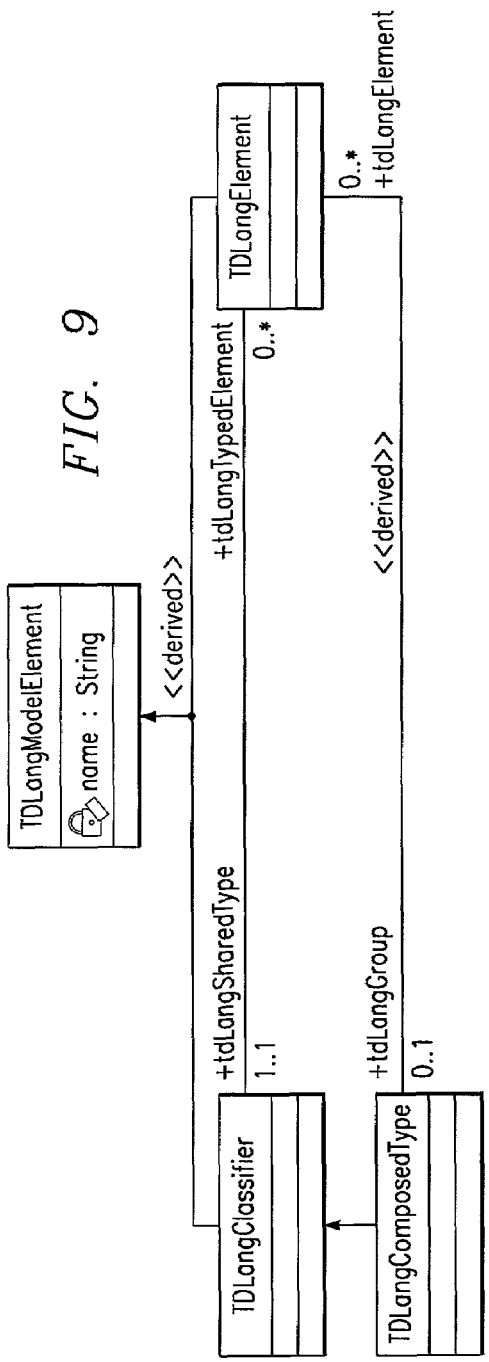

FIG. 9 illustrates TDLang base classes, where the Type Descriptor metamodel is used as a recipe or template for runtime data transformation, with the language specific metamodel for overall data structures and field names, and without duplicating the aggregation associations present in the language model.

Figure 10A:
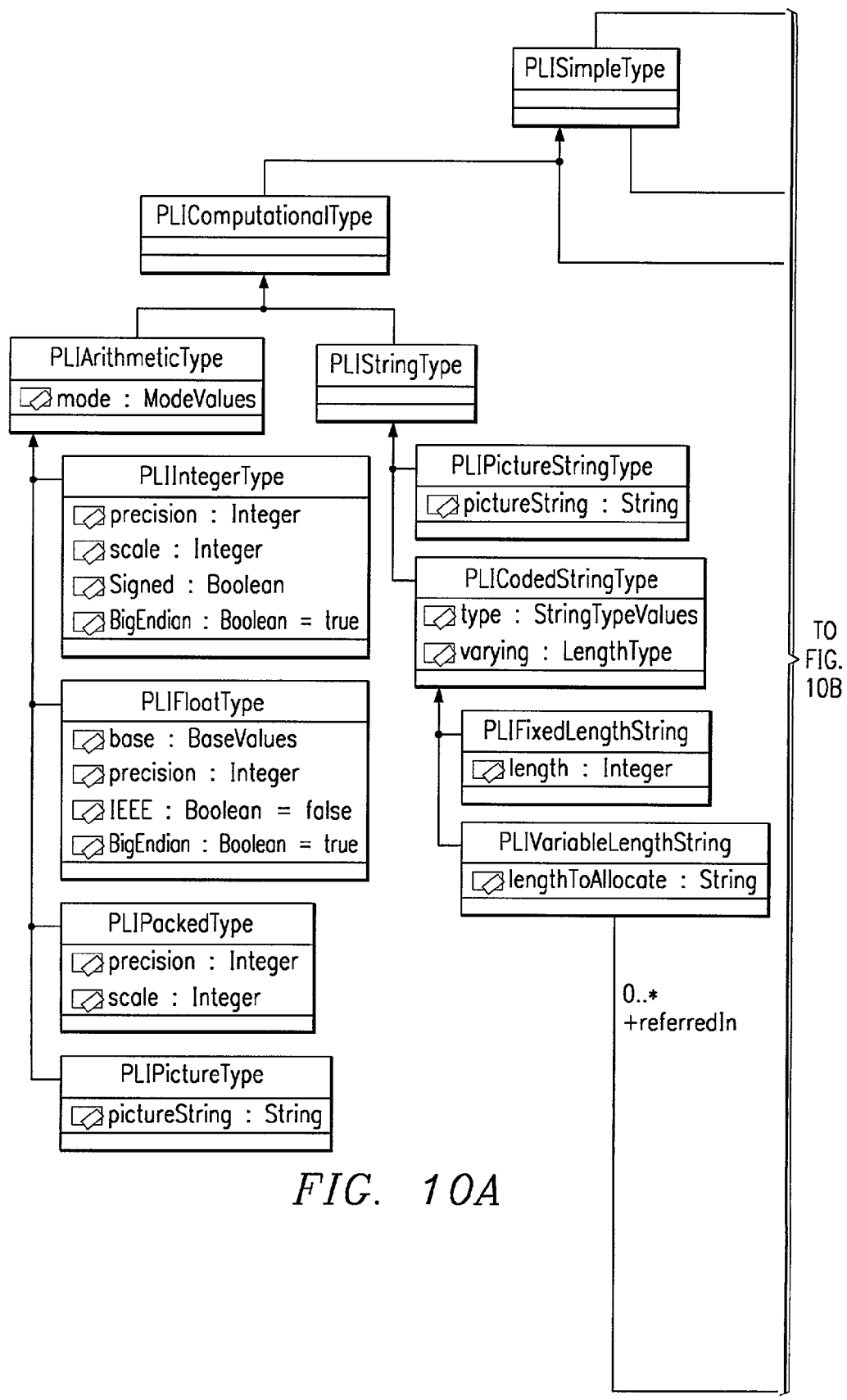
Figure 10B:
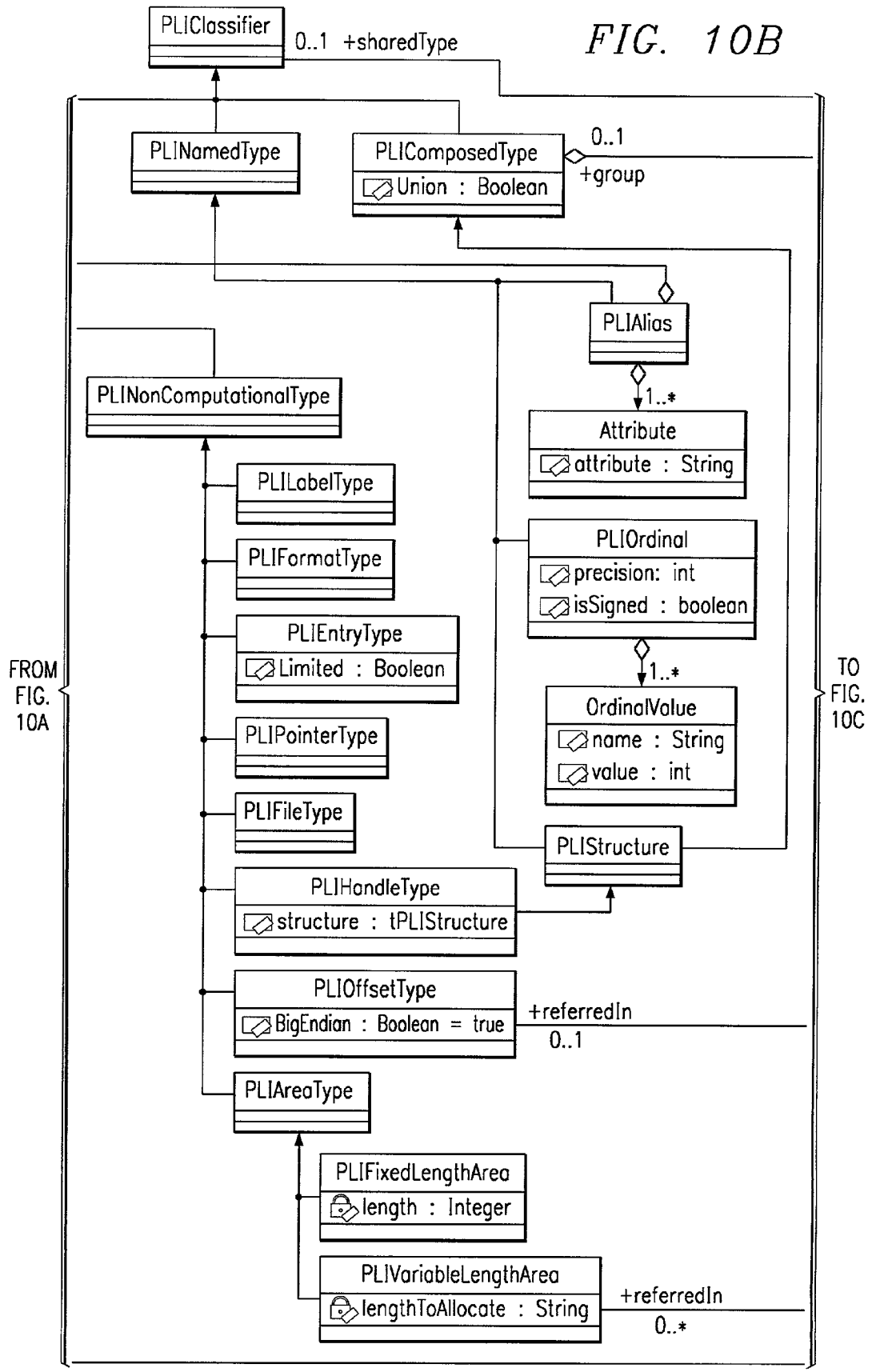
Figure 10C:
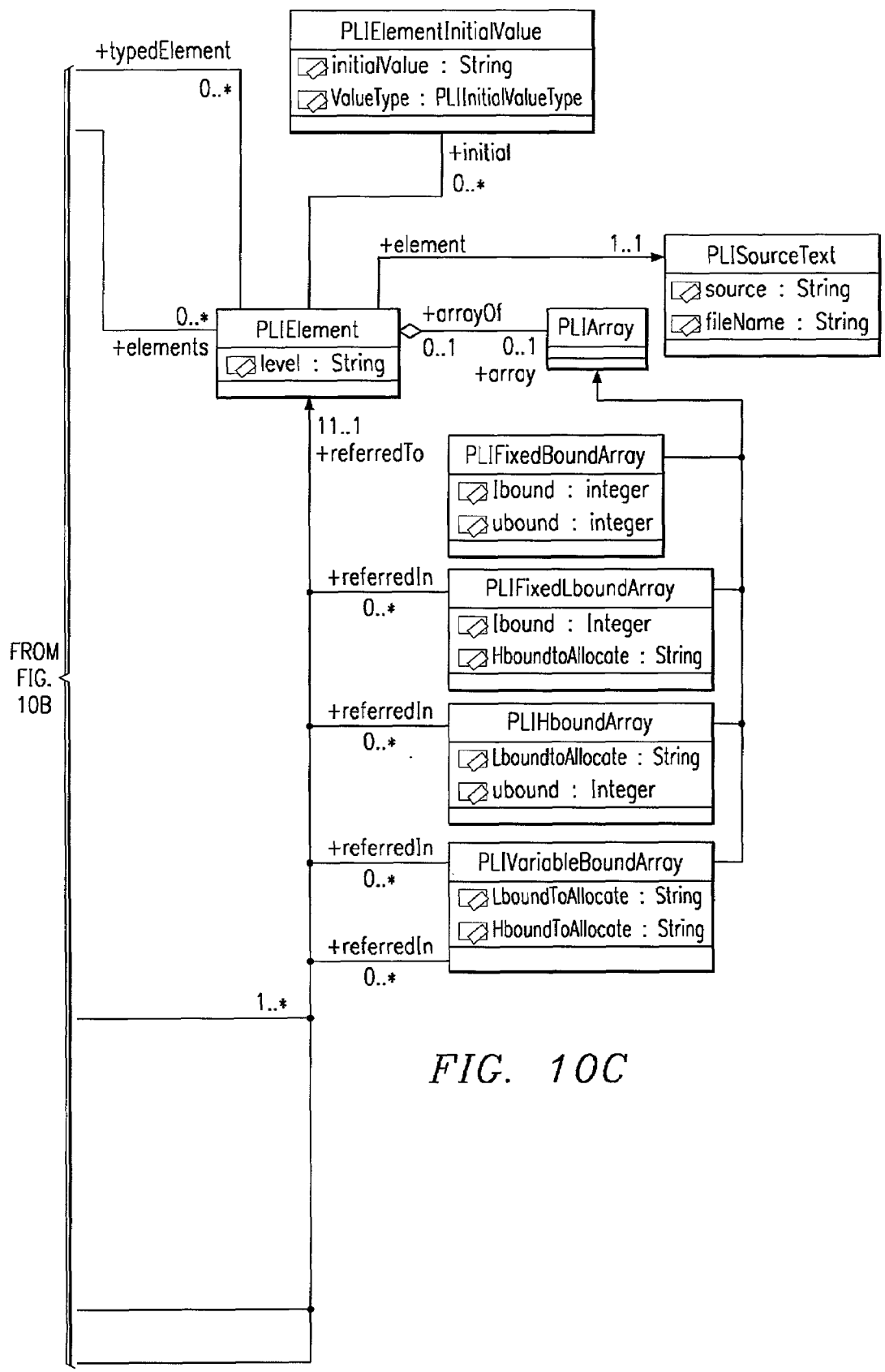

FIG. 10 illustrates an MOF class instance at the M2 level as a Type Descriptor Metamodel.

Figure 11:
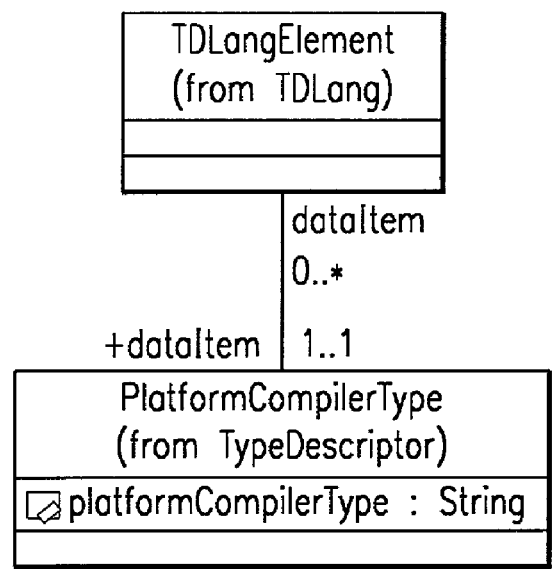

FIG. 11 illustrates the association between a TDLangElement of the TDLang Metamodel with a Platform Compiler Type of the Type Descriptor Metamodel.

Figure 12:
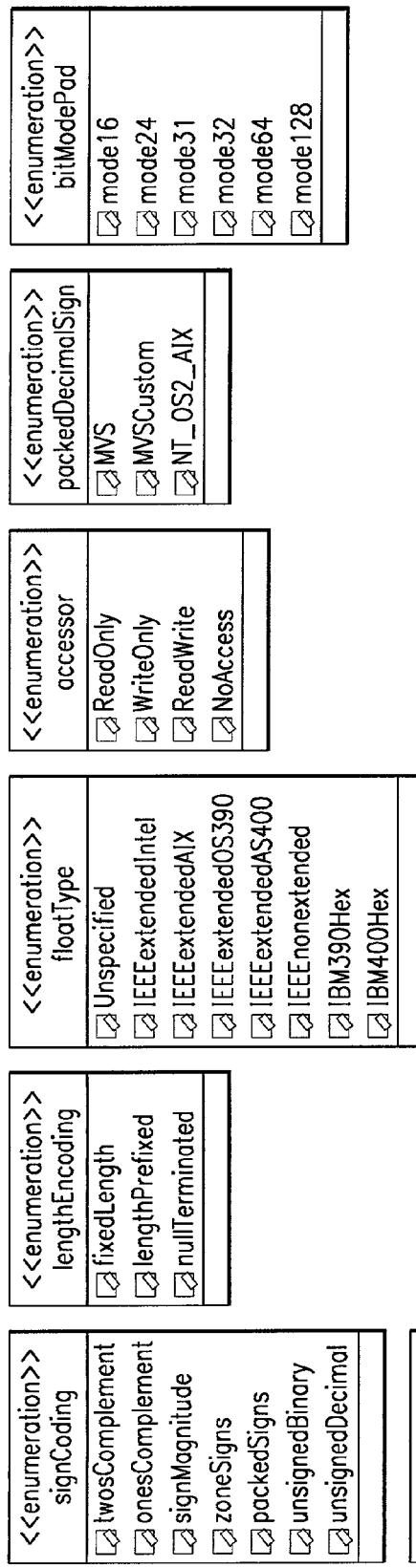

FIG. 12 illustrates various enumeration types for the Type Descriptor Metamodel, e.g., sign coding, length encoding, floating type, accessor, packed decimal sign, and bitModelPad.

Figure 13A:
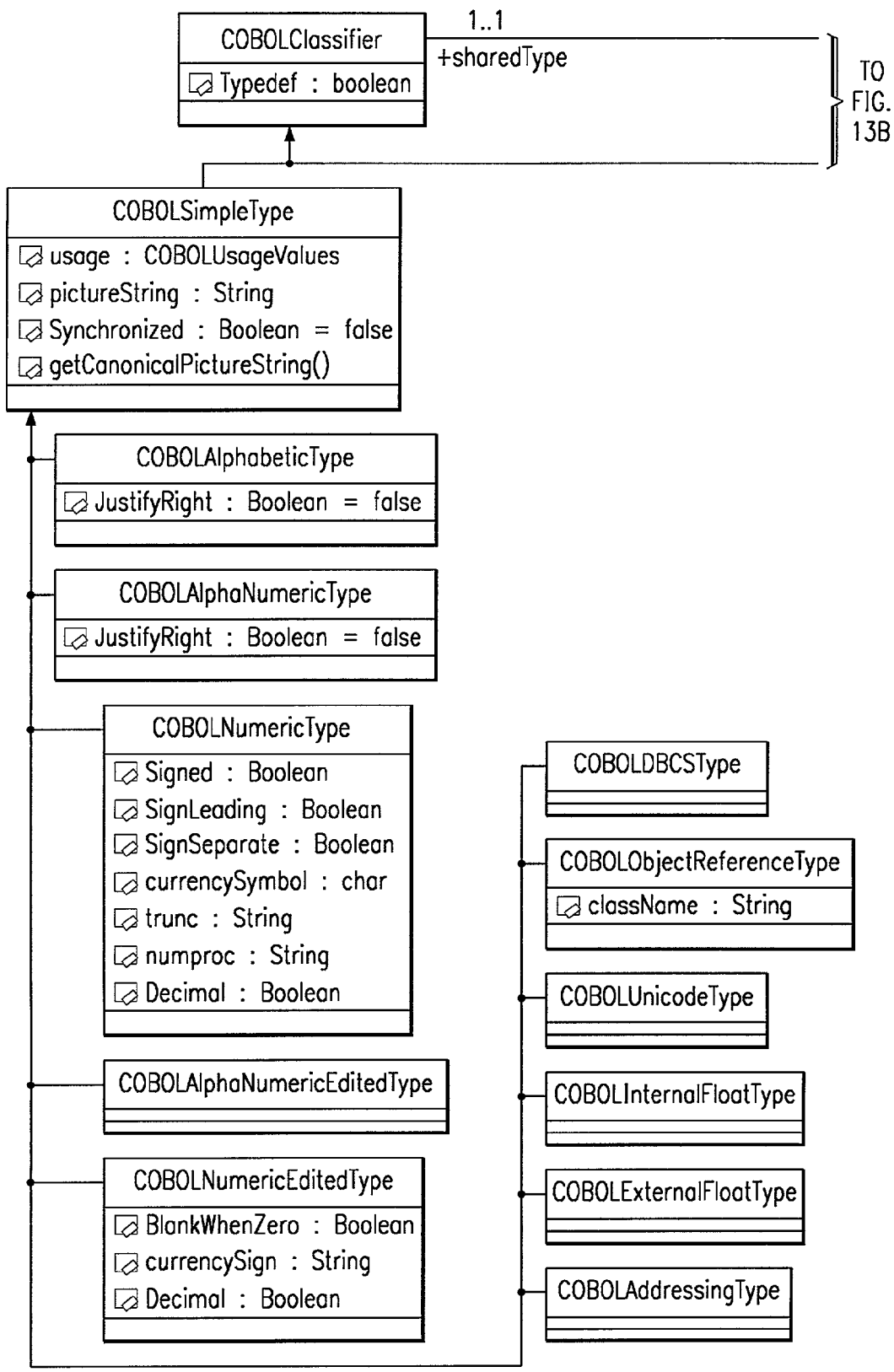
Figure 13B:
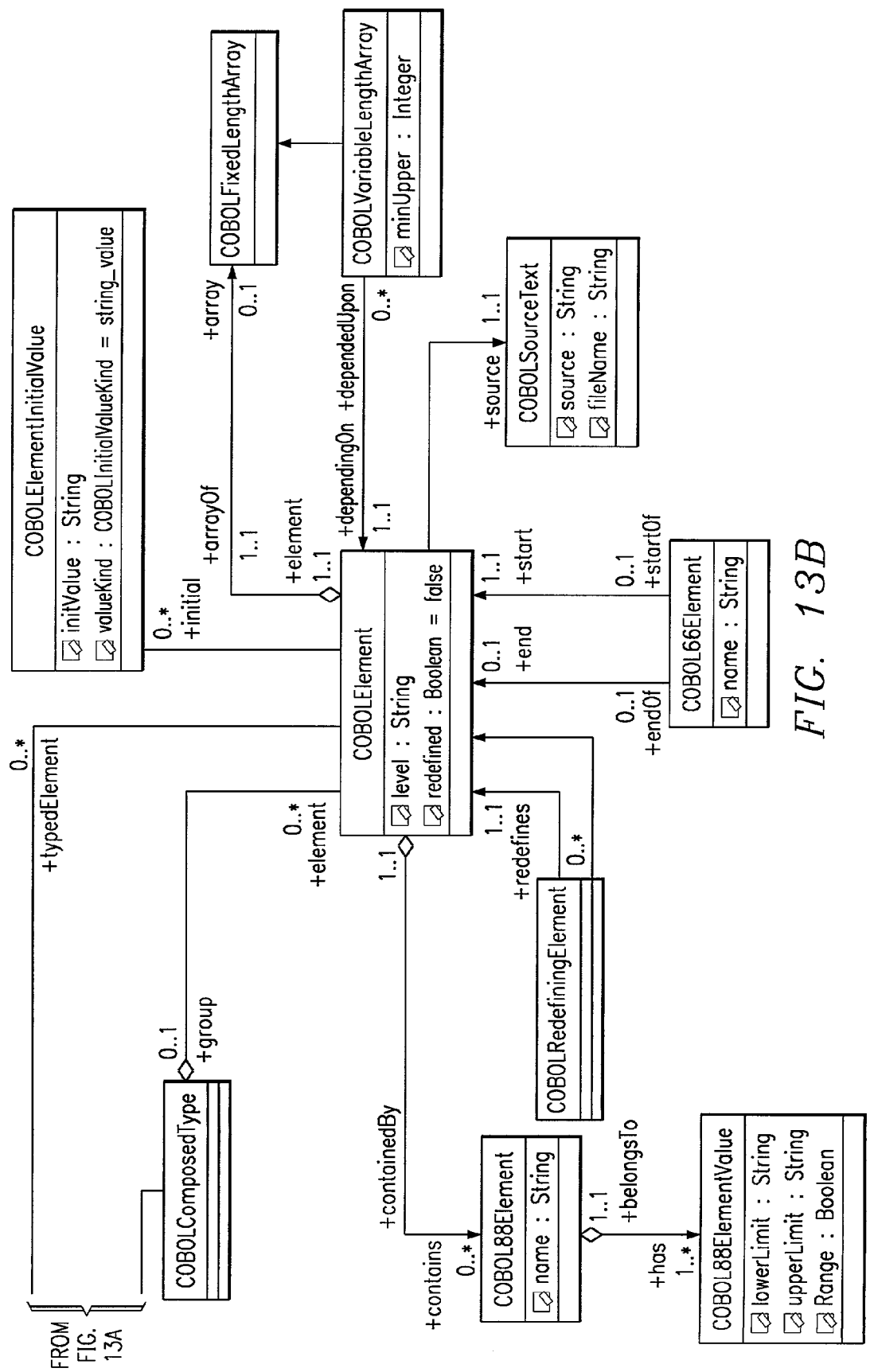

FIG. 13 illustrates a COBOL metamodel to define data structure semantics which represent connector interfaces. This metamodel is also a MOF Class instance at the M2 level.

Figure 14:
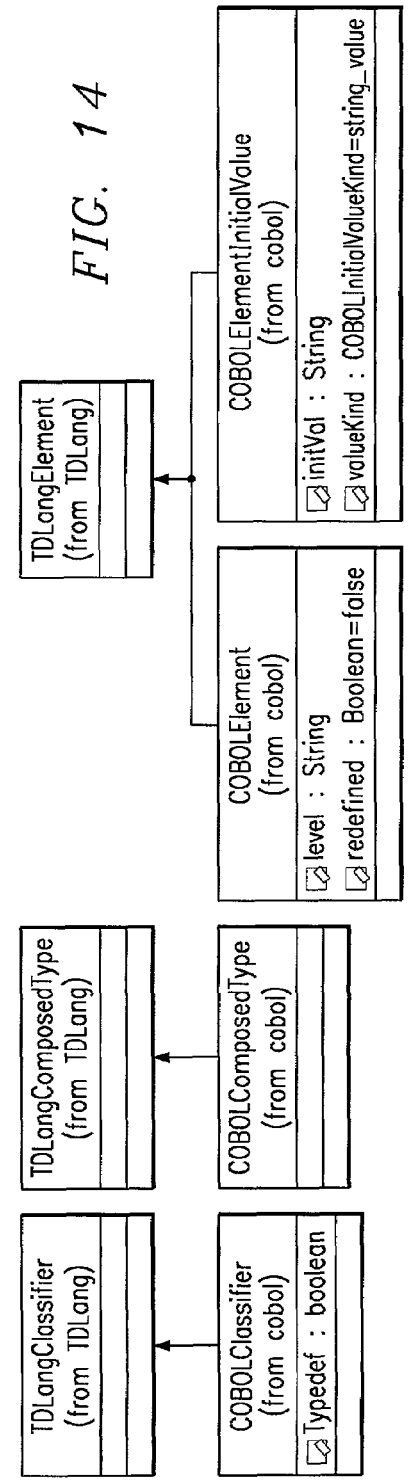

FIG. 14 illustrates the associations between the COBOL metamodel with the TDLang base classes which are the TDLangClassifier, the TDLanguageComposedType, and the TDLangElement.

Figure 15:
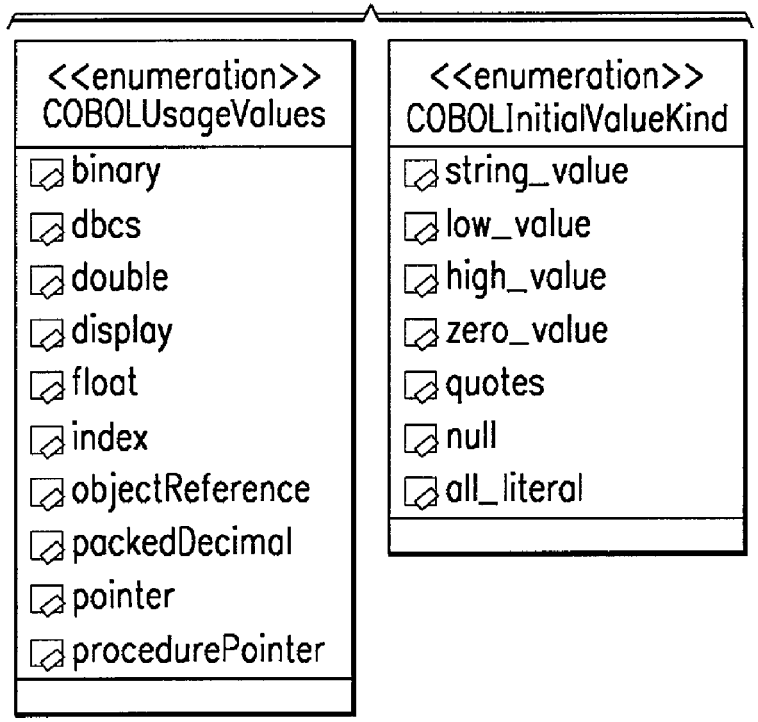

FIG. 15 illustrates an enumeration of the COBOL usage values in the COBOL Metamodel.

Figure 16A:
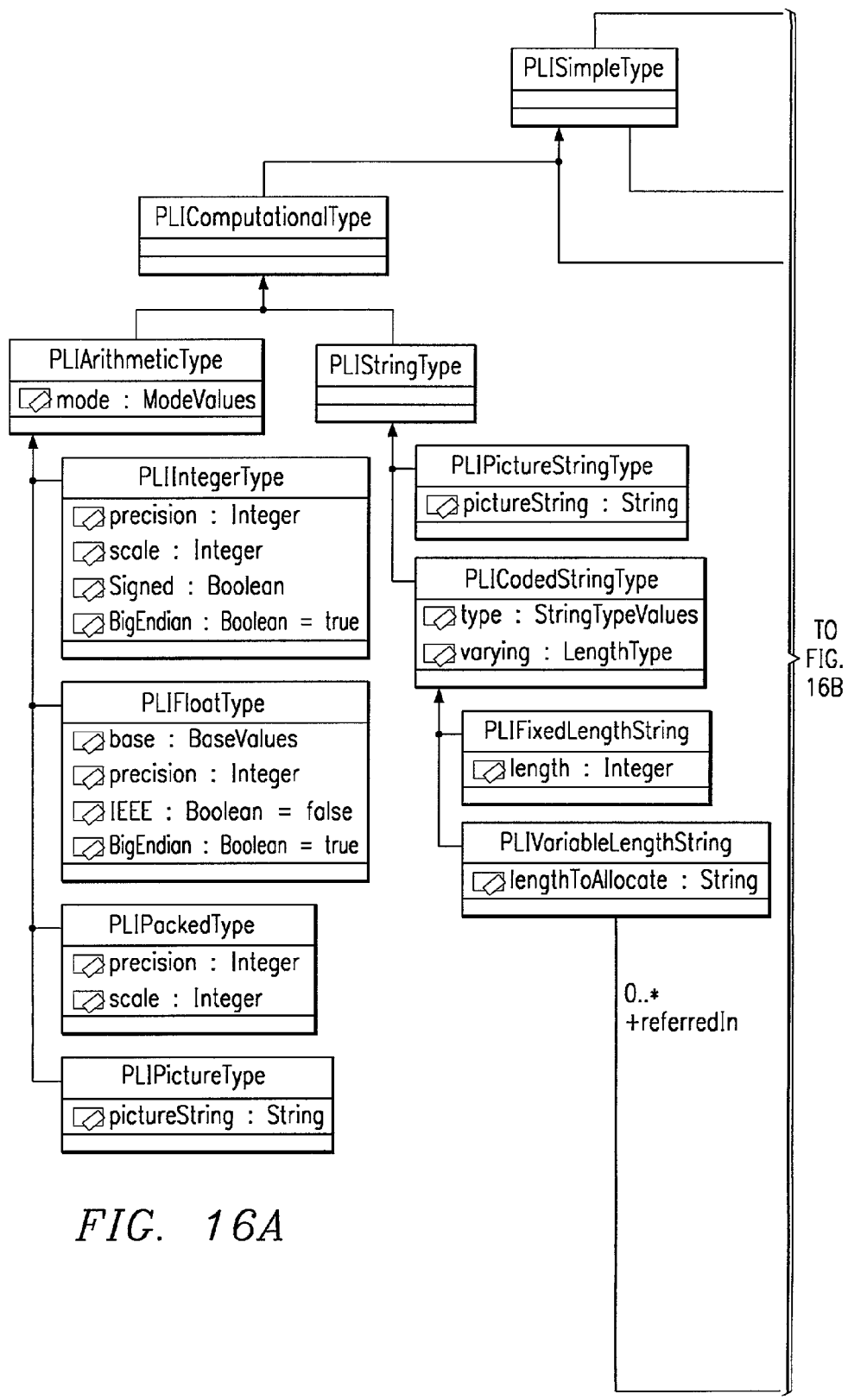
Figure 16B:
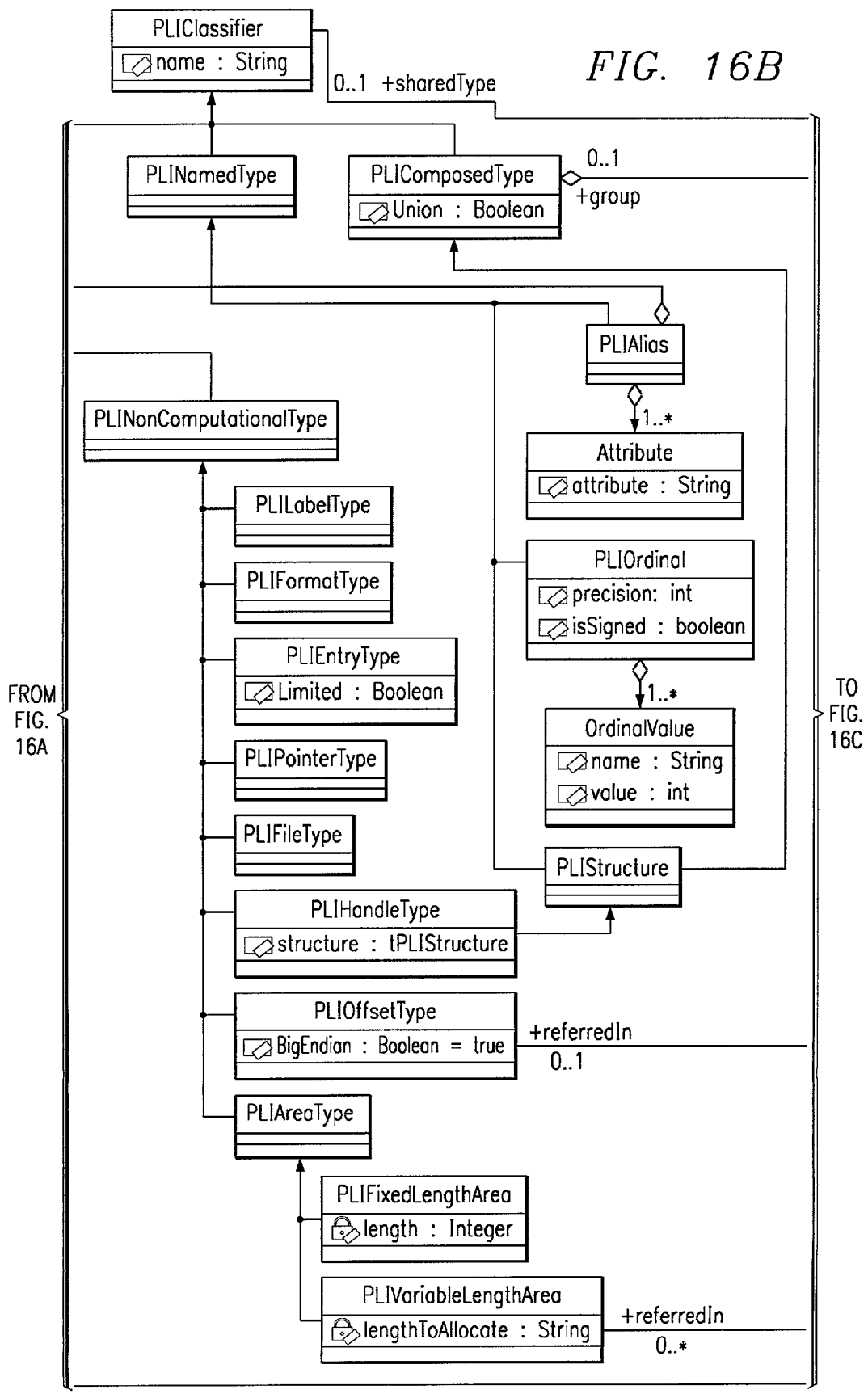
Figure 16C:
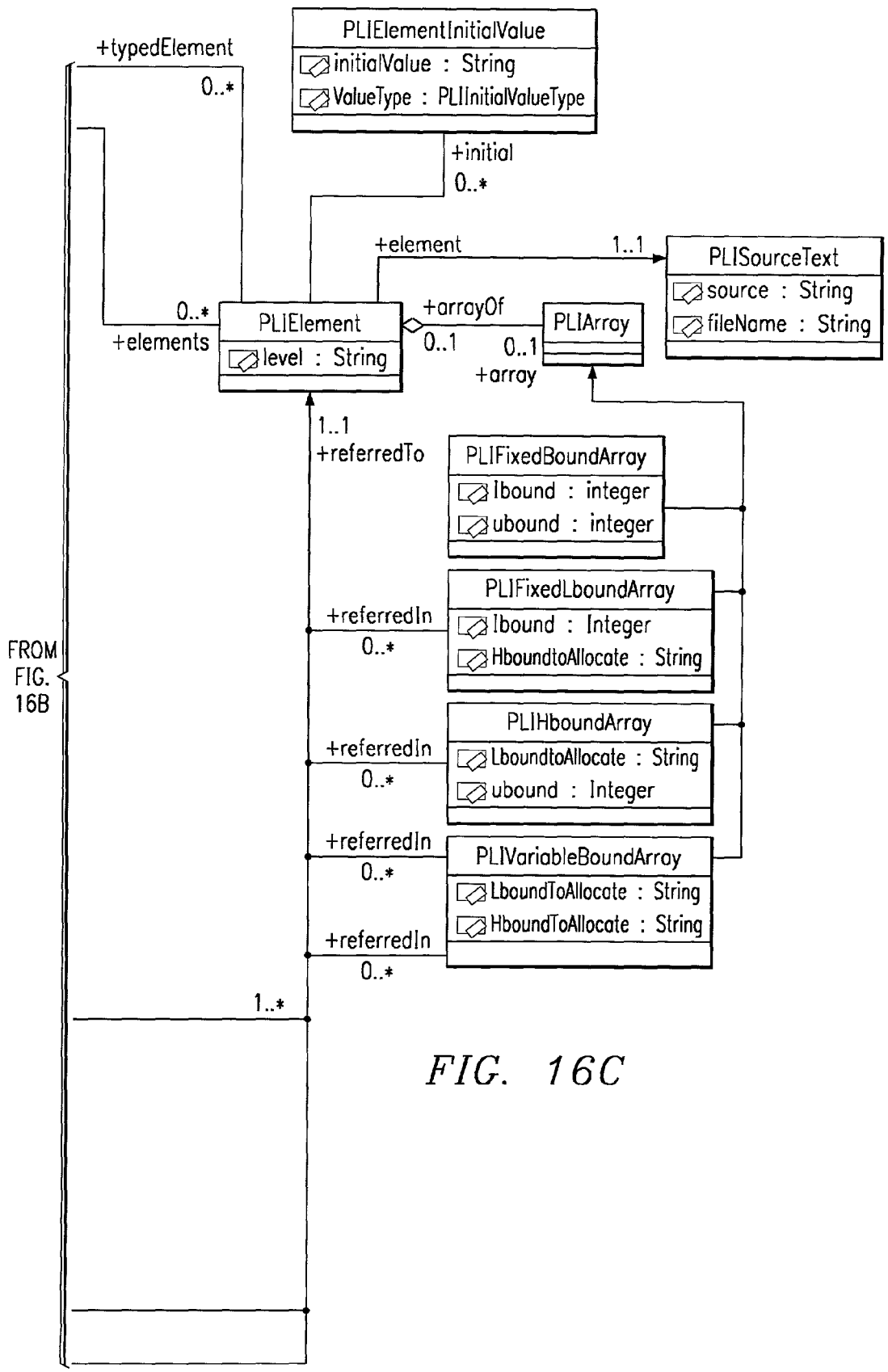

FIG. 16 illustrates a PL/I language metamodel, which is usable by application programs to define data structures which represent connector interfaces. This metamodel is an MOF class instance at the M2 level.

Figure 17:
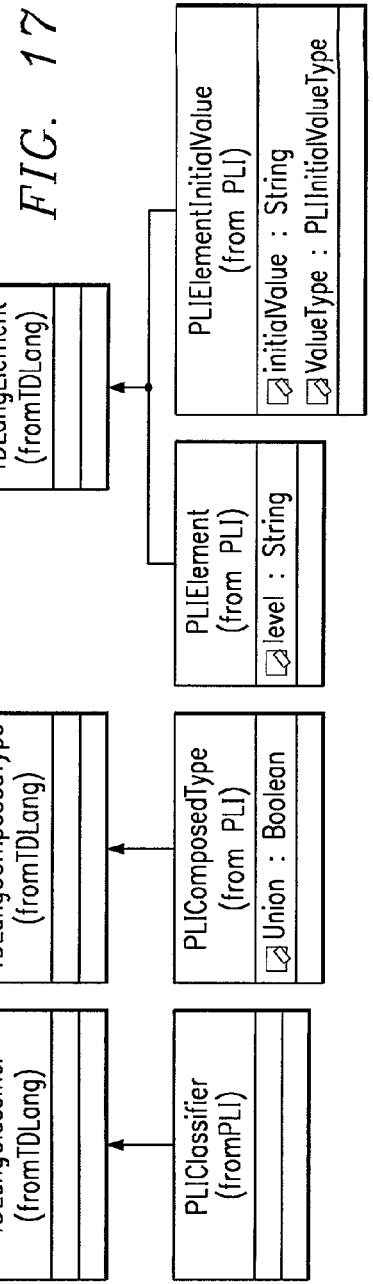

FIG. 17 illustrates the associations between the PL/I metamodel with the TDLang base classes which are the TDLangClassifier, the TDLanguageComposedType, and the TDLanguageElement for the PL/I Metamodel.

Figure 18:
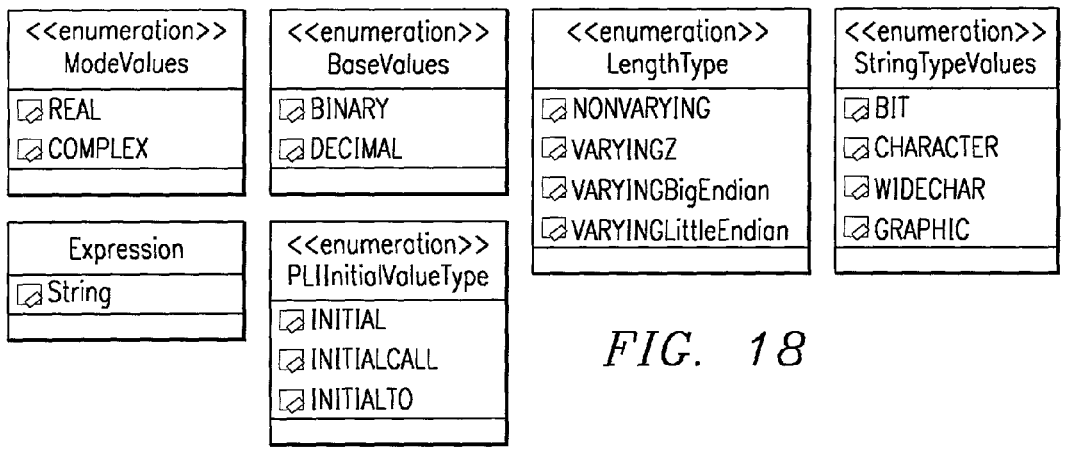

FIG. 18 illustrates enumerations of Mode Values, Base Values, LengthTypes, and StringTypeValues for the PL/I Metamodel.

Figure 19:
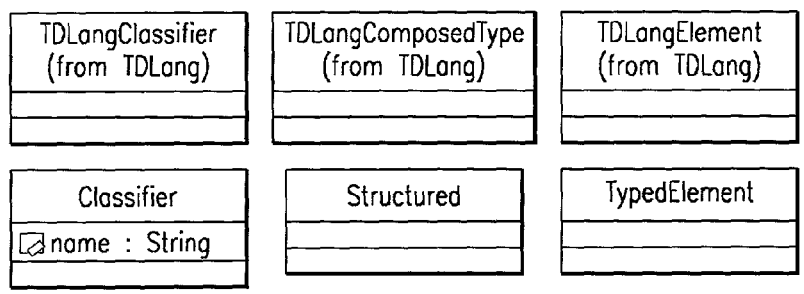

FIG. 19 illustrates the C Main Language Metamodel.

Figure 20:
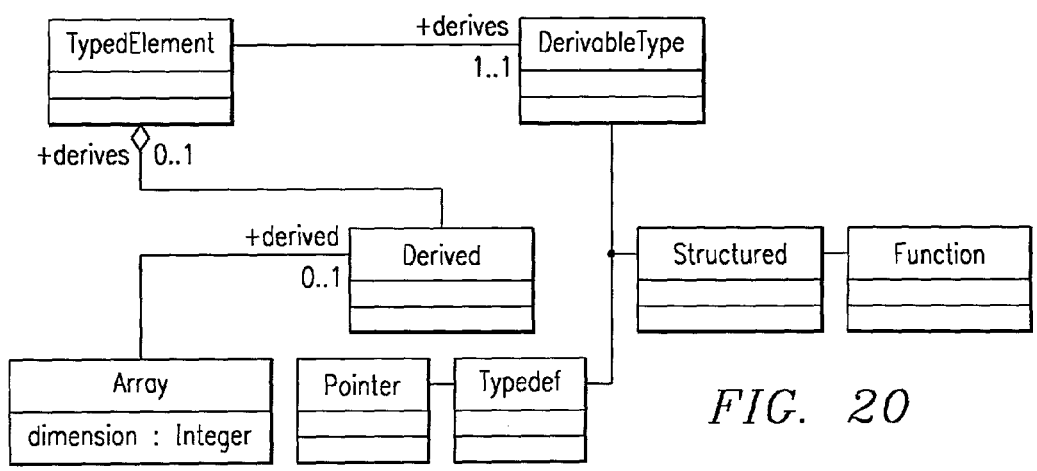

FIG. 20 illustrates the associations between the C Metamodel with the TDLang base classes which are the TDLangClassifier, TDLangComposedType, and the TDLangElement.

Figure 21:
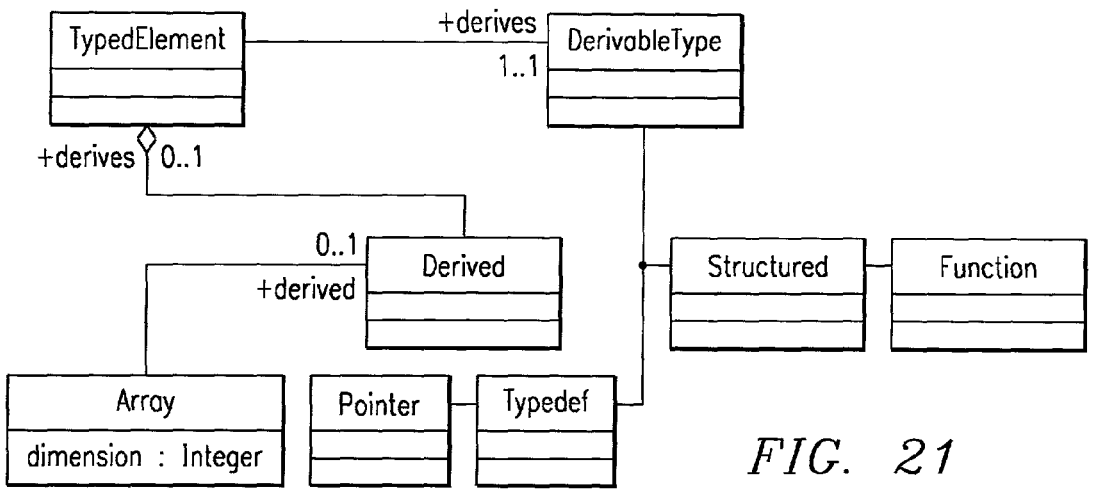

FIG. 21 illustrates the TypedElement aspect of the C Language Metamodel.

Figure 22:
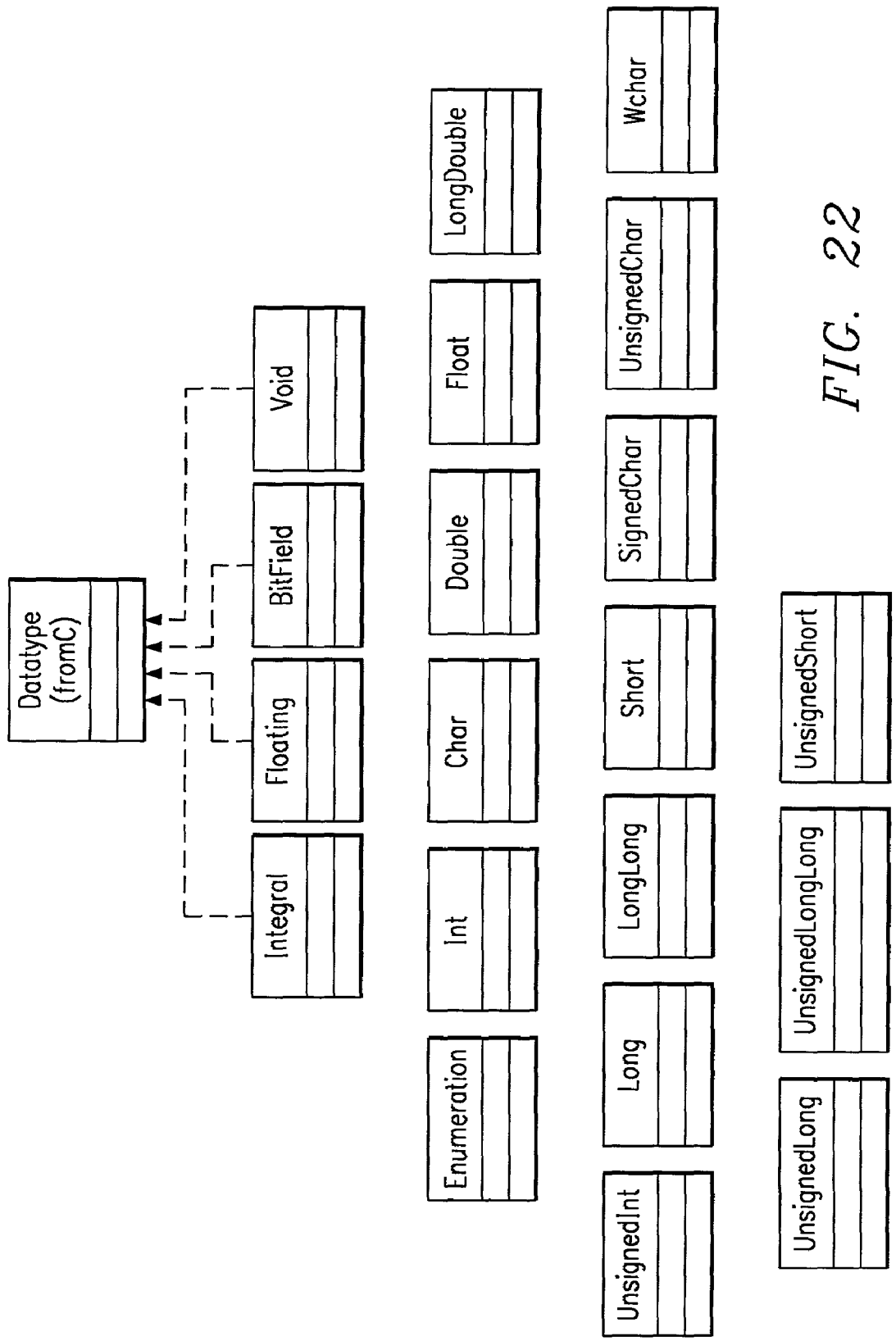

FIG. 22 illustrates user defined types for the C Metamodel, including user defined data types in the C Language Metamodel.

Figure 23:
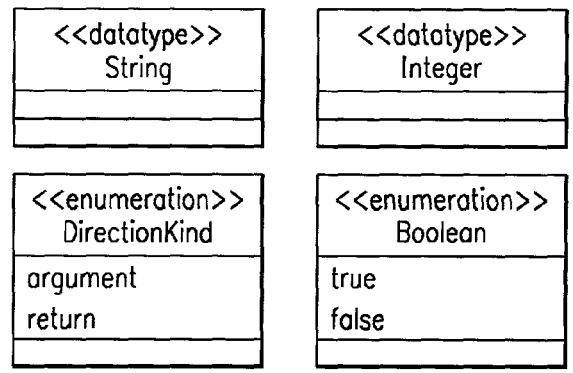

FIG. 23 illustrates the Datatype-String and the Datatype-Integer, as well as the enumeration of argument and return for the DirectionKind, and the enumeration of true and false for the Boolean datatype in the C Language Metamodel.

Figure 24:
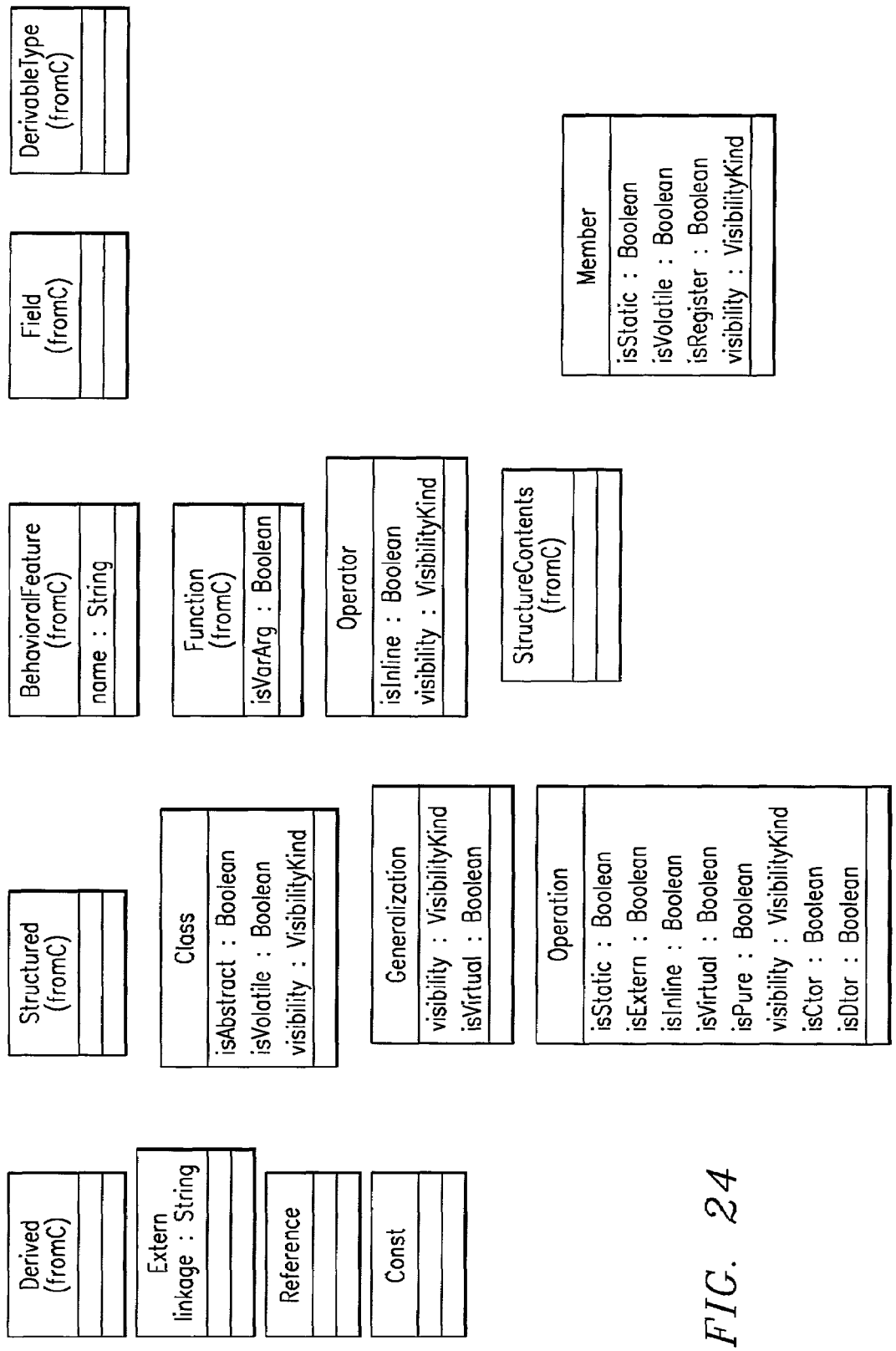

FIG. 24 illustrates the C++ Main Metamodel which inherits from the C Main Metamodel. This model includes Derived, Structured, BehavioralFeatures, Field, and DerivableTypes for the C++ Metamodel.

Figure 25:
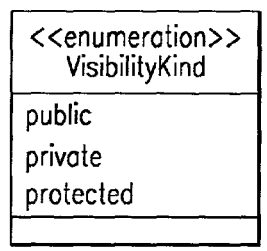

FIG. 25 illustrates an enumeration of the visibility types for the C++ Metamodel. Note that C++ is an object oriented language, useful in object oriented programming, and supports public, private, and protected visibilities.

Figure 26:
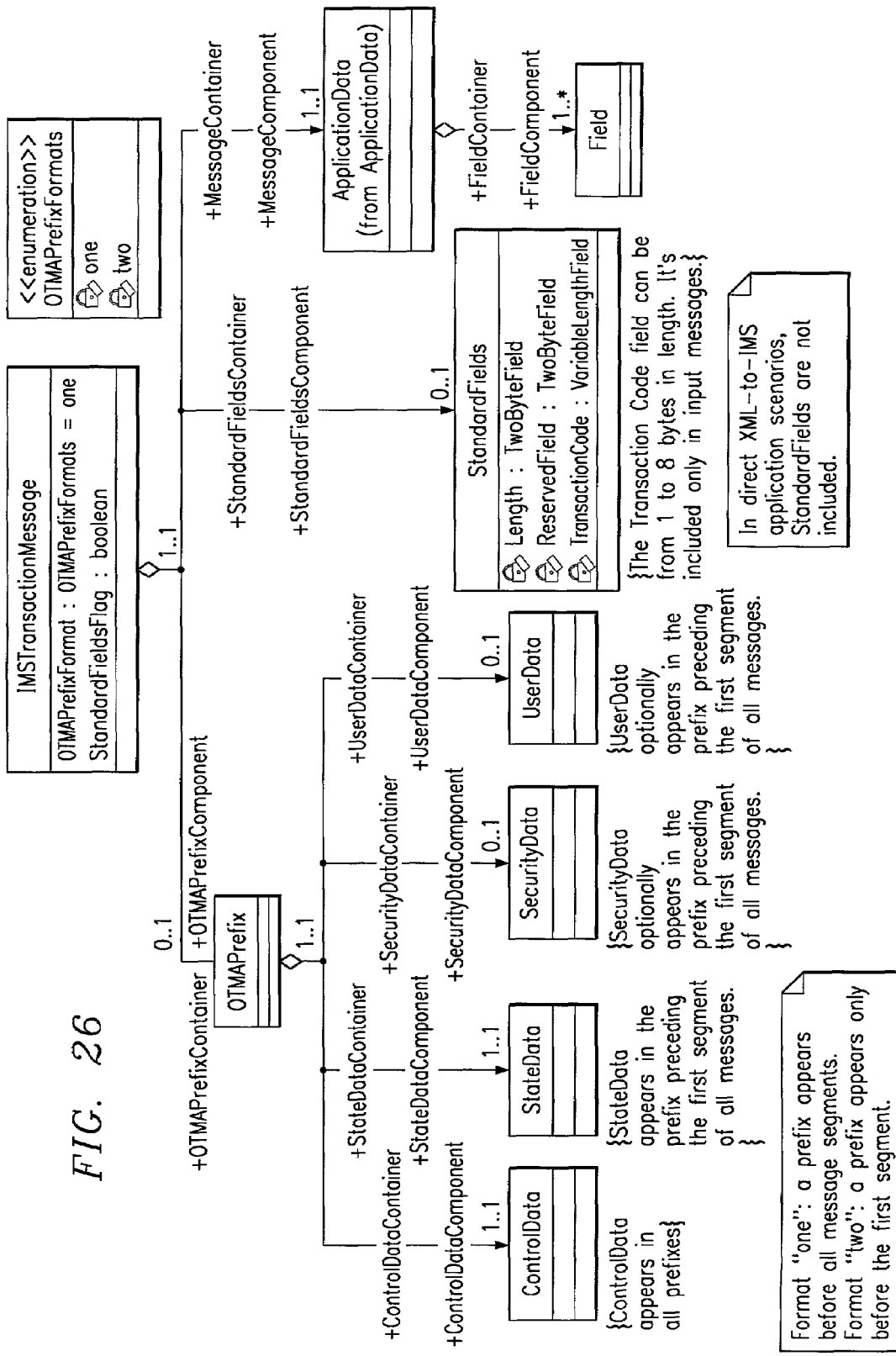

FIG. 26 illustrates the Metamodel for an IMS Transaction Message, containing three types of transaction messages, the IMS-OTMA Messages with a prefix, IMS messages without a prefix where a default OTMA prefix can be built by IMS, and IMS basic messages to be sent to application programs, directly.

Figure 27:
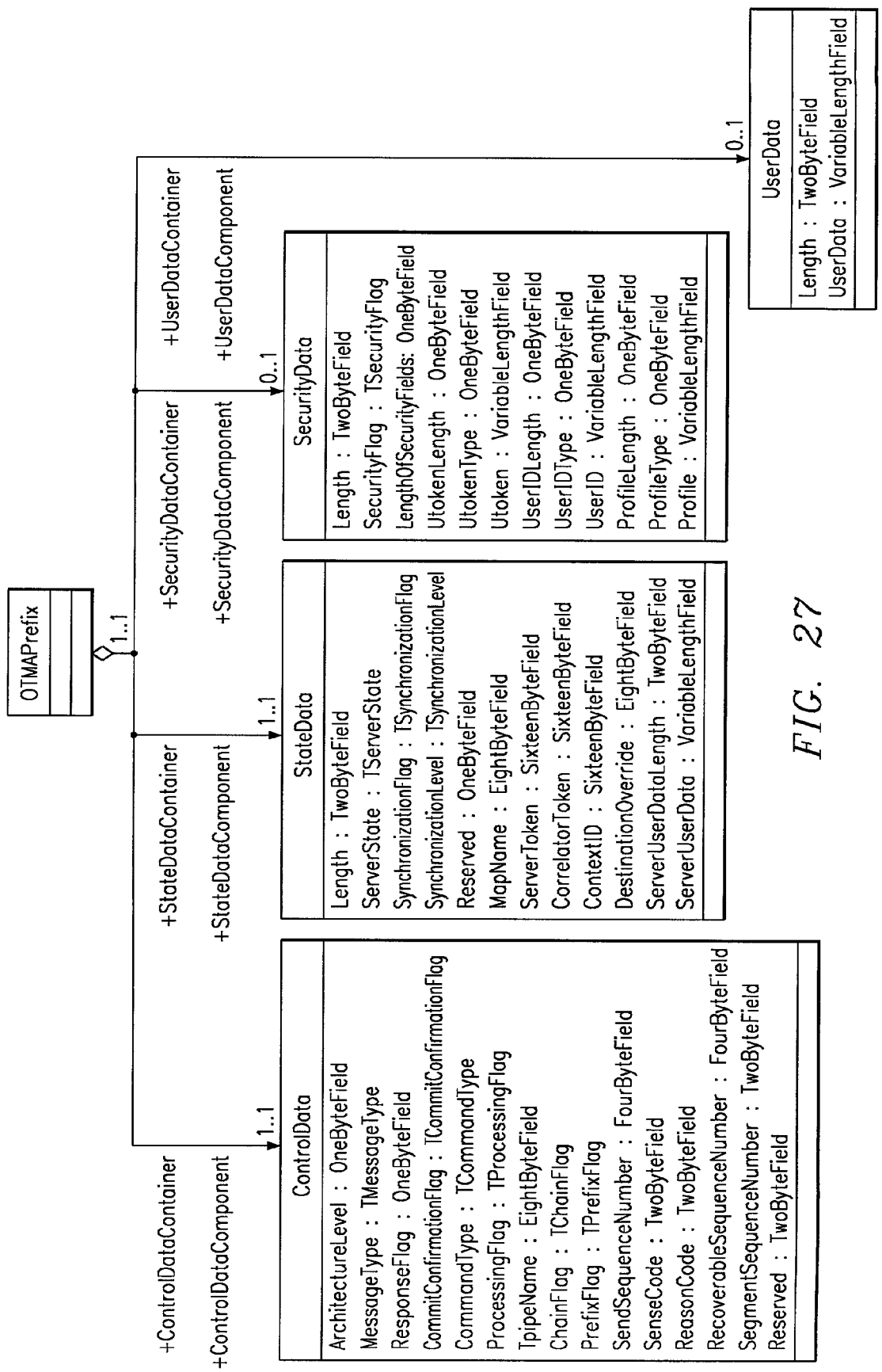

FIG. 27 illustrates the OTMA prefix metadata model.

FIG. 28 illustrates the OTMA prefix in control data defined data types.

Figure 29:
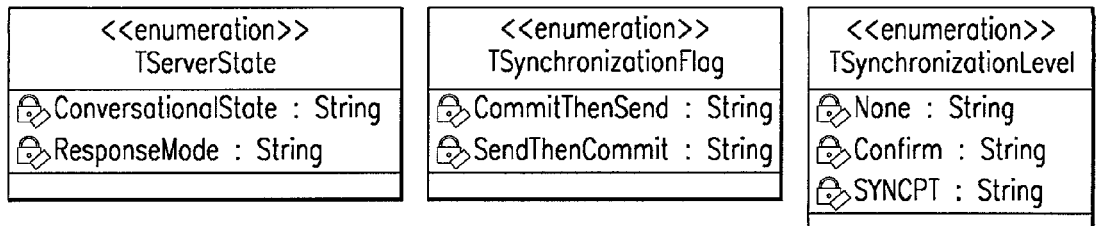

FIG. 29 illustrates the OTMA prefix in state defined data types.

Figure 30:
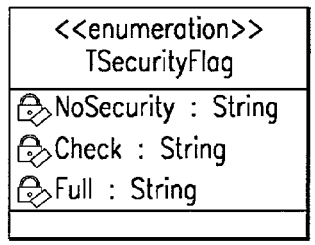

FIG. 30 illustrates the OTMA prefix in security defined types.

Figure 31:
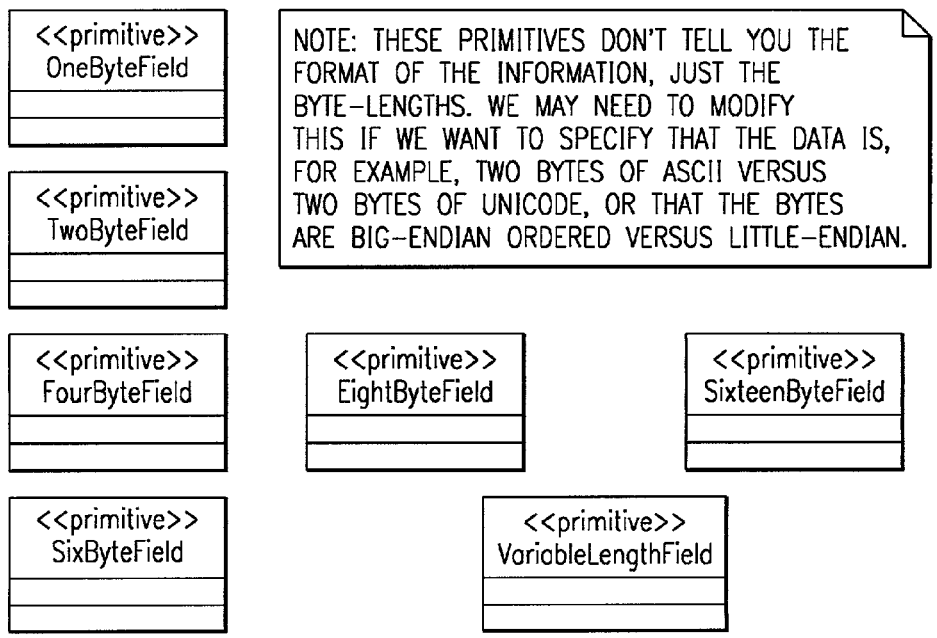

FIG. 31 illustrates the IMS Messages primitives in the IMS Metamodel.

Figure 32:
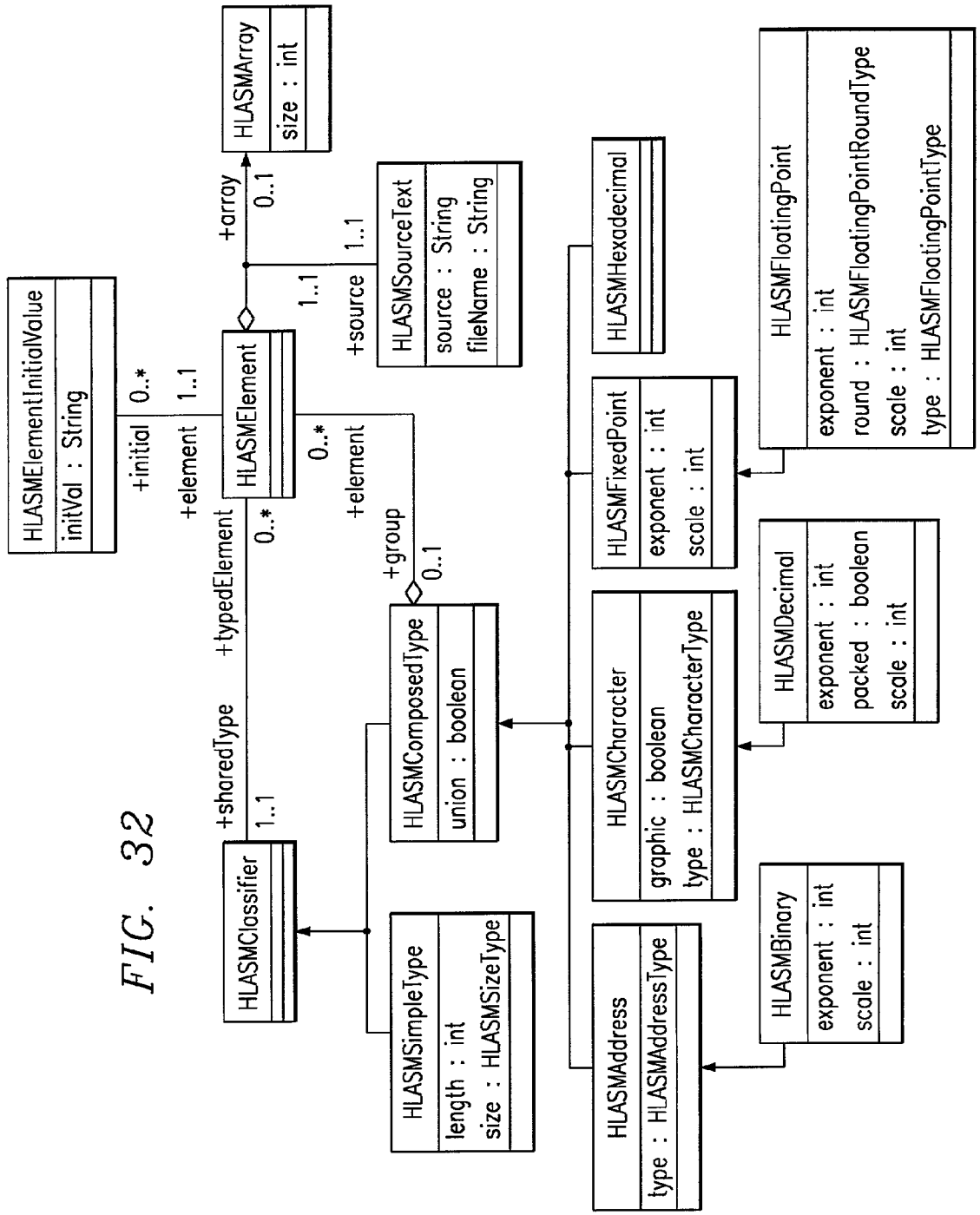

FIG. 32 illustrates a High Level Assembly Language (HLASM) metamodel to define data structure semantics which represent connector interfaces. This metamodel is also a MOF Class instance at the M2 level.

Figure 33:
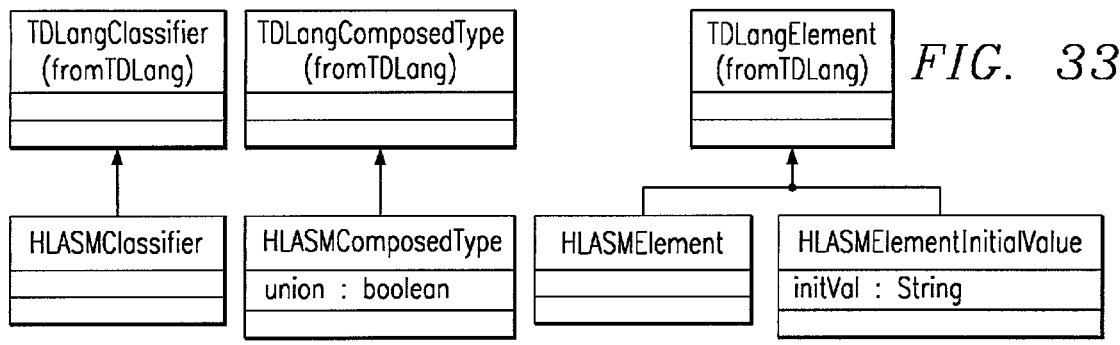

FIG. 33 illustrates the associations between the HLASM metamodel with the TDLang base classes which are the TDLangClassifier, the TDLanguageComposedType, and the TDLangElement.

FIG. 34 illustrates an enumeration of the HLASM usage values in the HLASM Metamodel.

Figure 35:
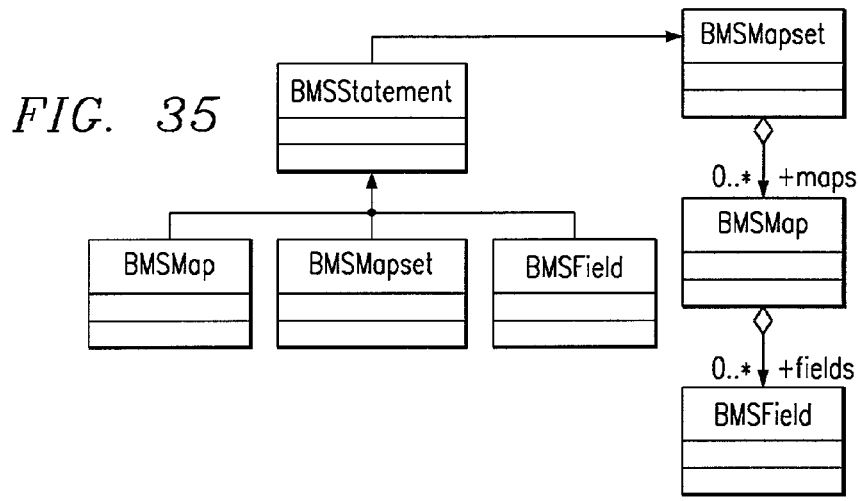

FIG. 35 illustrates a CICS BMS language metamodel, which is usable by application programs to define data structures which represent connector interfaces.

FIG. 36 illustrates attributes, fields, attribute values, maps, and attributes of the BMSMetamodel.

Figure 37:
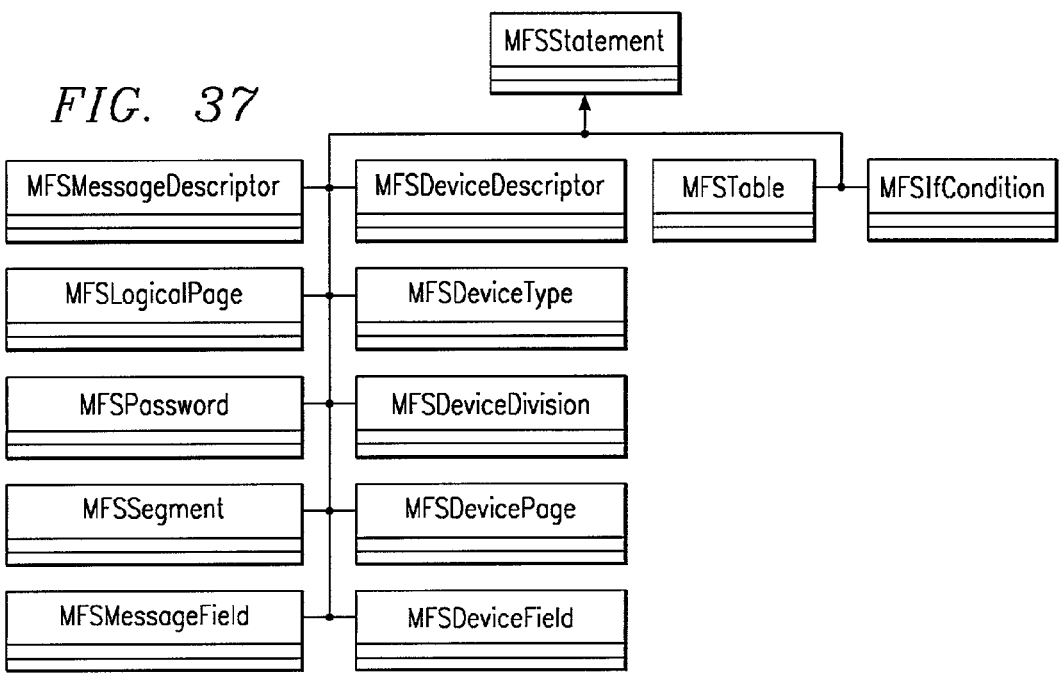

FIG. 37 illustrates a MFS language metamodel, which is usable by application programs to define data structures which represent connector interfaces.

Figure 38:
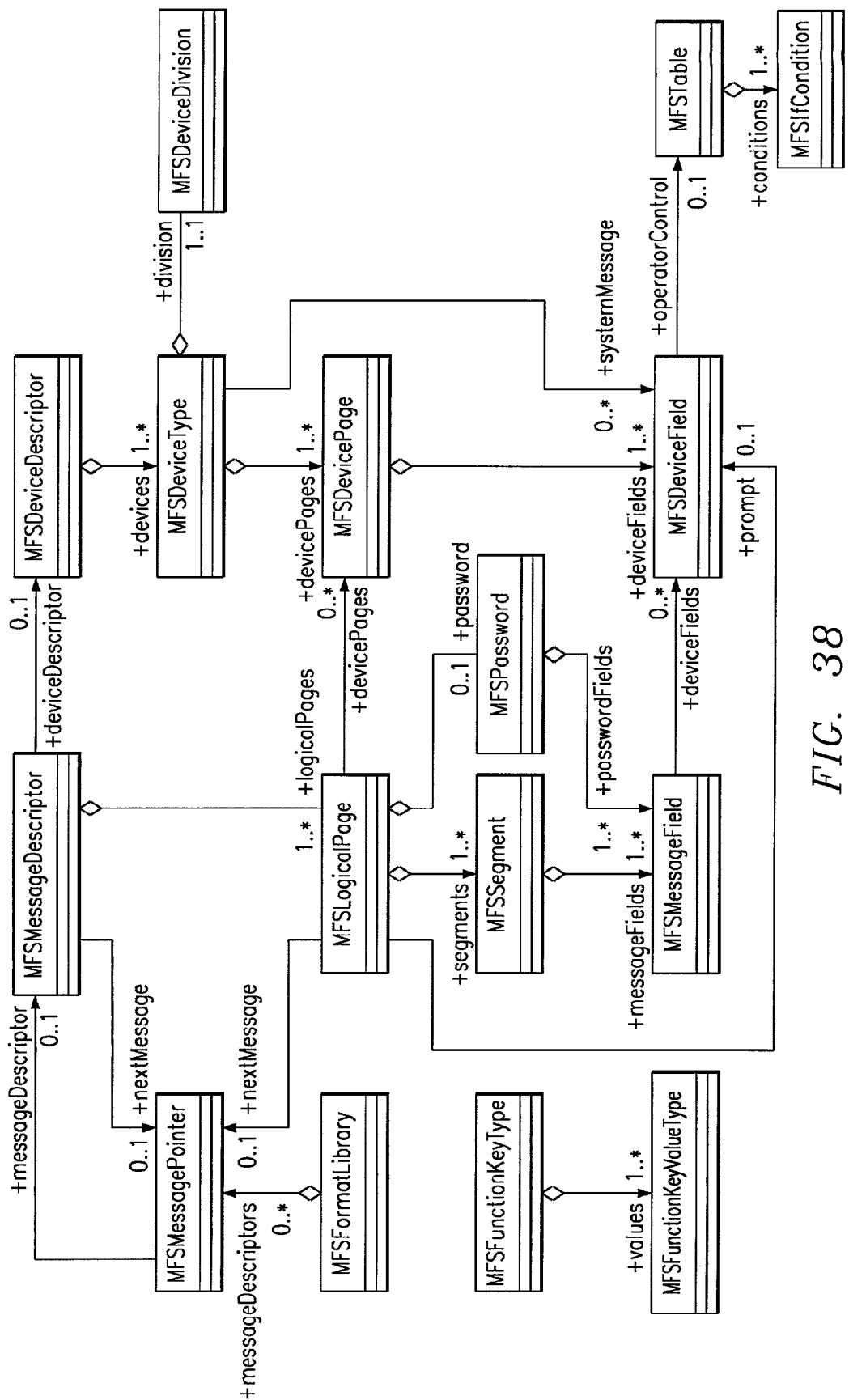

FIG. 38 illustrates the associations between the classes of the MFS metamodel.

FIG. 39 illustrates enumerations of Mode Values, Base Values, LengthTypes, and StringTypeValues for the MFS Metamodel.

FIG. 40 illustrates a simplified network configuration for a "rich" transaction where, for example, an order is entered at a terminal, and is passed to and through a Web server to a manufacturer's application server. The manufacturer's application server searches through it's own database server, as well as its vendors' dissimilar and incompatible database servers and databases, transparently connected by the connectors described herein, querying for statuses, prices, and delivery dates, of components, and placing orders for needed components to satisfy the order.

Figure 41:
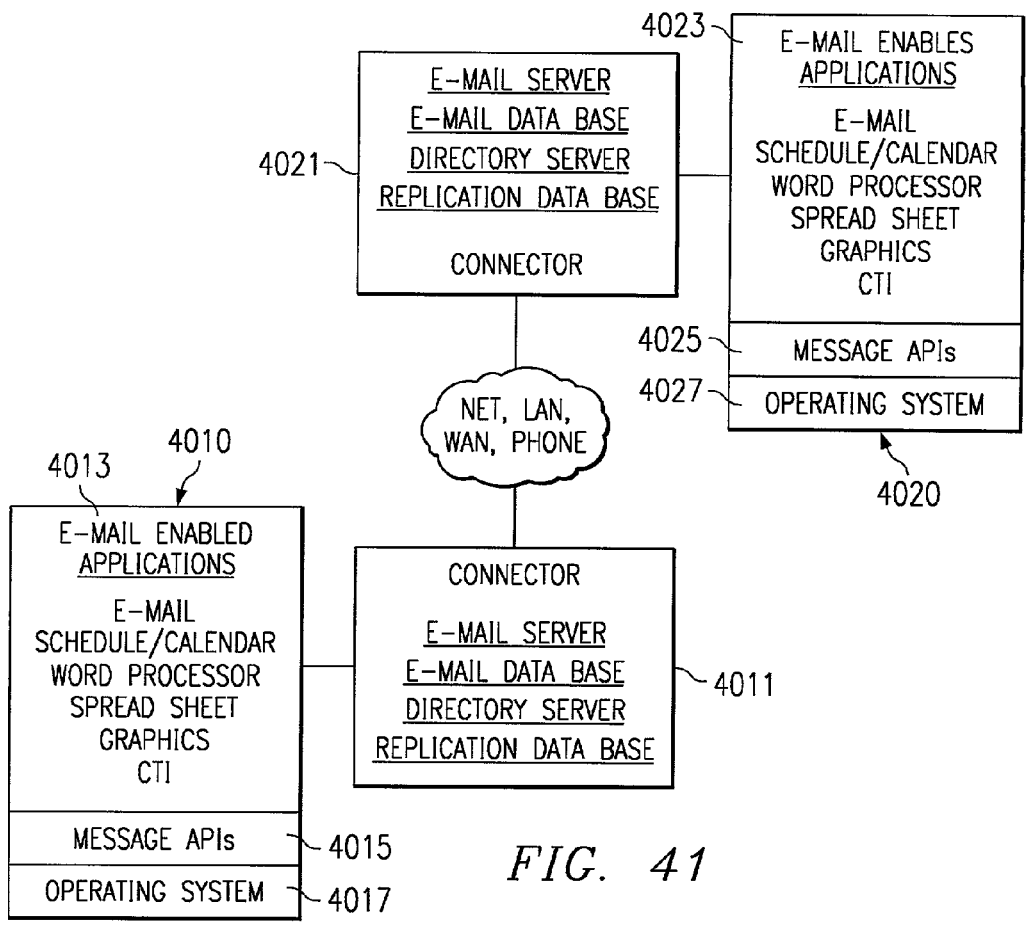

FIG. 41 illustrates a group ware session spread across multiple group ware applications running on multiple, disparate platforms, and connected using the common application metamodel described herein.

Figure 42:
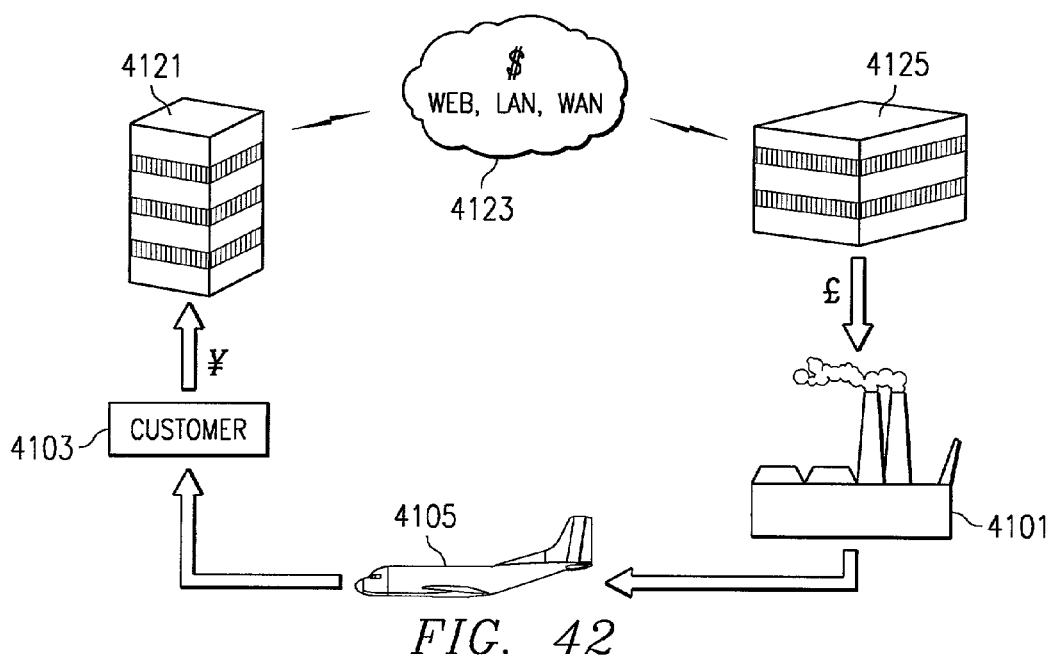

FIG. 42 illustrates a commercial transaction where real goods are shipped from a seller to a buyer, and various forms of electronic payment and secured electronic payment are used by the buyer to pay the seller, with banks and financial institutions connected using the common application metamodel described herein.

DETAILED DESCRIPTION OF THE INVENTION

Definitions. As used herein the following terms have the indicated meanings. "Handshaking" is the exchange of information between two applications and the resulting agreement about which languages, capabilities, and protocols to use that precedes each connection.

An "application program interface" (API) is a passive specific method prescribed by a computer operating system or by another application program by which a programmer writing an application program can make requests of the operating system or another application. Exemplary is SAX (Simple API for XML), a connector that allows a programmer to interpret a Web file that uses the Extensible Markup Language, that is, a Web file that describes a collection of data. SAX is an event-driven interface. The programmer specifies an event that may happen and, if it does, SAX gets control and handles the situation. SAX works directly with an XML parser.

A "connector" as used herein is a dynamic, run-time, interface between platforms that stores the functions and parameters of the target platform or program, and binds with the target platform program in real time.

A "stub" is a small program routine that provides static interfaces to servers. Precompiled stubs define how clients invoke corresponding services on the server. The stub substitutes for a longer program on the server, and acts as a local call or a local proxy for the server object. The stub accepts the request and then forwards it (through another program) to the remote procedure. When that procedure has completed its service, it returns the results or other status to the stub which passes it back to the program that made the request. Server services are defined in the stub using an Interface Definition Language ("IDL"). The client has an IDL stub for each server interface that it accesses and includes code to perform marshaling. Server stubs provide static interfaces to each service exported by the server.

"CICS" (Customer Information Control System) is the online transaction processing program from IBM that, together with the Common Business Oriented Language programming language, is a set of tools for building customer transaction applications in the world of large enterprise mainframe computing. Using the programming interface provided by CICS to write to customer and other records (orders, inventory figures, customer data, and so forth) in a CICS, a programmer can write programs that communicate with online users and read from a database (usually referred to as "data sets") using CICS facilities rather than IBM's access methods directly. CICS ensures that transactions are completed and, if not, it can undo partly completed transactions so that the integrity of data records is maintained. CICS products are provided for OS/390, UNIX, and Intel PC operating systems. CICS also allows end users to use IBM's Transaction Server to handle e-business transactions from Internet users and forward these to a mainframe server that accesses an existing CICS order and inventory database.

"IMS" (Information Management System) is the system from IBM that, together with IBM's Enterprise Systems Architecture (IMS/ESA) provides a transaction manager and a hierarchical database server.

"MQ" is the MQSeries IBM software family whose components are used to tie together other software applications so that they can work together. This type of application is often known as business integration software or middleware. Functionally, MQSeries provides a communication mechanism between applications on different platforms, an integrator which centralizes and applies business operations rules, and a workflow manager which enables the capture, visualization, and automation of business processes. MQSeries connects different computer systems, at diverse geographical locations, using dissimilar IT infrastructures, so that a seamless operation can be run. IBM's MQSeries supplies communications between applications, and between users and a set of applications on dissimilar systems. Additionally, MQSeries' messaging scheme requires the application that receives a message to confirm receipt. If no confirmation materializes, the message is resent by the MQSeries.

"Rose" is an object-oriented Unified Modeling Language (UML) software design tool intended for visual modeling and component construction of enterprise-level software applications. It enables a software designer to visually create (model) the framework for an application by blocking out classes with actors (stick figures), use case elements (ovals), objects (rectangles) and messages/relationships (arrows) in a sequence diagram using drag-and-drop symbols. Rose documents the diagram as it is being constructed and then generates code in the designer's choice of C++ Visual Basic, Java, Oracle8, Corba or Data Definition Language.

Figure 1:
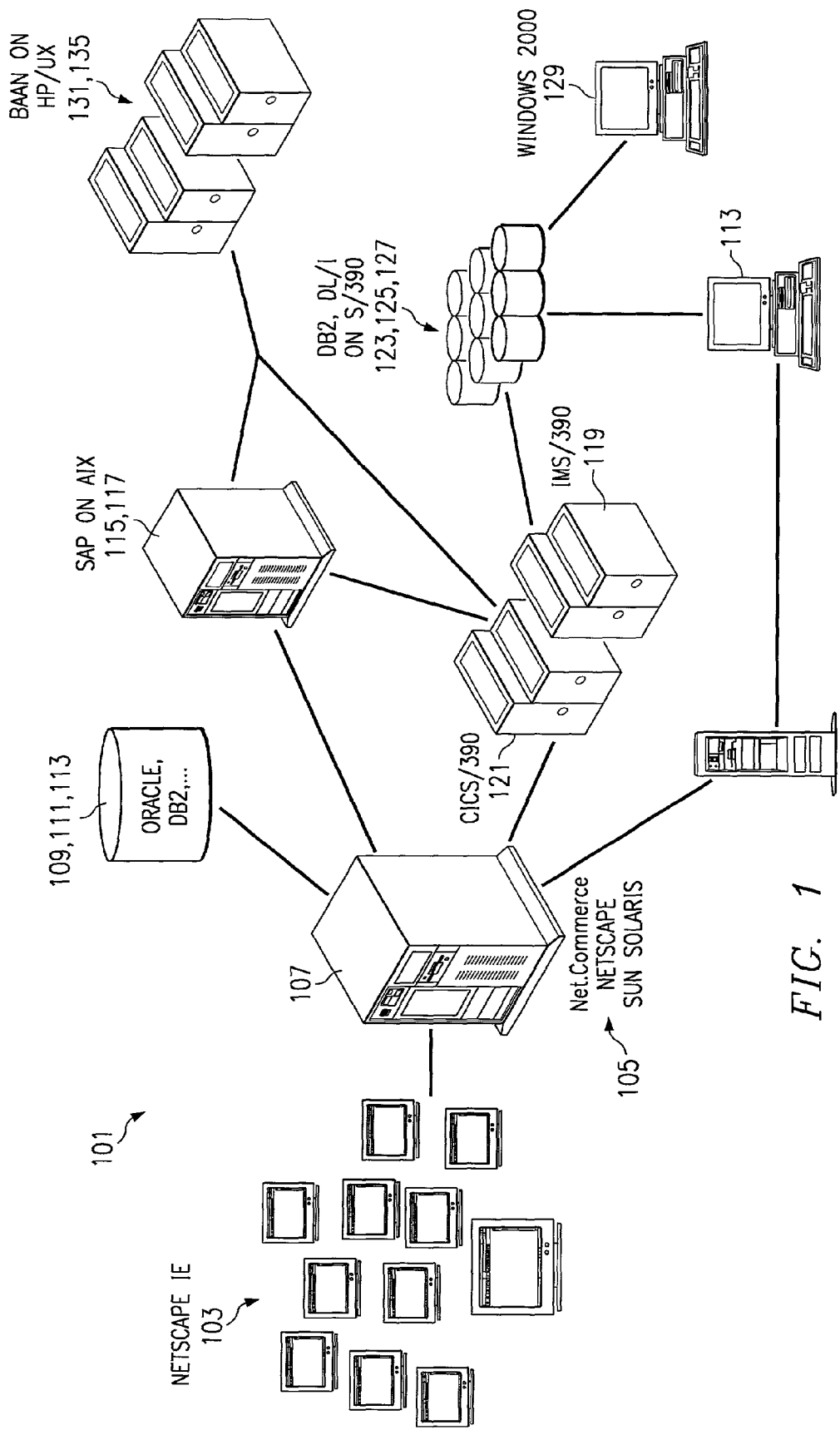
FIG. 1 illustrates a system with multiple application components, including a Netscape Internet Explorer browser, Net.Commerce on a Sun Solaris server, Oracle and IDB2 on a database server, SAP running on AIX, a CICS 390 server, an IMS 390 server, DB2 and DL/I on a S/390 platform, a Windows 200 client, and Baan running on an HP Unix server.
Figure 2:
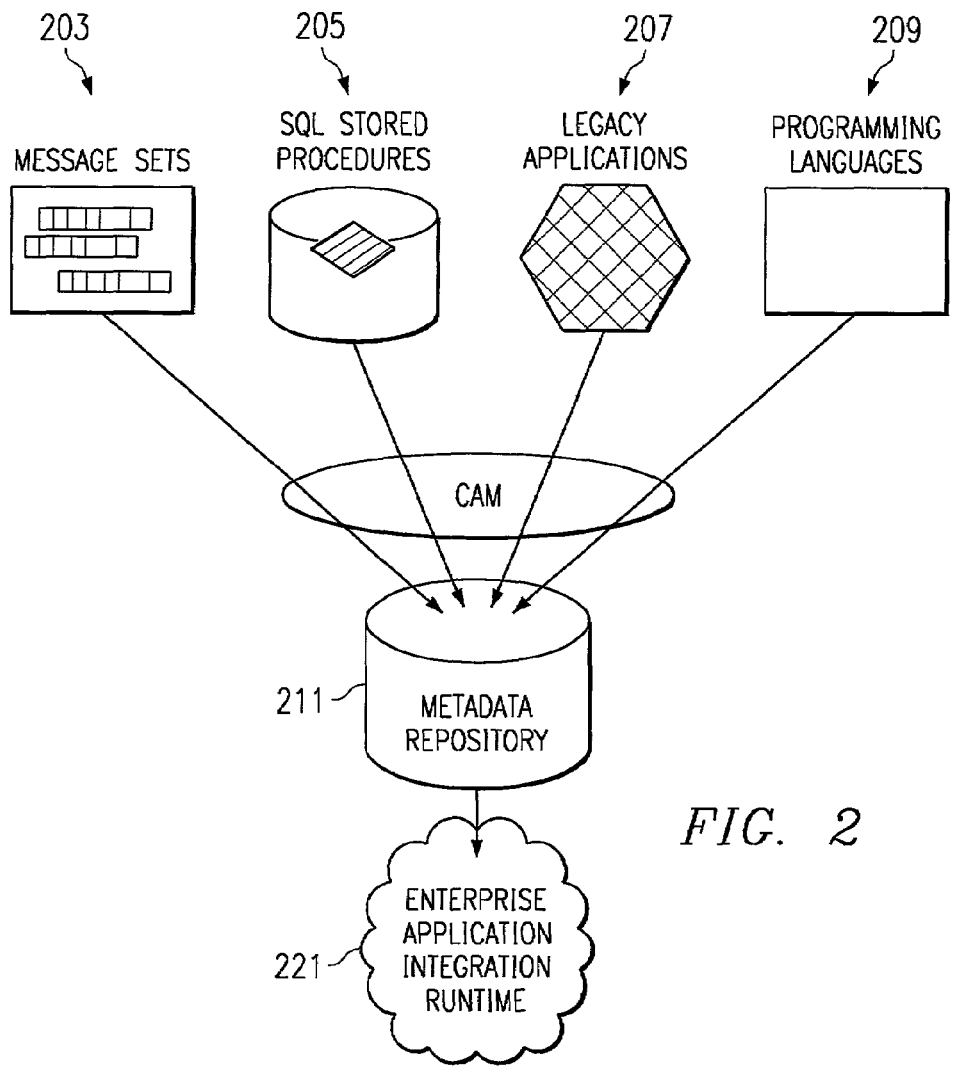
FIG. 2 illustrates the roles of message sets, SQL stored procedures, legacy applications, and programming languages as inputs to the metadata repository of the Common Application Metamodel to facilitate enterprise application integration at run time.

Common Application Metamodel Overview. The Common Application Metamodel (CAM) brings interconnectivity to the environment illustrated in FIG. 1. FIG. 1 illustrates a typical system 101 with multiple application components, including a Netscape Internet Explorer browser 103, Net.Commerce 105 on a Sun Solaris server 107, Oracle 109 and DB2 111 on a database server 113, SAP 115 running on AIX 117, a CICS 390 server 119, an IMS 390 server 121, DB2 123 and DL/I 125 on a S/390 platform 127, a Windows 2000 client 129, and Baan 131 running on an HP Unix server 133. The Common Application Metamodel (CAM) is metadata interchange method, tool, and system for marshaling and applying information needed for accessing enterprise applications, such as in FIG. 1, in a source language and converting them to a target language. CAM consists of language metamodels and application domain interface metamodels, as shown in FIG. 2, which illustrates the roles of message sets 203, SQL stored procedures 205, legacy applications 207, and programming languages 209 as inputs to the metadata repository 211 of the Common Application Metamodel to facilitate enterprise application integration 221.

Figure 3:
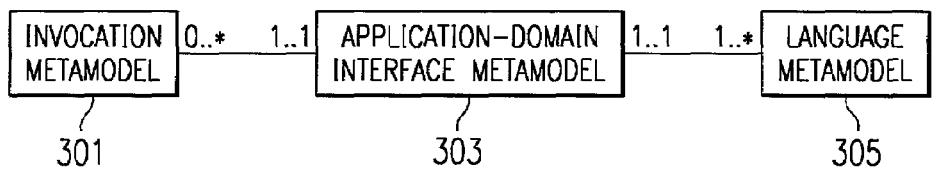
FIG. 3 illustrates that the Common Application Metamodel of the invention consists of three kinds of metamodels, i.e., an invocation metamodel, an application-domain interface metamodel, and a language metamodel. For any given application-domain metamodel it may use one or many language metamodels, and there could be zero or many invocation metamodels.

Exemplary metamodels include C, C++, Java, COBOL, PL/I, HL Assembler, IMS transaction messages, IMS MFS, CICS BMS, and MQSeries messages models, as shown in FIG. 3, which illustrates the Common Application Metamodel of the invention, with an invocation metamodel 301, an application-domain interface metamodel 303, and a language metamodel 305.

Figure 4:
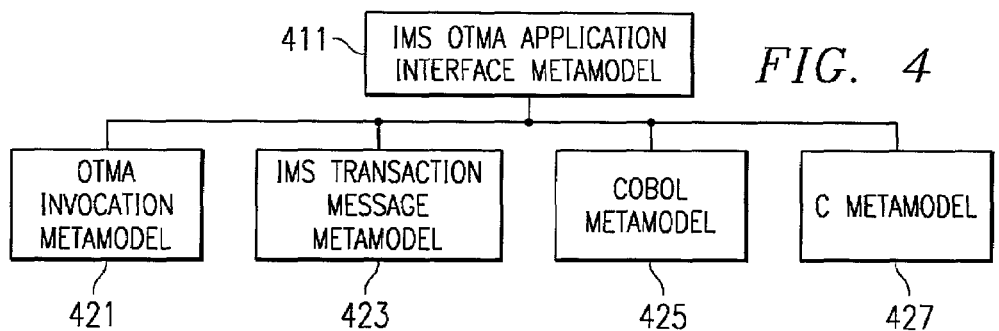
FIG. 4 illustrates an IMS OTMA metamodel, with an OTMA Invocation Metamodel, an IMS Transaction Message Metamodel application interface, which could use a COBOL Metamodel, a C Metamodel, or other language metamodels.

FIG. 4 illustrates an IMS OTMA application interface metamodel 411, with an OTMA Invocation Metamodel 421, an IMS Transaction Message Metamodel 423, a COBOL Metamodel 425, and a C Metamodel 427.

FIG. 5 illustrates the flow of information from an existing application 501, through an interface 503 to an object model containing application interface metadata. This application interface metamodel is stored in the metadata repository 505, and, at an appropriate time, retrieved from the metadata repository 505, combined with a source program 507 in a generation tool 509, and used to generate a target file 511, as an XML file, i.e., an XMI instance file. CAM is highly reusable and independent of any particular tool or middleware.

Development Stage. With CAM, tooling can now easily provide solutions to access enterprise applications, e.g. IMS applications. By parsing each source file and generating XML documents based on the CAM model, COBOL copybook, PL/I copybook, MFS Source, BMS Source, etc., tools can provide connector solutions to IMS, and CICS, etc.

In this regard, FIG. 6 illustrates a development phase scenario where a Common Application Metamodel Rose file 601, e.g., a COBOL metamodel, a PL/I metamodel, an MFS metamodel, a BMS model, or the like is read into a toolkit 603, to generate a DTD and schema for a Rose model and Java code for a Rose model 605. A source file of an application 607, as a COBOL source file, a PL/I source file, an MFS source file, a BMS source file, or the like, and the Java code for the Rose model 609 are read into an Importer 611. The importer parses the source code and provides, as output, an XMI instance file 613, i.e., XML documents, of the application source files.

FIG. 7 shows a CAM metamodel for application interfaces. This Figure depicts a runtime connector 701 with invocation and transformation capabilities, interfacing with an existing application program 703 through an interface 705 containing the existing application program's interface definition, in accordance with the application interface metamodel 707. The Application Interface metadata is stored in a metadata repository 709.

The flow and messaging middleware 713 invokes applications 703 through the application interfaces 705. These interfaces 705 are the access points to the applications 703 through which all input and output is connected to the middleware 713. The interfaces 705 are described in terms of the Application Interface Metamodel.

Transformation processing according to the metamodel could take place in source/client applications, target applications, or a gateway.

Because CAM also provides physical representation of data types and storage mapping to support data transformation in an enterprise application integration environment, it enables Web services for enterprise applications.

At development time CAM captures information that facilitates:

a). connector and/or connector-builder tools, b). data driven impact analysis for application productivity and quality assurance, and c). viewing of programming language data declarations by developers.

The CAM metamodel files are inputs to toolkits used to generate DTD files, XML schemas, and Java classes which represent the CAM model. Importers parse each source file (e.g. COBOL or PL/I copybook, MFS source, and BMS, etc.), and then generate XML documents (i.e. XML instance files) based on Java classes generated by the XMI/MOF2 toolkit.

Run Time. At run time CAM provides information which facilitates transformation in an enterprise application integration environment where it provides data type mapping between mixed languages, facilitates data translations from one language and platform domain into another.

FIG. 8 illustrates the application of the Common Application Metamodel during run time. As shown, SOAP compliant XML documents 803 are received in, for example, IBM WebSphere middleware, 805, which contains an IMSConnector for Java 807, and is in contact with an XML Repository 809, containing the XMI instance files for the CAM model. The IBM WebSphere middleware sends the transformed file to the IMS system 811, which contains an instance of IMS Connect 813 and the IMS transactional application program 815. CAM facilitates connectivity between the back-end IMS application 815 and the Web file (e.g., SOAP compliant XML documents) 803. The CAM accomplishes this by using CAM model information (from repository 809) to perform data transformations from one platform to another in the mixed language environment shown.

Type Descriptor Metamodel. One important feature provided by CAM is the Type Descriptor metamodel. The Type Descriptor metamodel defines the physical realization, storage mapping, and the constraints on the realization (such as justification). This metamodel provides a physical representation of individual fields of a given data structure. When supporting data transformation in an enterprise application integration environment, the model provides data type mapping between mixed languages. It also facilitates data translations from one language and platform domain into another. The metamodel is used for runtime data transformation (or marshaling) with a language-specific metamodel for overall data structures and field names.

1. Common Application Metamodel for Application Interfaces

The interconnection of disparate and dissimilar applications running on different software platforms, as shown in FIG. 1, with different operating systems, physical platforms, and physical realizations is accomplished through connectors that incorporate the interconnection metadata. Connectors are a central part of the application framework for e-business. The end user demand is to connect to anything interesting as quickly, and as easily, as possible.

A connector is required to match the interface requirements of the adapter and the legacy application. It is also required to map between the two interfaces. Standardized metamodels for application interfaces presented herein allow reuse of information in multiple connector tools.

These standardized metamodels not only reduce work to create a connector, but also reduce work needed to develop connector builder tools.

The connectors built using the common application metamodel of our invention provide interoperability with existing applications. The connectors support leveraging and reuse of data and business logic held within existing application systems. The job of a connector is to connect from one application system server "interface" to another. Therefore, an application-domain interface metamodel describes signatures for input and output parameters and return types for a given application system domain (e.g. IMS, MQSeries); it is not for a particular IMS or MQSeries application program. The metamodel contains both syntactic and semantic interface metadata.

1. a. End-to-End Connector Usage Using Common Application Metamodel

The Common Application Metamodel (CAM) consists of meta-definitions of message signatures, independent of any particular tool or middleware. Different connector builder tools can use this information to ensure the "handshaking" between these application programs, across different tools, languages, and middleware. For example, if you have to invoke a MQSeries application, you would need to build a MQ message using data from a GUI tool and deliver it using the MQ API. Similarly, when you receive a message from the MQSeries application, you would need to get the buffer from MQSeries, parse it and then put it into a GUI tool data structure. These functions can be designed and implemented efficiently by a connector builder tool using CAM as standardized metamodels for application interfaces.

CAM can be populated from many sources, including copy books, to generate HTML forms and JavaServer Page (JSP) for gathering inputs and returning outputs. An example of a connector as depicted in the previous figure is that the flow and message middleware makes a function call to an enterprise application by calling the connector which then calls the enterprise application API. The connector does language and data type mappings, for example, to translate between XML documents and COBOL input and output data structures based on CAM. Connectors and CAM provide the end-to-end integration between the middleware and the enterprise applications.

Using IMS as an example. Let's say that you must pass an account number to an IMS transaction application program from your desktop to withdraw $50.00. With CAM and a connector builder tool, you will first generate an input HTML form and an output JSP; and develop a middleware code necessary to support the request. The desktop application fills the request data structure (i.e. an input HTML form) with values and calls the middleware. The middleware service code will take the data from the GUI tool, build an IMS Connect XML-formatted message, and deliver the message to the IMS gateway (i.e. IMS Connect) via TCP/IP. IMS Connect translates between the XML documents and the IMS message data structures in COBOL using the metadata definitions captured in CAM. It then in turn sends the IMS message data structures to IMS via Open Transaction Manager Access (OTMA). The IMS COBOL application program runs, and returns the output message back to the middleware service code via IMS Connect. The middleware service code gets the message and populates the output JSP page (i.e. previously generated GUI tool reply data structures) with the reply data. The transaction output data will then be presented to the user.

2. Common Application Metamodel

CAM is used to describe information needed to easily integrate applications developed in common programming models with other systems. The CAM metamodel can be used for both synchronous and asynchronous invocations.

2. a. Common Application Metamodel

The common application metamodel depicted as follows consists of an invocation metamodel and an application-domain interface metamodel which uses language metamodels. For any given application-domain interface metamodel, it may use one or many language metamodels, but, there could be zero or more invocation metamodels.

The common connector metamodel is illustrated in FIG. 3. It has an Invocation Metamodel 301, an Application-Domain Interface Metamodel 303, and a Language Metamodel 305.

2. a. i. Invocation Metamodel

The invocation metamodel 301 consists of one or more of the following possible metadata elements. However, for a particular invocation, it could include only one or many of the following metadata elements.

Message-control information. This includes message control information, such as the message connection name, message type, sequence numbers (if any), and various flags and indicators for response, commit-confirmation, and processing options by which a client or server can control message processing to be synchronous or asynchronous, etc.

The connection name can be used by the application system server to associate all input and output with a particular client. The message type specifies that the message is a response message; or that commit is complete. It can also indicate server output data to the client, or client input data to the server.

Security data—This includes authentication mechanism, and security data, e.g. digital certificates, identity, user name and password, etc. It may also include authorization information to indicate whether the data can be authorized via a role based or ACL (access control list) based authorization.

Transactional semantics—This will carry transaction information, e.g. local vs. global transaction; two-phase commit vs. one-phase commit, and transaction context, etc.

Trace and debug—Trace and debugging information are specified as part of the metamodel.

Precondition and post-condition resource—This describes application state precondition and post-condition relationships.

User data—This includes any special information required by the client. It can contain any data.

2. a. ii. Application-Domain Interface Metamodel

The application-domain interface metamodel 303, as discussed earlier, describes signatures for input and output parameters and return types for application system domains.

2. a. iii. Language Metamodel

The language metamodel 305, e.g. COBOL metamodel, is used by enterprise application programs to define data structures (semantics) which represent connector interfaces. It is important to connector tools to show a connector developer the source language, the target language, and the mapping between the two. The CAM language metamodel also includes the declaration text in the model which is not editable (i.e. read-only model). Because the connector/adapter developer would probably prefer to see the entire COBOL data declaration, including comments and any other documentation that would help him/her understand the business role played by each field in the declaration.

The language metamodel is also to support data driven impact analysis for application productivity and quality assurance. (But, it is not the intention of the CAM to support reproduction of copybooks.)

The language metamodels describing connector data are listed as follows:

C
C++
COBOL
PL/I 2. a. iv. Type Descriptor Metamodel

The Type Descriptor metamodel is language neutral and defines the physical realization, storage mapping and the constraints on the realization such as justification. This metamodel provides physical representation of individual fields of a given data structure. The type descriptor metamodel is to support data transformation in an enterprise application integration environment to provide data types mapping between mix languages. It also facilitates data translations from one language and platform domain into another. This metamodel will be used as a recipe for runtime data transformation (or marshaling) with language specific metamodel for overall data structures and fields names.

3. An Example of Common Connector Metamodel

IMS OTMA (Open Transaction Manager Access) is a transaction-based, connectionless client/server protocol within an OS/390 sysplex environment. An IMS OTMA transaction message consists of an OTMA prefix, plus message segments for input and output requests. Both input and output message segments contain llzz (i.e. length of the segment and reserved field), and application data. Only the very first input message segment will contain transaction code in front of the application data. IMS transaction application programs can be written in a variety of languages, e.g. COBOL, PL/I, C, and Java, etc. Therefore, the application data can be in any one of these languages.

As shown in FIG. 4, an IMS OTMA connector metamodel 401 is composed of an invocation metamodel 403 and an IMS transaction message metamodel 405, as well as a COBOL metamodel 407 and a C metamodel 409. As depicted in FIG. 4, the invocation metamodel 401 is the OTMA prefix, and the IMS transaction message metamodel 405 is the application-domain interface metamodel for the IMS application system which uses language metamodels. Metamodels for COBOL 407 and C 409 are shown.

4. Type Descriptor Metamodel

The type descriptor metamodel presents a language and platform independent way of describing implementation types, including arrays and structured types. This information is needed for marshaling and for connectors, which have to transform data from one language and platform domain into another. Inspections of the type model for different languages can determine the conformance possibilities for the language types. For example, a long type in Java is often identical to a binary type (computational-5) in COBOL, and if so, the types may be inter-converted without side effect. On the other hand, an alphanumeric type in COBOL is fixed in size and if mapped to a Java type, loses this property. When converted back from Java to COBOL, the COBOL truncation rules may not apply, resulting in computation anomalies. In addition, tools that mix languages in a server environment (e.g., Java and COBOL in CICS and IMS) should find it useful as a way to determine how faithfully one language can represent the types of another.

Therefore, an instance of the type descriptor metamodel describes the physical representation of a specific data type for a particular platform and compiler.

4. a. TDLang Metamodel

The TDLang metamodel serves as base classes to CAM language metamodels by providing a layer of abstraction between the Type Descriptor metamodel and any CAM language metamodel. All TDLang classes are abstract and common to all the CAM language metamodels. All associations between TDLang classes are marked as "volatile," "transient," or "derived" to reflect that the association is derived from the language metamodel. The TDLang model does not provide any function on its own, but it is the type target for the association from the Type Descriptor metamodel to the language metamodels.

FIG. 9 illustrates the structure of the TDLang Metamodel, with the TDLangClassifier 501, the TDLangComposedType 503 and the TDLangElement 505.

With the TDLang base classes, the Type Descriptor metamodel can be used as a recipe for runtime data transformation (or marshaling) with the language-specific metamodel for overall data structures and field names, without duplicating the aggregation associations present in the language model.

4. b. Type Descriptor Metamodel

This metamodel is a MOF Class instance at the M2 level. FIG. 10 shows the relationships within the type descriptor Metamodel, including the PlatformCompilerType 601, the InstanceTDBase 603, the ArrayTD 605, the AggregateInstanceTD 607, the Simple InstanceTD 609, and the InstanceType 611. The InstanceType 611 comprises definitions of the StringTD 613, the AddressTD 615, the NumberTD 617, and the FloatTD 619. FIG. 11 illustrates a higher level view of the TDLanguageElement and the PlatformCompilerType 601. FIG. 12 illustrates enumerations of signcoding 801, lengthEncoding 803, floatType 805, accessor 807, packedDecimalSign 809, and bitModePad 811.

4. c. Type Descriptor and Language models

The Type Descriptor model is attached to the CAM Language model by a navigable association between TDLangElement and InstanceTDBase. TDLangElement is the base language model type used to represent a declared data item, i.e., an instance of a type. InstanceTDBase is the base Type Descriptor model type used to represent the implementation-specific instance of this same declared data item. InstanceTDBase is abstract; only one of its subtypes may be instantiated.

It is possible that a data item declared in a programming language may have different implementations. These differences are induced by hardware platform, system platform, and compiler differences. This possibility is modeled by the PlatformCompilerType model type. The association between TDLangElement and PlatformCompilerType is many to one, and the association between PlatformCompilerType and InstanceTDBase is one to one. To navigate from the language model, it is necessary to know what PlatformCompilerType is to be assumed. It is possible that an implementation, upon importing a model instance, will wish to remove from the model the PlatformCompilerType instances that are not of interest.

The association between TDLangElement and InstanceTDBase is modeled in this manner to allow for extending the model to include an association between PlatformCompilerType and a new type that more fully describes the hardware platform, the system platform, and the compiler.

Data element instances may be defined as repeating groups or arrays. This is modeled as a one to many association between InstanceTDBase and the ArrayTD model type. There would be one ArrayTD instance in this association for each dimension, subscript, or independent index of the data element. These instances hold information about the bounds and accessing computations.

The association is ordered in the same order as the corresponding association in the language model, and reflects the syntactic ordering of the indices as defined by the programming language. The rationale for this choice is the resulting equivalence of navigation and processing algorithms between the language model and the Type Descriptor model. Another choice, perhaps more advantageous to marshaling engines, would be to have the ordering of the indices from the smallest stride to the largest. This allows a marshaling engine to process the array in its natural storage order, assuming it is laid out in the usual contiguous fashion. A marshaling engine can compute this order by re-sorting the association targets according to the stride formulas if desired.

Array information may be a complex property of the data element or of its type, and various languages and programming practices seem to fall on either side. The typedef facility of C and C++ allows the definition of some array types from typedefs, but only where the array definitions are applied to the topmost elements of typedef aggregates. For example, consider the following typedef:

```
typedef struct {
    int A;
    struct {
        int C;
        char D;
        struct {
            int F;
            int G;
        }E;
    }B;
}X;
```

This typedef can be used to create a new typedef for a fixed size array, e.g.

typedef X Q[10];

But it is not possible to create a new typedef from X that makes any of the subcomponents of X, e.g., D or E, into an array. This example and many others point out the unclear status of array definitions in typed languages.

An InstanceTDBase type has two concrete subtypes, SimpleInstanceTD and AggregateInstanceTD. SimpleInstanceTD models data elements without subcomponents, while AggregateInstanceTD models data elements with subcomponents. To find the subcomponents of an AggregateInstanceTD, one must navigate back to the corresponding data element declaration in the CAM language model. There, the association between an aggregate type and its subcomponents may be navigated, leading to a set of subcomponent data elements, each of which has one or more corresponding instances in the Type Descriptor model. This introduces some model navigation complexity, but avoids duplicating the aggregation hierarchy in both the language and the Type Descriptor models. The additional processing complexity of traversal is not great, and considerable simplification is obtained in algorithms that would modify the model to add, delete or rearrange subcomponents in an aggregation.

A SimpleInstanceTD model type is also associated one to one with a BaseTD model type. The BaseTD model type is specialized to hold implementation information that is common for all data elements of the same language type. The information that describes a 32-bit signed binary integer on a specific hardware/software platform is thus instantiated only once in a given model instantiation, no matter how many data elements may be declared with this type.

One may contemplate an association between TDLangClassifier and BaseTD matching the association between TDLangElement and InstanceTDBase. However, this is problematic in that constructions that the language regards as simple types (e.g., strings) may not map directly to simple hardware/software types. Rather than introduce more mechanisms into the Type Descriptor model to describe string implementations, a specialization of BaseTD is utilized which describes the common string implementations. Various attributes in the TypeDescriptor model are suffixed with the string "formula." These attributes contain information that may in some cases be impossible to compute without access to data created only at run-time. An example is the current upper bound of a variable-sized array or the offset to an element that follows another element whose size is only known at run-time. Such information could be included as values in a model instance, but this would require a model instance for each run-time instance, and would mean that the model could only be constructed at run-time, requiring the model definition to include factories and other apparatus to create model instances at run-time. A model that can be constructed from platform and compiler knowledge is much more useful, and the formulas provide a way to define concrete values when the run-time information is available. These formulas may be interpreted by marshaling engines, or they may be used to generate marshaling code, which is loaded and executed by the marshaling engine on demand.

4. d. Formulas

As used in connection with formulas, "field" refers to a component of a language data structure described by the Type Descriptor model, while "attribute" denotes part of the model, and has a value representing a "property" of the field. Thus the value of a field means a run-time value in a particular instance of a language data structure, whereas the value of an attribute is part of the description of a field in a language data structure, applies to all instances of the data structure, and is determined when the data structure is modeled.

For most attributes in an instance of the Type Descriptor model, the value of the attribute is known when the instance is built, because the properties of the fields being described, such as size and offset within the data structure, are invariant. But if a field in a data structure is defined using the COBOL OCCURS DEPENDING ON construct or the PL/I Refer construct, then some properties of the field (and properties of other fields that depend on that field's value) cannot be determined when the model instance is built.

Properties that can be defined using these language constructs are string lengths and array bounds. A property that could indirectly depend on these language constructs is the offset of a field within a structure, if the field follows a variable-size field.

In order to handle these language constructs, properties of a field that could depend on these constructs (and thus the values of the corresponding attributes), are defined with strings that specify a formula that can be evaluated when the model is used.

However, if a property of a field is known when the model instance is built, then the attribute formula simply specifies an integer value. For example, if a string has length 17, then the formula for its length is "17".

The formulas mentioned above are limited to the following:
Unsigned integers
The following arithmetic integer functions

| | |
|---|---|
| neg(x): = −x | // prefix negate |
| add(x,y): = x + y | // infix add |
| sub(x,y): = x − y | // infix subtract |
| mpy(x,y): = X*y | // infix multiply |
| div(x,y): = x/y | // infix divide |
| max(x,y): = max(x,y) | |
| min(x,y): = min(x,y) | | mod(x,y):=x mod y

The mod function is defined as mod(x,y)=r where r is the smallest non-negative integer such that x−r is evenly divisible by y. So mod(7,4) is 3, but mod(−7,4) is 1. If y is a power of 2, then mod(x,y) is equal to the bitwise-and of x and y−1.

The val function

The val function returns the value of a field described by the model. The val function takes one or more arguments, and the first argument refers to the level-1 data structure containing the field, and must be either:

the name of a level-1 data structure in the language model the integer 1, indicating the level-1 parent of the variable-size field. In this case, the variable-size field and the field that specifies its size are in the same data structure, and so have a common level-1 parent.

The subsequent arguments are integers that the specify the ordinal number within its substructure of the (sub)field that should be dereferenced.

By default, COBOL data fields within a structure are not aligned on type-specific boundaries in storage. For example, the "natural" alignment for a four-byte integer is a full-word storage boundary. Such alignment can be specified by using the SYNCHRONIZED clause on the declaration. Otherwise, data fields start immediately after the end of the preceding field in the structure. Since COBOL does not have bit data, fields always start on a whole byte boundary.

For PL/I, the situation is more complicated. Alignment is controlled by the Aligned and Unaligned declaration attributes. By contrast with COBOL, most types of data, notably binary or floating-point numbers, are aligned on their natural boundaries by default.

4. d. i) Formula Examples
4. d. i) a) COBOL

The examples use the proposed inline comment indicator "*>" from the draft standard. It is not yet legal COBOL usage.

1. Consider the Following Data Description:

| *> Field | Offset |
|---|---|
| 01 Used-Car. | *> "0" |
| 02 Summary. | *> "0" |
| 03 Make pic x(36). | *> "0" |
| 03 Model pic x(44). | *> "36" |
| 03 VIN pic x(13). | *> "80" |
| 03 Color pic x(10). | *> "93" |
| 88 Red value 'Red'. | |
| 88 White value 'White'. | |
| 88 Blue value 'Blue'. | |

-continued

| *> Field | Offset |
|---|---|
| 02 History. | *> "103" |
| 03 Mileage pic 9(6). | *> "103" |
| 03 NumClaims binary pic 9. | *> "109" |
| 03 InsCode pic x. | *> "111" |
| 03 Claims. | *> "112" |
| 04 Claim occurs 1 to 9 times depending on NumClaims. | *> stride(1) = "157" |
| 05 ClaimNo pic x(12). | |
| 05 ClaimAmt binary pic 9(5). | |
| 05 Insurer pic x(38). | |
| 05 Details pic x(100). | |
| 02 Price comp pic 9(5)v99. | *> "add(112,mpy(val(1,2,2),157))" |

The offset of Model is straightforward, and is given by the formula "36". So is that of Claims, which is "112".

But because the array Claim can occur a variable number of times, the structure History is a variable-size field. Thus the offset of Price, which immediately follows Claims, requires a more complicated formula, involving the array stride (the distance between successive elements along a specific dimension). For Claim, there is only one dimension, and the formula for its stride is "154". Thus the formula for the offset of Price is:

"add(112,mpy(val(1,2,2),154))"

The first argument of the val function is 1, meaning that the field containing the value at run-time, NumClaims, is in the same level-1 structure, Used-Car, as the field, Price, whose offset is specified by the formula. The other two arguments are 2 and 2. The first 2 refers to the second immediate subcomponent, History, of Used-Car. The second 2 means that the field to be dereferenced is the second component of History, that is, NumClaims.

If the OCCURS DEPENDING ON object were in a separate structure, the third subcomponent of level-1 structure Car-Data, say, then the val function would be "val(Car-Data,3)".

COBOL structure mapping is top-down, although the direction doesn't make any difference unless the SYNCHRONIZED clause is specified on the data declaration. Specifying SYNCHRONIZED forces alignment of individual fields on their natural boundaries, and thus introduces "gaps" into the structure mapping. Consider the following data structure, which is identical to the previous example, except for the SYNCHRONIZED clause:

| *> Field | Offset |
|---|---|
| 01 Used-Car SYNCHRONIZED | *> "0" |
| 02 Summary. | *> "0" |
| 03 Make pic x(36). | *> "0" |
| 03 Model pic x(44). | *> "36" |
| 03 VIN pic x(13). | *> "80" |
| 03 Color pic x(10). | *> "93" |
| 88 Red value 'Red'. | |
| 88 White value 'White'. | |
| 88 Blue value 'Blue'. | |
| 02 History. | *> "103" |
| 03 Mileage pic 9(6). | *> "103" |
| 03 NumClaims binary pic 9. | *> "110" |
| 03 InsCode pic x. | *> "112" |
| 03 Claims. | *> "113" |
| 04 Claim occurs 1 to 9 times depending on NumClaims. | *> stride(1) = "160" |
| 05 ClaimNo pic x(14). | |
| 05 ClaimAmt binary pic 9(5). | |

-continued

| *> Field | Offset |
|---|---|
| 05 Insurer pic x(39). | |
| 05 Details pic x(100). | |
| 02 Price comp pic 9(5)v99. | *> |
| "add(113,mpy(val(1,2,2),160)),3)" | |

To position the binary fields on their appropriate half-word or full-word storage boundaries, COBOL introduces padding, known as "slack bytes", into the structure. Working top-down, this padding is introduced immediately before the field needing alignment. So there is one byte of padding between Mileage and NumClaims.

For an array, such as Claim, COBOL not only adjusts the padding within an element, but also the alignment of each element of the array. In the example, the first occurrence of Claim starts one byte past a full-word boundary. Because the field ClaimNo is an exact number of full-words long, it ends one byte past a full-word boundary, so COBOL inserts three bytes of padding immediately before the binary full-word integer ClaimAmt. And to align subsequent occurrences, so that they too start one byte past a full-word boundary like the first, and can thus have an identical configuration, COBOL adds three bytes of padding at the end of each occurrence.

Finally, after padding, each occurrence of Claim (starts and) ends one byte past a full-word boundary, so COBOL puts three bytes of padding before the binary field Price. As a result of all these extra bytes, the formula for the offset of Price has changed considerably from the unaligned example, and is now:

"add(add(113, mpy(val(1,2,2),160)),3)"

There are several differences between the OCCURS DEPENDING ON construct and PL/I's Refer option. Storage for COBOL structures is always allocated at the maximum size, whereas PL/I structures are allocated at the actual size specified by the Refer option. It is legal and usual to change the number of occurrences in a particular instance of a variable-size COBOL array, and this has the effect of changing the location and offset of any fields that follow the array. For PL/I, the value of the Refer object of a particular instance of a structure is intended to be fixed during execution Thus aligned objects following a variable-size field are always correctly aligned for each instance of the structure, because the amount of padding is computed uniquely for each instance, as determined by the Refer option. By contrast, the amount of padding for any aligned fields following a variable-size COBOL array is computed assuming the maximum array size, and is fixed at compile time. If the array is smaller than its maximum size, then the alignment will typically be incorrect. For instance in this example:

1 a sync.
2 b binary pic 9.
2 c pic x occurs 1 to 5 times depending on b.
2 d binary pic 9(9).

COBOL inserts one byte between c and d. The alignment of d is therefore correct for only two values of b, the maximum, 5, and 2.

As noted above, the formulas describe not only offsets of fields within a structure, but also properties of arrays, such as bounds and strides. COBOL does not have true multi-dimensional arrays, although element references do use multiple subscripts. Instead, COBOL has arrays of arrays, as in the following simple example:

| | |
|---|---|
| 1 a. | *< offset = "0" |
| 2 d1 occurs 5 times. | *<offset = "0" |
| | *<lbound(1) = "1" |
| | *<hbound(1) = "5" |
| | *<stride(1) = "168" |
| 3 d2 occurs 6 times. | *<offset = "0" |
| | *<lbound(2) = "1" |
| | *<hbound(2) = "6" |
| | *<stride(2) = "28" |
| 4 el binary pic 9(9) occurs 7 times. | *< offset = "0" |
| | *<lbound(3) = "1" |
| | *<hbound(3) = "7" |
| | *<stride(3) = "4" |

The program can refer to slices of the array by subscripting the higher-level container fields, for example, d1(2) or d2(3, 4), but the normal kind of reference is to the low-level elements using the full sequence of subscripts, for instance, el(4, 5, 6). To locate element el(m, n, o) using these stride formulas, one would take the address of a and add to it $(m-1)*168+(n-1)*28+(o-1)*4$. For COBOL, the lower bound of an array subscript is always 1. That is, the first element is always element(1), and vice versa.

Needless to say, any dimension of the array can have the OCCURS DEPENDING ON clause, and the array can be followed by other fields, which complicates the formulas a lot. Consider the example:

| | |
|---|---|
| 1 a. | |
| 2 x1 binary pic 9. | *< offset = "0" |
| 2 x2 binary pic 9. | *< offset = "2" |
| 2 x3 binary pic 9. | *< offset "4" |
| 2 d1 occurs 1 to 5 times depending on x1. | *< offset = "6" |
| | *< lbound(1) = "1". |
| | *< stride(1) = "mpy(val(1,2),mpy(val(1,3),4))" |
| 3 d2 occurs 1 to 6 times depending on x2. | *< offset = "6" |
| | *< lbound(2) = "1" |
| | *< hbound(2) = "val(1,2)" |
| 4 el binary pic 9(9) occurs 1 to 7 times depending on x3. | *< offset = "6" |
| | *< lbound(3) = "1" |
| | *< hbound(3) = "val(1,3)" |
| | *< stride(3) = "4" |
| 2 b binary pic 9(5). | *< offset = "see below!" |

Computing the address of a particular element still involves the stride formulas, but these are no longer simple integers. The address of element el(m, n, o) in the above example is given by taking the address of a and adding to it:

$(m-1)*stride(1)+(n-1)*stride(2)+(o-1)*stride(3)$, i.e., $(m-1)*4*val(1,3)*val(1,2)+(n-1)*4*val(1,3) +(o-1)*4$.

Similarly, these stride formulas are used in the formula for the offset of b:

add(6,mpy(val(1,1), mpy(val(1,2),mpy(4, val(1,3)))))

4. d. i). b). PL/I
1. Given the following structure

| dcl | | /* | offset | */ |
|---|---|---|---|---|
| 1 c | unaligned | /* | "0" | */ |
| ,2 c1 | | /* | "0" | */ |
| ,3 c2 | fixed bin(31) | /* | "0" | */ |
| ,3 c3 | fixed bin(31) | /* | "4" | */ |
| ,2 c4 | | /* | "8" | */ |

-continued

```
,3 c5    fixed bin(31)      /*  "0"                       */
,3 c6    fixed bin(31)      /*  "4"                       */
,3 c7    fixed bin(31)      /*  "8"                       */
,2 c8    fixed bin(31)      /*  "20"                      */
,2 c9    char( *refer(c7))  /*  "24"                      */
,2 c10   char(6)            /*  "add(24,val(1,2,3))"      */
,2 c11   char(4)            /*  "add(add(24,val(1,2,3)),6)" */
;
```

The offset of c3 would be given by the simple formula "4", but the offset of c10 would be given by the formula:

"add(24,val(1,2,3))"

The first argument in the above val function is 1, which indicates the current structure, c. The subsequent arguments are 2 and 3, indicating that the third element, c7, of the second level-2 field, c4, is the field to be dereferenced.

The offset of c11 is equal to the offset of c10 plus the length of c10 and would be given by the following formula:

"add(add(24,val(1,2,3)),6)"

PL/I structure mapping is not top-down, and this can be illustrated by examining the mapping of the following structure:

```
dcl                       /*  offset                      */
1 a based,                /*  "0"                         */
2 b,                      /*  "0"                         */
3 b1 fixed bin(15),       /*  "0"                         */
3 b2 fixed bin(15),       /*  "2"                         */
3 b3 fixed bin(31),       /*  "4"                         */
2 c,                      /*  "add(8,mod(neg(val(1,1,1)),4))" */
3 c1 char( n refer(b1)),  /*  "0"                         */
3 c2 fixed bin(31);       /*  "val(1,1,1)"                */
```

The value of b1 is given by val(1,1,1), and in order to put c2 on a 4-byte boundary, PL/I puts any needed padding before c (yes, not between c1 and c2), and hence the offset of c would be given by the following formula:

"add(8, mod(neg(val(1,1,1)), 4))"

So if b1 contains the value 3, then this formula becomes add(8,mod(neg(3),4)), which evaluates to 9. I.e., there is one byte of padding between the structure b and the structure c.

The model also uses these formulas to specify the bounds and strides in an array, where the stride is defined as the distance between two successive elements in an array.

For example, in the following structure, the second dimension of a.e has a stride specified by the formula "4", and the first dimension by the formula "20":

```
dcl
1 a,                      /* offset ="0"*/
2 b(4)fixed bin(31),      /* offset = "0"*/
                          /* lbound(1) "1" */
                          /* hbound(1) = "4" */
                          /* stride(1) = "4" */
2 c(4)fixed bin(31),      /* offset "16" */
                          /* lbound(1) = "1" */
                          /* hbound(1) = "4" */
                          /* stride(1) = "4" */
2 d(4) char(7) varying,   /* offset = "32" */
                          /* lbound(1) = "1" */
                          /* hbound(1) = "4" */
                          /* stride(1) = "9" */
```

-continued

```
2 e(4,5)fixed bin(31);    /* offset = "68" */
                          /* lbound(1) = "1" */
                          /* hbound(1) = "4" */
                          /* stride(1) = "20" */
                          /* lbound(2) = "1" */
                          /* hbound(2) = "5" */
                          /* stride(1) = "4" */
```

This means that to locate the element a.e(m,n), one would take the address of a.e and add to it $(m-1)*20+(n-1)*4$.

If the example were changed slightly to:

```
dcl
1 a(4),                   /* offset = "0" */
                          /* lbound(1) = "1" */
                          /* hbound(1) = "4" */
                          /* stride(1) = "40" */
2 b fixed bin(31),        /* offset = "0" */
2 c fixed bin(31),        /* offset = "4" */
2 d char(7) varying,      /* offset = "8" */
2 e(5) fixed bin(31);     /* offset = "20" */
                          /* lbound(1) = "1" */
                          /* hbound(1) = "5" */
                          /* stride(1) = "4" */
``` then there is padding between d and e, but the user of the type descriptor can be blissfully unaware and simply use the stride and offset formulas to locate any given array element.

The stride for a is "40", the stride for e is "4", and the offset for e is "20". This means that to locate the element a(m).e(n), one would take the address of a and add to it $(m-1)*40+20+(n-1)*4$.

Finally, if the example were changed again to:

```
dcl
1 a(4),                   /* offset = "0" */
                          /* lbound(1) = "1" */
                          /* hbound(1) = "4" */
                          /* stride(1) = "40" */
2 b fixed bin(31),        /* offset = "0" */
2 c(8) bit(4),            /* offset = "4" */
                          /* lbound(1) = "1" */
                          /* hbound(1) = "8" */
                          /* stride(1) = "4" */
2 d char(7) varying,      /* offset = "8" */
2 e(5) fixed big(31);     /* offset = "20" */
                          /* lbound(1) = "1" */
                          /* hbound(1) = "5" */
                          /* stride(1) = "4" */
``` then the computations for a.e are the same as above, but the computations for a.c become interesting.

The stride for a is still "40", the stride for c is "4" (but this "4" is a count of bits, not bytes), and the byte offset for c is "4". To locate the element a(m).c(n), one needs both a byte address and a bit offset. For the byte address, one would take the address of a and add to it $(m-1)*40+4+((n-1)*4)/8$. The bit offset of a(m).c(n) would be given by $mod((-1)*4,8)$.

4. e. Type Descriptor Specification 4. e. i. TDLang Metamodel Specification

TDLang Classes—General Overview. TDLang classes serve as a layer of abstraction between any CAM language model and the TypeDescriptor model.

Since any CAM language model can plug into the TDLang model, the Type Descriptor model only needs to understand how to interface with TDLang in order to access any CAM language model.

The TDLang model does not provide any function on its own and therefore only makes sense when it is attached to a language model. TDLang is common to all the CAM language models and is the type target for the association from TypeDescriptors to the language models.

Note all TDLang classes are abstract and they serve as the base classes to the language metamodels.

TDLangClassifier. TDLangClassifier is the parent class of all language-specific Classifier classes and TDLangComposedType. The TDLangSharedType association is derived from the language's "+sharedType" association from Element to Classifer class.

The association should be marked "volatile," "transient," or "derived" to reflect that the association is derived from the language model. The TDLangClassifier is derived from TDLangModelElement TDLangElement. TDLangElement is the parent class of all language-specific Element classes. The tdLangTypedElement association is derived from the language's "+typedElement" association from Classifer to Element class. The association should be marked "volatile", "transient", and "derived" to reflect that the association is derived from the language model.

The tdLangElement association is derived from the language's "+element" association from Classifer to Element class. The association should be marked "volatile," "transient," or "derived" to reflect that the association is derived from the language model.

TDLangComposedType. The TDLangComposedType is the parent class of all language-specific ComposedTypes. The TDLangGroup association is derived from the language's "+group" association from Element to ComposedType class. The association should be marked "volatile," "transient," or "derived" to reflect that the association is derived from the language model. The TDLangComposedType is derived from TDLangClassifier.

4. e. ii. Type Descriptor Metamodel Specification

The Type Descriptor package defines a model for describing the physical implementation of a data item type. This model is language neutral and can be used to describe the types of many languages. Inspections of the type model for different languages can determine the conformance possibilities for the language types. For example, a long type in Java is often identical to a binary type in COBOL, and if so, the types may be interconverted without side effect. On the other hand, an alphanumeric type in COBOL is fixed in size and if mapped to a Java type, will lose this property. When converted back from Java to COBOL, the COBOL truncation rules may not apply, resulting in computation anomalies.

AggregateInstanceTD. For each instance of an aggregate, there is an instance of this class. To find the children of this aggregate, one must navigate the associations back to language Classifier then downcast to language Composed Type and follow the association to its children.

Derived from InstanceTDBase
Public Attributes:
  union : boolean=false
Distinguishes whether the aggregation is inclusive (e.g. a structure) or exclusive (e.g. a union).
If union=true, storage might be overlaid and as a result the interpretation of the content may be uncertain.
ArrayTD. ArrayTD holds information for array types.

Public Attributes:
  arrayAlign : int
Alignment requirements in addressible units for each element in the array. strideFormula : string
A formula that can be used to calculate the displacement address of any element in the array, given an index.
strideInBit : boolean
  True indicates strideFormula value in bits
  False indicates strideFormula value in bytes
upperBoundFormula : String
  Declared as a String for instances when this value is referenced by a variable.
  This attribute supplies the upperbound value of a variable size array
  Upperbound is required when traversing back up the entire structure.
lowerBoundFormula : String
  Declared as a String for instances when this value is referenced by a variable.
  This attribute supplies the lowerbound value of a variable size array.

InstanceTDBase. InstanceTD has instances for each declared variable and structure element.

To find the parent of any instance (if it has one) one must navigate the associations back to TDLangElement, follow the association to TDLangClassifier to locate the parent, then follow the associations back into the TypeDescriptor model.

Public Attributes:
offsetFormula : string
A formula for calculating the offset to the start of this instance.
This attribute is String because this field may not always be an integer value. For example, (value(n)+4) could be a possible value.
NOTE: The offset value is calculated from the top-most parent. (e.g., for a binary tree A→B, A→C, B-→D, B-→E. The offset to D is calculated from A to D, not B to D)
contentSizeFormula : string
Formula for calculating the current size of the contents
allocSizeFormula : string
Formula for calculating the allocated size of the instance
formulaInBit : boolean
True indicates offsetFormula, contentSizeFormula, and allocSizeFormula values are in bits
False indicates offsetFormula, contentSizeFormula, and allocSizeFormula values are in bytes
defaultEncoding : String
Physical encoding—how many bits used to encode code points, how are the code points mapped onto bit patterns
Contains info on how string content is encoded : EBCDIC, ASCII, UNICODE, UTF-8, UTF-16, codepage numbers, etc . . .
accessor : enumeration
Specifies access-rights for this element.
defaultBigEndian : boolean
True if this element is Big Endian format.
floatType : enumeration
Specifies this element's float type.

PlatformCompilerType. A specific data type for a particular platform and compiler. NOTE: There needs to be some way to identify the platform and compiler. This class can be specializedor have an attribute, or be simplified by putting an attribute on InstanceTDBase.

Public Attributes:
platformCompilerType : String
This attribute specifies the type of compiler used to create the data in the language model. Usage of this string is as follows:
"Vendor name, language, OS, hardware platform" (e.g., "1BM, COBOL, OS390, 390" or "IBM, PL/I, WinNT, Intel")
SimpleInstanceTD. An instance of a Simple type in the language model.
Derived from InstanceTDBase
NumberTD
All numbers representations.
Currently includes Integers and Packed Decimals
Note required fields for these types of Numbers:
*Integer*
Base=2
MSBU=0 or 1
Signed/Unsigned
Size (in bytes)=1,2,4,8 (16)
*Packed Decimal*
Base=10
MSBU=0
Signed
Width=1-63
*Float*
Base=2(IEEE), 16(Hex)
MSBU=0 or 1
Signed
Size (in bytes)=4,8,16
Encoding Details . . .
Derived from BaseTD
Public Attributes:
base : int
The base representation of this number. 2=binary, 10=decimal, 16=hex, . . .
baseWidth : int
Number of bits used to represent base:
e.g. binary=1, decimal=8, packed=4
baseInAddr : int
Number of baseWidth units in addressable storage units- e.g. decimal=1, packed=2, binary=8 where the addressable unit is a byte. If the addressable unit was a 32 bit word, decimal would be 4, packed would be 8, and binary would be 32.
baseUnits : int
Number of base units in the number. This times the base width must be less than or equal to the width times the addrUnit.
For example, a 24 bit address right aligned in a 32 bit word would have base=1, basewidth=24, baseInAddr=8, width=4.
signCoding : enumeration
A set of enumerations—2's complement, 1's complement, and sign magnitude for binary; zone signs for decimal, packed signs for packed decimal, and unsigned binary, unsigned decimal.
checkValidity : boolean
True if language model is required for picture string support
packedDecimalSign : enumeration
Used to determine the code point of the sign in COBOL decimal numbers, where the sign is combined with the leading or trailing numeric digit.
FloatTD
Floating points
Derived from BaseTD Public Attributes:
floatType : enumeration
Specifies this element's float type.
1 StringTD
Alphanumeric type
Derived from BaseTD
Public Attributes:
encoding : String
Physical encoding—how many bits used to encode code points, how are the code points mapped onto bit patterns
Contains info on how string content is encoded : EBCDIC, ASCII, UNICODE, UTF-8, UTF-16, codepage numbers, etc . . .
lengthEncoding : enumeration
Possible values for lengthEncoding:
  Fixed length (where total length equals declared string length)
  Length prefixed (where total length equals declared string length plus length of header bytes; usually 1, 2, or 4 bytes)
  Null terminated (known as varyingZ strings in PL/I) (where a null symbol is added to the end of string; so the maximum length could be up to declared string length plus one byte to represent null character)
maxLengthFormula : String
Formula specifying the maximum length of this string.
checkValidity : boolean
True if language model is required for picture string support
textType : String=Implicit
Value is 'Implicit' or 'Visual'
orientation : StringTD=LTR
Value is 'LTR', 'RTL', 'Contextual LTR', or 'Contextual RTL'
where LTR=Left to Right
and RTL=Right to Left
Symmetric : boolean=true
True if symmetric swapping is allowed
numeralShapes : String=Nominal
Value is 'Nominal', 'National', or 'Contextual'
textShape : String=Nominal
Value is 'Nominal', 'Shaped', 'Initial', 'Middle', 'Final', or 'Isolated'
AddressTD
Type to represent pointers/addresses
Rationale for this class:
Addresses should be considered separate from NumberTD class because some languages on certain machines (e.g., IBM 400) represent addresses with additional information, such as permission type (which is not represented in NumberTD class)
Derived from BaseTD
Public Attributes:
permission : String
Specifies the permission for this address. Used primarily for AS/400 systems.
bitModePad : enumeration
Specifies the number of bits for this address. Used to calculate padding.
BaseTD
The base class of typeDescriptor.
The BaseTD model type is specialized to hold implementation information which is common for all data elements of the same language type. The information which describes a 32 bit signed binary integer on a specific hardware/software platform is thus instantiated only once in a given model instantiation, no matter how many data elements may be declared with this type.
Public Attributes:
addrUnit : enumeration
Number of bits in storage addressable unit
bit/byte/word/dword
width : int
Number of addressable storage units in the described type. This can be 1, 8, 16, 32 bits.
alignment : int
Required alignment of type in address space—e.g. word aligned 32 bit integer would have alignment of 4
nickname : int
Name of the base element. This should uniquely identify an instance of a simple type to allow logic based on name rather than logic based on combinations of attributes. E.g. "S390Binary31_0" for a 32 bit S/390 unscaled binary integer
bigEndian : boolean
True if this element is Big Endian format.
Stereotypes
bitModePad
Public Attributes:
16 bit :
24 bit :
31 bit :
32 bit :
64 bit :
128 bit :
signCoding
Note that this model does not include the following COBOL usages:
1 POINTER
   PROCEDURE-POINTER
   OBJECT REFERENCE
Public Attributes:
twosComplement :
onesComplement :
signMagnitude :
zoneSigns :
packedSigns :
unsignedBinary :
unsignedDecimal :
lengthEncoding :
Public Attributes:
fixedLength :
lengthPrefixed :
nullTerminated :
FloatType:
Public Attributes:
Unspecified :
IEEEextendedIntel :
For IEEE extended floats running on Intel Platform
IEEEextendedAIX :
For IEEE extended floats running on AIX Platform
IEEEextendedOS390 :
For IEEE extended floats running on OS/390 Platform
EEEextendedAS400 :
For IEEE extended floats running on AS400 Platform
IEEEnonextended :
For IEEE non-extended floats
IBM390Hex :
For Hexadecimal floats running on IBM OS/390
IBM400Hex :
For Hexadecimal floats running on IBM AS400
accessor
Public Attributes:
ReadOnly :
WriteOnly :
ReadWrite :
NoAccess :
packedDecimalSign
Public Attributes:
MVS :
MVSCustom :
NT/OS2/AIX:
5. Language Metamodels
5. a. COBOL Metamodel
The COBOL metamodel is used by enterprise application programs to define data structures (semantics) which represent connector interfaces.
FIG. 13 illustrates a COBOL metamodel to define data structure semantics which represent connector interfaces. This metamodel is also a MOF Class instance at the M2 level. FIG. 14 illustrates the associations between the COBOL metamodel with the TDLang base classes which are the TDLangClassifier, the TDLanguageComposedType, and the TDLangElement. FIG. 15 illustrates an enumeration of the COBOL usage values in the COBOL Metamodel.
The goal of this COBOL model is to capture the information that would be found in the Data Division. This model is intended to be used only as read-only to convert COBOL data division into it's XML equivalent. This model is not intended to be used as a converter from XML code into a COBOL data division equivalent. As a result, initialValues of elements are not captured in the model.
COBOLSimpleType
  COBOLSimpleType is an abstract class that contains attributes shared by all simple types in the COBOL language.
Derived from COBOLClassifier
Public Attributes:
usage : COBOLUsageValues
  Usage contains the data type as defined in COBOLUsageValues.
  Usage defines the format of the data in memory. If none is specified in the COBOL source, the default is "display". Note that the popular COMP-3 is equivalent to packed Decimal.
pictureString : String
  This is a canonical form of the picture string specified in the source. It is *not* necessarily identical to the picture string given in the program!
  Procedure to arrive at the canonical form of the picture string:
  1. Expand any parenthesized characters
  2. Construct parenthesized representation for any sequences of identical characters which are longer than 4 characters.
  For example:
  start with XXX999(3)
  after step 1 you get: XXX99999
  after step 2 you get: XXX9(5)
  This canonical form yields the shortest equivalent picture string. The canonical form is beneficial for equivalence checking.
Synchronized : Boolean=false
  This boolean attribute corresponds to the SYNCHRONIZED or SYNC clause that may optionally be specified for an element.

Note that the COBOL language defines an additional clause—RIGHT/LEFT—which may follow the SYNCHRONIZED clause.

However, IBM's implementation of COBOL does support this additional CLAUSE as documentation only—all elements defined as SYNCHRONIZED are automatically synchronized left.

Public Operations:

getCanonicalPictureString (pictureString : String): String

Returns the condensed value of this string. For example, although the pictureString attribute may contain a picture string of 9999v99, getCanonicalPictureString() will return 9(4)v9(2) as the value.

COBOLElement

A COBOLElement represents every data definition in the COBOL program.

For example:
01 EMPLOYEE
 03 SERIAL-NUMBER PIC 9(5).
 03 DEPARTMENT PIC (5).
EMPLOYEE, SERIAL-NUMBER, and DEPARTMENT are all COBOLElements.

Derived from TDLangElement

Public Attributes:

level : String

Level refers to the data number this element was declared in.

redefined : Boolean=false

COBOLVariableLengthArray

A COBOLVariableLengthArray should be instantiated whenever the source for a COBOLElement has the following syntax:

LEVEL ELEMENTNAME1 OCCURS X1 TO X2 TIMES DEPENDING ON ELEMENTNAME2.

where X1 and X2 can be any integers 0 and higher and X2>X1. ELEMENTNAME2 must be defined before ELEMENTNAME 1.

COBOLVariableLengthArray has a single required association that specifies which element this array depends on.

Derived from COBOLFixedLengthArray

Public Attributes:

minUpper : Integer

In the case when maxUpper (max upper bound) belongs to VariableArray, maxUpper denotes the absolute upper bound of the array that can be allocated in memory. The actual maximum is denoted by the value of the element it refers to; which it gets by calling the "dependingon" association.

minUpper (minimum upper bound) is used to capture the COBOL syntax that reads OCCURS 4 to 7 TIMES DEPENDING ON X1. In this case, minUpper equals 4 and maxUpper equals 7, and the actual upper bound depends on the value of X1.

lower (lower bound) is always 1 (one) in the case of COBOL but is included for consistency with other languages and for clarity.

COBOLRedefiningElement

The REDEFINES clause allows you to use different data description entries to describe the same computer storage area.

Example of this class in use:
1 TEST
 2 Y PIC X(4)
 2 YR REDEFINES Y BINARY PIC 9(5)
TypeDef=False for Redefine/UNION Derived from COBOLElement COBOLComposedType The COBOLComposedType class represents a nested declaration that contains additional elements. COBOLComposedType class is an aggregate of COBOLElements COBOLComposedType is also the parent class of COBOLRedefines.

For example:
01 STUDENT.
05 CLASSES OCCURS 5.
10 CLASSNAME PIC X(20).
10 CLASSNUM PIC 9(4).
STUDENT is defined by COBOLComposedElement. Its aggregation only point to the CLASSES item, which is a COBOLElement. CLASSES is itself defined by a COBOLComposedElement.

Derived from COBOLClassifier, TDLangComposedType

COBOL88Element

COBOL88Element represents the COBOL 88 data level.

For example:
1 TESTX PIC.
 88 TRUEX VALUE 'T' 't'. *(TRUEX has 2 values)
 88 FALSEX VALUE 'F' 'f'. *(FALSEX has 2 values)
Where TRUEX and FALSEX are condition names for the TESTX variable if value equals ('T' or 't') or ('F' or 'f'), respectively.

So if TESTX='T' or 't' then TRUEX=TRUE and FALSEX=FALSE;

If TESTX='F' or 'f' then FALSEX=TRUE and TRUEX=FALSE;

Public Attributes:

name : String

Specifies the name or handle of the COBOL88Element.

COBOL88ElementValue

Example of this class in use:
1 TESTX PIC X.
 88 TRUEX VALUE 'T' 't'. *(TRUEX has 2 values)
 88 FALSEX VALUE 'F' 'f'. *(FALSEX has 2 values)
 88 UA VALUE 'A' THRU 'I' 'J' THRU 'R' 'S' THRU 'Z' '&' '–'.
*UA has 5 values; the first 3 are ranges Rationale for this class:

This class exists because each COBOL88Element can contain more than 1 value. For example, TRUEX contains 2 values, 'T' and 't'. Thus this class can be instatiated more than once (but at least once) per COBOL88Element (and thus the 1 . . . * cardinality)

For range values such as 'A' THRU 'I' in UA, lowerLimit='A', upperLimit='I', and range=true. Also note that when using the THRU keyword, lowerLimit must be less than upperLimit.

For non-range values such as 'T' and 't' we have decided that we would use lowerLimit field to represent the value.

Public Attributes:
lowerLimit : String
  lowerLimit refers to the lower bound of the THROUGH range
upperLimit : String
  upperLimit refers to the upper bound of the THROUGH range
Range : Boolean
  If range is set to true, literal-1 must be less than literal-2, unless the associated data item is a windowed date field.
COBOLAlphaNumericType
  The PICTURE character-string must consist of either of the following:
    The symbol
    Combinations of the symbols A, X, and 9 (A character-string containing all As or all 9s does not define an alphanumeric item.)
  Other clauses: USAGE DISPLAY must be specified or implied. Any associated VALUE clause must specify a nonnumeric literal or a figurative constant.
Derived from COBOLSimpleType
Public Attributes:
JustifyRight : Boolean=false
  This boolean corresponds to the JUSTIFIED (or JUST) clause. Note that JUST and JUST RIGHT carry the same meaning.
COBOLNumericEditedType
  The PICTURE character-string can contain the following symbols:
    B P V Z 9 0/, . + − CR DB * Cs
  Other clauses: USAGE DISPLAY must be specified or implied.
  Any associated VALUE clause must specify a nonnumeric literal or a figurative constant. The literal is treated exactly as specified; no editing is done.
  Edited Types are different from non-edited types in that the decimal character is stored in memory for edited types and not stored in non-edited types.
Derived from COBOLSimpleType
Public Attributes:
BlankWhenZero : Boolean
  This boolean corresponds to the BLANK WHEN ZERO clause.
  True if BLANK WHEN ZERO.
currencySign : String
  This string represents different currency signs used in the world, for example, $, £, DM, etc . . .
Decimal : Boolean
  The Decimal boolean exchanges the functions of the peroid and comma in picture strings and numeric values.
  If TRUE, decimals are used (e.g., 1,234.56)
  If FALSE, commas are used (e.g., 1.234,56)
COBOLNumericType
  Types of numeric items are:
    Binary
    Packed decimal (internal decimal)
    Zoned decimal (external decimal)
  The PICTURE character-string can contain only the symbols 9, P, S, and V.
  For numeric date fields, the PICTURE character-string can contain only the symbols 9 and S.
  Examples of valid ranges
    PICTURE Valid Range of Values
    9999 0 through 9999
    S99 −99 through +99
    S999V9 −999.9 through +999.9
    PPP999 0 through .000999
    S999PPP −1000 through −999000 and +1000 through +999000 or zero
  Other clauses : The USAGE of the item can be DISPLAY, BINARY, COMPUTATIONAL, PACKED-DECIMAL, COMPUTATIONAL-3, COMPUTATIONAL-4, or COMPUTATIONAL-5.
  Possible usage values for this class are 'binary', 'packedDecimal' and 'display', which are represented by comp-1 and comp-2 declarations, respectively.
Derived from COBOLSimpleType
Public Attributes:
Signed : Boolean
  This boolean corresponds to the SIGN clause.
  True if number is signed.
SignLeading : Boolean
  This attribute corresponds to the LEADING (versus TRAILING) clause.
  True if LEADING.
SignSeparate : Boolean
  This boolean corresponds to the SEPARATE clause.
  True is SEPARATE.
currencySymbol : char
  This character represents the symbol used in COBOL to represent currencySign. (e.g., $=$, L=£, D=DM, etc . . . )
trunc : String
  The Trunc option determines whether decimal picture constraints must be honored for binary data items.
  Values for Trunc are:
  STD, OPT, and BIN
  TRUNC(STD) conforms to the COBOL 85 Standard, while
  TRUNC(OPT) and
  TRUNC(BIN) are IBM extensions.
  For more information on the Trunc attribute, please refer to "COBOL/VSE Programming Guide"
numproc : String
  Numproc(PDF) imposes stricter standards on decimal sign values.
  Values for Numproc are:
  NOPDF, PDF, and MIG.
  Use NUMPROC(NOPFD) if you want the compiler to perform invalid sign processing. This option is not as efficient as NUMPROC(PFD); object code size will be increased, and there may be an increase in run-time overhead to validate all signed data.
  NUMPROC(NOPFD) and NUMPROC(MIG) conform to the COBOL 85 Standard.
Decimal : Boolean
  The Decimal boolean exchanges the functions of the peroid and comma in picture strings and numeric values.
  If TRUE, decimals are used (e.g., 1,234.56)
  If FALSE, commas are used (e.g., 1.234,56)
COBOL66Element
  COBOL66Element represents the COBOL 66 data level.

For example:
01 DATA-GROUP PIC 9.
  03 DATA I VALUE 1.
  03 DATA2 VALUE 2.
  03 DATA3 VALUE 3.
66 SUB-DATA RENAMES DATAI THROUGH DATA2.
66 AKA-DATA3 RENAMES DATA3.
In this example SUB-DATA refers to contents in DATA1 and DATA2.

Public Attributes:
name : String
  Specifies the name or handle of the COBOL66Element.
COBOLFixedLengthArray
  A COBOLFixedLengthArray should be instantiated whenever the source for a COBOLElement has the following syntax:
  LEVEL ELEMENTNAME OCCURS X TIMES.
  where X can be any integer 1 or higher.
  In the case when maxUpper (max upper bound) belongs to FixedArray, maxUpper denotes the upper bound of the array that is allocated in memory.
  lower (lower bound) is always 1 (one) in the case of COBOL but is included for consistency with other languages and for clarity.
COBOLDBCSType
  The PICTURE character-string can contain the symbol(s) G, G and B, or N.
  Each G, B or N represents a single DBCS character position.
  The entire range of characters for a DBCS literal can be used.
  Other clauses: When PICTURE clause symbol G is used, USAGE DISPLAY-1 must be specified.
  When PICTURE clause symbol N is used, USAGE DISPLAY-1 is assumed and does not need to be specified.
  Any associated VALUE clause must specify a DBCS literal or the figurative constant SPACE/SPACES.
  The DBCSType occupies 2 bytes per character.
Derived from COBOLSimpleType
COBOLAlphaNumericEditedType
  The PICTURE character-string can contain the following symbols:
  A X 9 B 0 /
  The string must contain at least one A or X, and at least one B or 0 (zero) or/.
  The contents of the item in standard data format must be two or more characters from the character set of the computer.
  Other clauses: USAGE DISPLAY must be specified or implied.
  Any associated VALUE clause must specify a nonnumeric literal or a figurative constant. The literal is treated exactly as specified; no editing is done.
  Edited Types are different from non-edited types in that the decimal character is stored in memory for edited types and not stored in non-edited types.
Derived from COBOLSimpleType
COBOLClassifier
  COBOLClassifier class is the parent class of COBOLComposedType and COBOLSimpleType and contains the 'typedef' attribute.
  The best way to think of the effect of TYPEDEFs in COBOL is as lexical substitution, similar to simple C macros. Replace the TYPE clause by everything following the TYPEDEF keyword. Then, after adjusting the level numbers appropriately, the result has to be legal COBOL (except for the adjusted level numbers themselves, which can exceed 49). The actual rules are quite complicated, as you might expect, so rather than describe those, here are some examples:
  A simple way of enforcing shop standards for financial data:
  Definition:
  1 uniform-amount typedef usage comp pic s9(6)v99 synchronized.
  Reference:
  1 account-record.
  . . .
    5 prior-balance type uniform-amount.
    5 current-balance type to uniform-amount.
  . . .
Derived from TDLangClassifier
Public Attributes:
Typedef : boolean
  User-defined types are introduced by using the TYPEDEF attribute, and referred to by the TYPE clause. If type is user-defined, 'typedef'=true.
  TypeDef=False for Redefine/UNION
name : String
  Specifies the name or handle of the COBOLClassifier.
COBOLAlphabeticType
  The PICTURE character-string can contain only the symbol A.
  The contents of the item in standard data format must consist of any of the letters of the English alphabet and the space character.
  Other clauses: USAGE DISPLAY must be specified or implied.
  Any associated VALUE clause must specify a nonnumeric literal containing only alphabetic characters, SPACE, or a symbolic-character as the value of a figurative constant.
Derived from COBOLSimpleType
Public Attributes:
JustifyRight : Boolean=false
  This boolean corresponds to the JUSTIFIED (or JUST) clause. Note that JUST and JUST RIGHT carry the same meaning.
COBOLObjectReferenceType
  The object reference type points to an object declared in COBOL as USAGE IS INDEX OBJECT REFERENCE METACLASS OF class-name-1" where class-name-1 is optional
Derived from COBOLSimpleType
Public Attributes:
className : String
  Refers to the name of the object this instance refers to.
COBOLSourceText
  This class contains the entire source code (including comments) and its associated line number.
Public Attributes:
source : String
fileName : String
COBOLUnicodeType
  The Unicode type reperesents data stored in Unicode format.
Derived from COBOLSimpleType
COBOLInternalFloatType
  The COBOLInternalFloat type captures the way floating points are represented in memory. For example, the value 123.45 is represented internally as 12345 with the implied decimal marked between 3 and 4.

Possible usage values for this class are 'float' and 'double', which are represented by comp-1 and comp-2 declarations, respectively.

Derived from COBOLSimpleType

COBOLExternalFloatType

The COBOLExternalFloat type captures the way floating points are displayed to the user. COBOLExternalFloatTypes are the same as COBOLNumericEditedTypes with the exception that the PIC has a +/− sign before the mantissa and the exponent. For example, the value 123.45 may be represented in ExternalFloatType as +12345 E −2

Possible usage values for this class are 'binary', 'packedDecimal' and 'display'.

Derived from COBOLSimpleType

COBOLAddressingType

COBOLAddressingType is used for index values, pointer values, and procedurePointer values.

Possible usage values for this class are 'index', 'pointer', and 'procedurePointer'.

Derived from COBOLSimpleType

COBOLElementInitialValue

Derived from TDLangElement

Public Attributes:

initVal : String valueKind : COBOLInitialValueKind=string_value

TOTALS:

1 Logical Packages

23 Classes

LOGICAL PACKAGE STRUCTURE

Logical View cobol

TDLang 5. b. PL/I Metamodel

The PLI language metamodel is used by enterprise application programs to define data structures (semantics) which represent connector interfaces. This metamodel is a MOF Class instance at the M2 level. FIG. 16 illustrates a PL/I language metamodel, which is usable by application programs to define data structures which represent connector interfaces. This metamodel is an MOF class instance at the M2 level. FIG. 17 illustrates the TDLangClassifier, the TDLanguageComposedType, and the TDLanguageElement for the PL/I Metamodel. FIG. 18 illustrates enumerations of Mode Values, Base Values, LengthTypes, and StringTypeValues for the PL/I Metamodel.

5. b. i. PL/I Metamodel Specification

PLI

The PLI language metamodel is used by enterprise application programs to define data structures (semantics) which represent connector interfaces, This language model for PL/I attempts to describe PL/I declares that have the storage class of either PARAMETER, STATIC or BASED. CONTROLLED, AUTOMATIC and DEFINED are not supported.

In the PL/I languages, extents (that is string lengths, area sizes and array bounds) may, in general, be declared as constants, as expressions to be evaluated at run-time, as asterisks, or as defined via the REFER option; however, none of these choices are valid for all storage classes.

Based variables whose extents are not constant and not defined via the REFER option are excluded from this model, as are parameters whose extents are specified via asterisks.

The INITIAL attribute (which is not valid for parameters in any case) will be ignored by the model.

PLISimpleType

PLISimpleType is an abstract class that contains attributes shared by all simple types in the PLI language.

Derived from PLIClassifier

PLIElement

A PLIDeclaration represents every data definition in the PLI program.

For example:

DCL 1 Employee,

2 Name,

3 Last char(29),

3 First char(29),

2 Deparment char(5);

where Eemployee, Name, Last, First, and Department are all PLI Elements.

ntation.

Derived from TDLangElement

Public Attributes:

level : String

PLIComposedType

PLTComposedType is a collection of member elements that can be structure, unions, or elementary variables and arrays. PLIComposedType has a single aggregation to include all the elements that are a part of this composition.

A structure is a data aggregate whose elements need not have identical attributes. Like an array, the entire tructure is given a name that can be used to refer to the entire aggregate of data. Unlike an array, however, each element of a structure also has a name.

A structure has different levels. At the first level is the structure name called a major structure. At a deeper level are the names of substructures called minor structures. At the deepest are the element names called elementary names. An elementary name in a structure can represent an array, in which case it is not an element variable, but an array variable.

The organization of a structure is specified in a DECLARE statement through the use of level numbers preceding the associated names; level numbers must be integers. A major structure name is declared with the level number 1. Minor structures and elementary names are declared with level numbers greater than 1.

The description of a major structure name is terminated by one of the following:

The declaration of another item with a level number 1

The declaration of another item with no level number

A semicolon terminating the DECLARE statement

A delimiter (usually a blank) must separate the level number and its associated name. For example, the items of a payroll can be declared as follows:

DECLARE 1 PAYROLL,

2 NAME,

3 LAST CHAR(20),

3 FIRST CHAR(15),

2 HOURS,
    3 REGULAR FIXED DEC(5,2),
    3 OVERTIME FIXED DEC(5,2),
  2 RATE,
    3 REGULAR FIXED DEC(3,2),
    3 OVERTIME FIXED DEC(3,2);
Indentation is only for readability. The statement could be written in a continuous string as DECLARE 1 PAYROLL, 2 NAME, 3 LAST CHAR(20), etc.

PAYROLL is declared as a major structure containing the minor structures NAME, HOURS, and RATE. Each minor structure contains two elementary names. You can refer to the entire structure by the name PAYROLL, or to portions of the structure by the minor structure names. You can refer to an element by referring to an elementary name.

The level numbers you choose for successively deeper levels need not be consecutive. A minor structure at level n contains all the names with level numbers greater than n that lie between that minor structure name and the next name with a level number less than or equal to n. PAYROLL might have been declared as follows:

DECLARE 1 PAYROLL,
  4 NAME,
    5 LAST CHAR(20),
    5 FIRST CHAR(15),
  2 HOURS,
    6 REGULAR FIXED DEC(5,2),
    5 OVERTIME FIXED DEC(5,2),
  2 RATE,
    3 REGULAR FIXED DEC(3,2),
    3 OVERTIME FIXED DEC(3,2);

This declaration results in exactly the same structuring as the previous declaration.

Derived from PLIClassifier, TDLangComposedType
Public Attributes:
Union : Boolean
PLIElementInitialValue
  The INITIAL attribute specifies an initial value or values assigned to a variable at the time storage is allocated for it. Only one initial value can be specified for an element variable. More than one can be specified for an array variable. A structure or union variable can be initialized only by separate initialization of its elementary names, whether they are element or array variables. The INITIAL attribute cannot be given to constants, defined data, noncontrolled parameters, and non-LIMITED static entry variables.
The INITIAL attribute has three forms.
  1. The first form, INITIAL, specifies an initial constant, expression, or function reference, for which the value is assigned to a variable when storage is allocated to it.
  2. The second form, INITIAL CALL, specifies (with the CALL option) that a procedure is invoked to perform initialization. The variable is initialized by assignment during the execution of the called routine. (The routine is not invoked as a function that returns a value to the point of invocation.)
  3. The third form, INITIAL TO, specifies that the pointer (or array of pointers) is initialized with the address of the character string specified in the INITIAL LIST. The string also has the attributes indicated by the TO keyword.

Derived from TDLangElement
Public Attributes:
initialValue : String
ValueType : PLIInitalValueType
PLIClassifier
  PLI type
Derived from TDLangClassifier
PLISourceText
  This class contains the entire source code (including comments) and its associated line number.
Public Attributes:
source : String
fileName : String
PLIComputationalType
  Computational types represent values that are used in computionals to produce a desired result. Arthmetic and string data consitute computional data
Derived from PLISimpleType
PLIArithmeticType
  Aritmetic data are rational numbers
Derived from PLIComputationalType
Public Attributes:
mode : ModeValues
PLIStringType
  a string is a sequence of contiguous characters, bit, cidechars, or graphics that are treated a a single data item
Derived from PLIComputationalType
PLIIntegerType
  Declared as Fixed Bin. with precision and scale factors. The prcision is the total number of digits and the scale is the number of digits to the right of the binary point.
  Example
  DCL bindata BINARY FIXED (7,3)
  could be used to present the number 1011. 111B that is 7 data bits, 3 of which is to the right of the binary point.
Derived from PLIArithmeticType
Public Attributes:
precision : Integer
scale : Integer
Signed : Boolean
BigEndian : Boolean=true
PLIFloatType
  has precision=2A decimal floating-point constant is a mantissa followed by an exponent. The mantissa is a decimal fixed-point constant.
  The exponent is the letter E followed by an optionally signed integer, which specifies a power of ten. Decimal floating-point constants have a precision (p), where p is the number of digits of the mantissa.
  Examples are:
    15E-23 has precision=2
    15E23 has precision=2)
    4E-3 has precision=1
    1.96E+07 has precision=3
    438E0 has precision=3
    3141593E-6 has precision=7
    0.003141593E3 has precision=9
  The last two examples represent the same value (although with different precisions).
  The data attributes for declaring decimal floating-point variables are DECIMAL and FLOAT. For example:
  DECLARE    LIGHT_YEARS    DECIMAL
    FLOAT(5);

LIGHT_YEARS represents decimal floating-point data items with at least 5 decimal digits.

A binary floating-point constant is a mantissa followed by an exponent and the letter B. The mantissa is a binary fixed-point constant. The exponent is the letter E, followed by an optionally signed decimal integer, which specifies a power of two. Binary floating-point constants have a precision (p) where p is the number of binary digits of the mantissa.

Examples are:
101101E5B has precision=6
101.101E2B has precision=6
11101E−28B has precision=5
11.01E+42B has precision=4

The data attributes for declaring binary floating-point variables are BINARY and FLOAT. For example:
DECLARE S BINARY FLOAT (16);
S represents binary floating-point data items with a precision of 16 binary digits.

The default precision is (21). The exponent cannot exceed three decimal digits. Binary floating-point data is stored as normalized hexadecimal floating-point. If the declared precision is less than or equal to (21), short floating-point form is used. If the declared precision is greater than (21) and less than or equal to (53), long floating-point form is used. If the declared precision is greater than (53), extended floating-point form is used.

Derived from PLIArithmeticType
Public Attributes:
base : BaseValues
precision : Integer
IEEE: Boolean=false
BigEndian : Boolean=true
PLIPackedType The data attributes for declaring decimal fixed-point variables are DECIMAL and FIXED. For example:
declare A fixed decimal (5,4);
specifies that A represents decimal fixed-point data of 5 digits, 4 of which are to the right of the decimal point.

These two examples:
declare B fixed (7,0) decimal;
declare B fixed decimal(7);
both specify that B represents integers of 7 digits.

This example
declare C fixed (7, −2) decimal;
specifies that C has a scaling factor of −2. This means that C holds 7 digits that range from −9999999*100 to 9999999*100, in increments of 100.

This example
declare D decimal fixed real(3,2);
specifies that D represents fixed-point data of 3 digits, 2 of which are fractional.

Derived from PLIArithmeticType
Public Attributes:
precision : Integer
scale : Integer
PLIPictureType
Numeric picture data is numeric data that is held in character form Derived from PLIArithmeticType
Public Attributes:
pictureString : String
PLICodedStringType
Derived from PLIStringType
Public Attributes:
type : StringTypeValues
varying : LengthType
PLIPictureStringType A character picture specification describes a fixed-length character data item, with the additional facility of indicating that any position in the data item can only contain characters from certain subsets of the complete set of available characters.

A character picture specification is recognized by the occurrence of an A or X picture specification character. The only valid characters in a character picture specification are X, A, and 9. Each of these specifies the presence of one character position in the character value, which can contain the following:

X Any character of the 256 possible bit combinations represented by the 8-bit byte.

A Any alphabetic character, #, @, $, or blank.

9 Any digit, or blank. (Note that the 9 picture specification character in numeric character specifications is different in that the corresponding character can only be a digit).

When a character value is assigned, or transferred, to a pictured character data item, the particular character in each position is checked for validity, as specified by the corresponding picture specification character, and the CONVERSION condition is raised for an invalid character. (However, if you change the value either via record-oriented transmission or using an alias, there is no checking).

For example:
DECLARE PART# PICTURE 'AAA99X';
PUT EDIT (PART#) (P'AAA99X');
The following values are valid for PART#:
'ABC12M'
'bbb09/'
'XYZb13'
The following values are not valid for PART# (the invalid characters are underscored):
'AB123M'
'ABC 1/2'
'Mb#A5;'

Derived from PLIStringType
Public Attributes:
pictureString : String
PLINonComputationalType
Represents values that are used to control execution of your program. It consists of the following data types—area, entry, label, file, format, pointer, and offset.

Derived from PLISimpleType
PLILabelType
A label is a label constant or the value of a label variable.

A label constant is a name written as the label prefix of a statement (other than PROCEDURE, ENTRY, PACKAGE, or FORMAT) so that during execution, program-control can be transferred to that statement through a reference to it. In the following line of code, for example, Abcde is a label constant.
Abcde : Miles=Speed*Hours;
The labelled statement can be executed either by normal sequential execution of instructions or by using the GO TO statement to transfer control to it from some other point in the program.

A label variable can have another label variable or a label constant assigned to it. When such an assignment is made, the environment of the source label is assigned to the target. If you declare a static array of labels to have initial values, the array is treated as nonassignable.

A label variable used in a GO TO statement must have as its value a label constant that is used in a block that is active at the time the GO TO is executed. Consider the following example:

```
declare Lbl_x label;
Lbl_a: statement;
    .
    .
    .
Lbl_b: statement;
    .
    .
    .
Lbl_x = Lbl_a;
    .
    .
    .
go to Lbl_x;
```

Lbl_a and Lbl_b are label constants, and Lbl_x is a label variable. By assigning Lbl_a to Lbl_x, the statement GO TO Lbl_x transfers control to the Lbl_a statement. Elsewhere, the program can contain a statement assigning Lbl_b to Lbl_x. Then, any reference to Lbl_x would be the same as a reference to Lbl_b.

This value of Lbl_x is retained until another value is assigned to it.

If a label variable has an invalid value, detection of such an error is not guaranteed. In the following example, transfer is made to a particular element of the array Z based on the value of I.

```
go to Z(I);
    .
    .
    .
Z(1): if X = Y then return;
    .
    .
    .
Z(2): A = A + B + C * D;
    .
    .
    .
Z(3): A = A + 10;
```

If Z(2) is omitted, GO TO Z(I) when I=2 raises the ERROR condition. GO TO Z(I) when I<LBOUND (Z) or I>HBOUND(Z) causes unpredictable results if the SUBSCRIPTRANGE condition is disabled.

Derived from PLINonComputationalType
PLIFormatType

The remote (or R) format item specifies that the format list in a FORMAT statement is to be used.

The R format item and the specified FORMAT statement must be internal to the same block, and they must be in the same invocation of that block.

A remote FORMAT statement cannot contain an R format item that references itself as a label-reference, nor can it reference another remote FORMAT statement that leads to the eferencing of the original FORMAT statement.

Conditions enabled for the GET or PUT statement must also be enabled for the remote FORMAT statement(s) that are referred to.

If the GET or PUT statement is the single statement of an ON-unit, that statement is a block, and it cannot contain a remote format item.

For example:
    DECLARE SWITCH LABEL;
    GET FILE(IN) LIST(CODE);
    IF CODE=1
        THEN SWITCH=L1;
        ELSE SWITCH=L2;
    GET FILE(IN) EDIT (W,X,Y,Z)
        (R(SWITCH));
    L1: FORMAT (4 F(8,3));
    L2: FORMAT (4 E(12,6));

SWITCH has been declared to be a label variable; the second GET statement can be made to operate with either of the two FORMAT statements.

Data format items describe the character or graphic representation of a single data item. They are:
A—Character
B—Bit
C—Complex
E—Floating point
F—Fixed point
G—Graphic
P—Picture The remote format item specifies a label reference whose value is the label constant of a FORMAT statement located elsewhere. The FORMAT statement contains the remotely situated format items. The label reference item is: R.

The first data format item is associated with the first data list item, the second data format item with the second data list item, and so on. If a format list contains fewer data format items than there are items in the associated data list, the format list is reused. If there are excessive format items, they are ignored.

Suppose a format list contains five data format items and its associated data list specifies ten items to be transmitted. The sixth item in the data list is associated with the first data format item, and so forth.

Suppose a format list contains ten data format items and its associated data list specifies only five items. The sixth through the tenth format items are ignored.

Example:
    GET EDIT (NAME, DATA, SALARY)(A(N), X(2), A(6), F(6,2));

This example specifies that the first N characters in the stream are treated as a character string and assigned to NAME. The next 2 characters are skipped. The next 6 are assigned to DATA in character format. The next 6 characters are considered an optionally signed decimal fixed-point constant and assigned to SALARY.

Derived from PLINonComputationalType
PLIEntryType

Entry data can be an entry constant or the value of an entry variable.

An entry constant is a name written as a label prefix to a PROCEDURE or ENTRY statement, or a name declared with the ENTRY attribute and not the VARIABLE attribute, or the name of a mathematical built-in function.

An entry constant can be assigned to an entry variable. For example:

P: PROCEDURE;
DECLARE EV ENTRY VARIABLE, (E1,E2) ENTRY;
EV=E1;
CALL EV;
EV=E2;
CALL EV;

P. E1, and E2 are entry constants. EV is an entry variable. The first CALL statement invokes the entry point E1. The second CALL invokes the entry point E2.

The following example contains a subscripted entry reference:

DECLARE (A,B,C,D,E) ENTRY,
DECLARE F(5) ENTRY VARIABLE INITIAL (A,B,C,D,E);
DO I=1 TO 5;
CALL F(I) (X,Y,Z);
END;

The five entries A, B, C, D, and E are each invoked with the parameters X, Y, and Z.

When an entry constant which is an entry point of an internal procedure is assigned to an entry variable, the assigned value remains valid only for as long as the block that the entry constant was internal to remains active (and, for recursive procedures, current).

ENTRYADDR built-in function and pseudovariable allows you to get or set the address of the entry point of a PROCEDURE or an ENTRY in an entry variable. The address of the entry point is the address of the first instruction that would be executed if the entry were invoked. For example:

PTR1=ENTRYADDR(ENTRY_VBL);

obtains the address of the entry point, and

ENTRYADDR(ENTRY_VBL)=PTR2;

Derived from PLINonComputationalType
Public Attributes:
Limited : Boolean
PLIAreaType Area variables describe areas of storage that are reserved for the allocation of based variables. This reserved storage can be allocated to, and freed from, based variables by the ALLOCATE and FREE statements. Area variables can have any storage class and must be aligned.

When a based variable is allocated and an area is not specified, the storage is obtained from wherever it is available. Consequently, allocated based variables can be scattered widely throughout main storage. This is not significant for internal operations because items are readily accessed using the pointers. However, if these allocations are transmitted to a data set, the items have to be collected together. Items allocated within an area variable are already collected and can be transmitted or assigned as a unit while still retaining their separate identities.

You might want to identify the locations of based variables within an area variable relative to the start of the area variable. Offset variables are provided for this purpose.

An area can be assigned or transmitted complete with its contained allocations; thus, a set of based allocations can be treated as one unit for assignment and input/output while each allocation retains its individual identity.

The size of an area is adjustable in the same way as a string length or an array bound and therefore it can be specified by an expression or an asterisk (for a controlled area or parameter) or by a REFER option (for a based area).

The area size for areas that have the storage classes AUTOMATIC or CONTROLLED is given by an expression whose integer value specifies the number of reserved bytes.

If an area has the BASED attribute, the area size must be an integer unless the area is a member of a based structure and the REFER option is used.

The size for areas of static storage class must be specified as an integer.

Examples of AREA declarations are:
DECLARE AREA1 AREA(2000),
AREA2 AREA;

In addition to the declared size, an extra 16 bytes of control information precedes the reserved size of an area. The 16 bytes contain such details as the amount of storage in use.

The amount of reserved storage that is actually in use is known as the extent of the area. When an area variable is allocated, it is empty, that is, the area extent is zero. The maximum extent is represented by the area size. Based variables can be allocated and freed within an area at any time during execution, thus varying the extent of an area.

When a based variable is freed, the storage it occupied is available for other allocations. A chain of available storage within an area is maintained; the head of the chain is held within the 16 bytes of control information. Inevitably, as based variables with different storage requirements are allocated and freed, gaps occur in the area when allocations do not fit available spaces. These gaps are included in the extent of the area.

No operators, including comparison, can be applied to area variables.

Derived from PLINonComputationalType
PLIPointerType

A pointer variable is declared contextually if it appears in the declaration of a based variable, as a locator qualifier, in a BASED attribute, or in the SET option of an ALLOCATE, LOCATE, or READ statement. It can also be declared explicitly.

Derived from PLINonComputationalType
PLIFileType

The FILE attribute specifies that the associated name is a file constant or file variable.

The FILE attribute can be implied for a file constant by any of the file description attributes. A name can be contextually declared as a file constant through its appearance in the FILE option of any input or output statement, or in an ON statement for any input/output condition.

Derived from PLINonComputationalType
PLIOffsetType

You might want to identify the locations of based variables within an area variable relative to the start of the area variable. Offset variables are provided for this purpose.

Derived from PLINonComputationalType
Public Attributes:
BigEndian : Boolean=true
PLIAlias
    An alias is a type name that can be used wherever an explicit data type is allowed. Using the DEFINE ALIAS statement, you can define an alias for a collection of data attributes. In this way, you can assign meaningful names to data types and improve the understandability of a program. By defining an alias, you can also provide a shorter notation for a set of data attributes, which can decrease typographical errors.
    Example

```
define alias Name char(31) varying;
define alias Salary fixed dec(7); /* real by default */
define alias Zip char(5) /* nonvarying by default */
```

Derived from PLINamedType
Attribute
    The attributes that can be specified are any of the attributes for variables that can be returned by a function (for example, those attributes valid in the RETURNS option and attribute). That is, you cannot specify an alias for an array or a structured attribute list. However, you can specify an alias for a type that is defined in a DEFINE ORDINAL, or DEFINE STRUCTURE statement or in another DEFINE ALIAS statement. Also, as in the RETURNS option and attribute, any string lengths or area sizes must be restricted expressions.
    Missing data attributes are supplied using PL/I defaults.
Public Attributes:
attribute : String
PLIOrdinal
    An ordinal is a named set of ordered values. Using the DEFINE ORDINAL statement, you can define an ordinal and assign meaningful names to be used to refer to that set. For example, you can define an ordinal called "color". The "color" ordinal could include the members "red", "yellow", "blue", etc. The members of the "color" set can then be referred to by these names instead of by their associated fixed binary value, making code much more self-documenting. Furthermore, a variable declared with the ordinal type can be assigned and compared only with an ordinal of the same type, or with a member of that ordinal type. This automatic checking provides for better program reliability.
    In the following example, Red has the value 0, Orange has the value 1, etc. But Low has the value 2 and Medium has the value 3.
    Example

```
define ordinal Color (Red, /* is 0, since VALUE is omitted */
Orange,
Yellow,
Green,
Blue,
Indigo,
Violet);
define ordinal Intensity (Low value(2),
Medium,
High value(5));
Derived from PLINamedType
```

Public Attributes:
precision : int
isSigned : boolean
OrdinalValue
    OrdinalValue specifies the value of a particular member within the set. If the VALUE attribute is omitted for the first member, a value of zero is used. If the VALUE attribute is omitted for any other member, the next greater integer value is used.
    The value in the given (or assumed) VALUE attribute must be an integer, can be signed, and must be strictly increasing. The value in the given (or assumed) VALUE attributed may also be specified as an XN constant.
    Example
    define ordinal Intesity (low vcalue(2), middle, high value (5));
    will give low a value of 2, middle a value of 3, and high a value of 5.
Public Attributes:
name : String
value : int
PLIStructure
    A structure is a collection of member elements that can be structure, unions, or elementary variables and arrays.
    Unions are a collection of member elements that overlay each other, occupying the same storage. Unions can be used to declare variant records that typically contain a common part, a selector part, and a variant part
    DEFINE STRUCTURE statement is used to specify a named structure or union. Structures are stronly typed. That is only variables declared as structures can be assigned to variables or parameters declared as structures.
Derived from PLINamedType, PLIComposedType
PLIHandleType
    use HANDLE to declare a variable as a pointer to a structure type.
    Handle are strongly typed-they can be assigned to or compared with handles for the same structure type
Derived from PLINonComputationalType
Public Attributes:
structure : tPLIStructure
PLINamedType
    PL/I allows you to define your own named types using the built-in data types. These include user-defined types (aliases,ordinals, structures, and unions), declarations of variables with these types, handles, and type functions.
Derived from PLIClassifier
PLIArray
    An array is an n-dimensional collection of elements that have idenical attributes.
    Examples
    dcl List fixed decimal(3) dimension(8)
    is a 1 dimensional array with 8 fixed-point decimal elements
    dcl table (4,2) fixed dec (3)

is a 2 dimensional array of three fixed-point decimal elements the 2 dimensions of table have lower bounds of 1 and upper bounds of 4 for 1 dimension and lower bounds of 1 and upper bounds of 2 for the other The REFER option is used in the declaration of a based structure to specify that, on allocation of the structure, the value of an expression is assigned to a variable in the structure and represents the length, bound, or size of another variable in the structure. The syntax for a length, bound, or size with a REFER option is:

expression REFER (variable)

The variable, known as the object of the REFER option, must be a member of the declared structure. The REFER object must conform to the following rules:

It must be REAL FIXED BINARY(p,0).

It must precede the first level-2 element that has the REFER option or contains an element that has the REFER option.

It must not be locator-qualified or subscripted.

It must not be part of an array.

For example:
DECLARE 1 STR BASED (P),
    2 X FIXED BINARY,
    2 Y (L REFER (X)),
    L FIXED BINARY INIT(1000);

This declaration specifies that the based structure STR consists of an array Y and an element X. When STR is allocated, the upper bound is set to the current value of L which is assigned to X. For any other reference to Y, such as a READ statement that sets P, the bound value is taken from X.

If both the REFER option and the INITIAL attribute are used for the same member, initialization occurs after the object of the REFER has been assigned its value.

Any number of REFER options can be used in the declaration of a structure, provided that at least one of the following restrictions is satisfied:

All objects of REFER options are declared at logical level two, that is, not declared within a minor structure. For example:
DECLARE 1 STR BASED,
    2 (M,N),
    2 ARR(I REFER (M),
        J RERER (N)),
    2 X;

When this structure is allocated, the values assigned to I and J set the bounds of the two-dimensional array ARR.

The structure is declared so that no padding between members of the structure can occur. For example:

DECLARE 1 STR UNAL BASED (P),
    2 B FIXED BINARY,
    2C,
        3 D FLOAT DECIMAL,
        3 E (I REFER (D))
        CHAR(J REFER (B)),
    2 G FIXED DECIMAL;

All items require only byte alignment because this structure has the UNALIGNED attribute. Therefore, regardless of the values of B and D (the REFER objects) no padding occurs. Note that D is declared within a minor structure.

If the REFER option is used only once in a structure declaration, the two preceding restrictions can be ignored provided that:

For a string length or area size, the option is applied to the last element of the structure.

For an array bound, the option is applied either to the last element of the structure or to a minor structure that contains the last element. The array bound must be the upper bound of the leading dimension. For example:

DCL 1 STR BASED (P),
    2 X FIXED BINARY,
    2 Y,
        3 Z FLOAT DECIMAL,
        3 M FIXED DECIMAL,
    2 D (L REFER (M)),
        3 E (50),
        3 F (20);

The leading dimension of an array can be inherited from a higher level. If we had declared STR(4) in the above example, the leading dimension would be inherited from STR(4) and so it would not be possible to use the REFER option in D.

This declaration does not satisfy the two previous bulleted restrictions. The REFER object M is declared within a minor structure and padding occurs. However, this restriction is satisfied because the REFER option is applied to a minor structure that contains the last element.

The following example is also valid:

DCL 1 STR BASED(P),
    2 X FIXED BINARY(31),
    2 Y,
        3 Z FLOAT DECIMAL,
        3 M FIXED BINARY(31),
        3 N FIXED BINARY(31),
    2 D,
        3 E(50),
        3 F(L REFER (M))
            CHAR(K REFER (N));

If the value of the object of a REFER option varies during the program then:

The structure must not be freed until the object is restored to the value it had when allocated.

The structure must not be written out while the object has a value greater than the value it was allocated.

The structure can be written out when the object has a value equal to or less than the value it had when allocated. The number of elements, the string length, or area size actually written is that indicated by the current value of the object. For example:

```
DCL 1 REC BASED (P),
    2 N,
    2 A (M REFER(N)),
    M INITIAL (100);
ALLOCATE REC;
N = 86;
WRITE FILE (X) FROM (REC);
```

86 elements of REC are written. It would be an error to attempt to free REC at this point, since N must be restored to the value it had when allocated (that is, 100). If N is assigned a value greater than 100, an error occurs when the WRITE statement is encountered.

When the value of a refer object is changed, the next reference to the structure causes remapping. For example:

```
DCL 1 A BASED(P),
    2 B
    2 C (I REFER (B)),
    2 D,
    I INIT(10);
ALLOCATE A;
B=5;
```

The next reference to A after the assignment to B remaps the structure to reduce the upper bound of C from 10 to 5, and to allocate to D storage immediately following the new last element of C. Although the structure is remapped, no data is reassigned—the contents of the part of storage originally occupied by the structure A are unchanged. If you do not consider remapping, errors can occur. Consider the following example, in which there are two REFER options in the one structure:

```
DCL 1 A BASED(P),
    2 B FIXED BINARY (15,0),
    2 C CHAR (I1 REFER (B)),
    2 D FIXED BINARY (15,0),
    2 E CHAR (I2 REFER (D)),
    (I1, I2) INIT (10);
ALLOCATE A;
B=5;
```

The mapping of A with B=10 and B=5, respectively, is as follows:

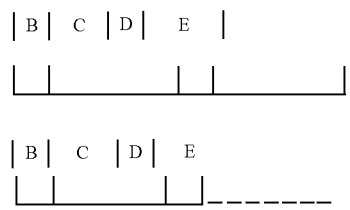

D now refers to data that was originally part of that assigned to the character-string variable C. This data is interpreted according to the attributes of D—that is, as a fixed-point binary number—and the value obtained is the length of E. Hence, the length of E is unpredictable.

PLIFixedLengthString
Derived from PLICodedStringType
Public Attributes:
length : Integer
PLIVariableLengthString
Derived from PLICodedStringType
Public Attributes:
lengthToAllocate : String
PLIFixedLengthArea
Derived from PLIAreaType
Private Attributes:
length : Integer
PLIVariableLengthArea
   The size of an area is adjustable in the same way as a string length or an array bound and therefore it can be specified by an expression or an asterisk (for a controlled area or parameter) or by a REFER option (for a based area).
Derived from PLIAreaType
Private Attributes:
lengthToAllocate : String
PLIFixedBoundArray
Derived from PLIArray
Public Attributes:
lbound : Integer
ubound : Integer
PLIFixedLboundArray
Derived from PLIArray
Public Attributes:
lbound : Integer
HboundtoAllocate : String
PLIHboundArray
Derived from PLIArray
Public Attributes:
LboundtoAllocate : String
ubound : Integer
PLIVariableBoundArray
Derived from PLIArray
Public Attributes:
LboundToAllocate : String
HboundToAllocate : String
TOTALS:
1 Logical Packages
39 Classes
LOGICAL PACKAGE STRUCTURE
Logical View
PLI
TDLang 5. C. C Metamodel The C metamodel including C Main and User Types (i.e. user defined types) is a MOF Class instance at the M2 level. FIG. 19 illustrates the C Language Metamodel. FIG. 20 illustrates the TDLangClassifier, TDLangComposedType, and the TDLangElement for the C Language Metamodel. FIG. 21 illustrates the TypedElement aspect of the C Language Metamodel. FIG. 22 illustrates data types, including user defined data types in the C Language Metamodel. FIG. 23 illustrates the Datatype-String and the Datatype-Integer, as well as the enumeration of argument and return for the DirectionKind, and the enumeration of true and false for the Boolean datatype in the C Language Metamodel.

5. C. i. C Metamodel Specification

The C metamodel is used by enterprise application programs to define data structures which represent connector interfaces.

Classifier

Type specifiers indicate the type of the object or function you are declaring. The fundamental data types are:
  Characters
  Floating-Point Numbers
  Integers
  Enumerations
  Void
From these types, you can derive:
  Pointers
  Arrays
  Structures
  Unions
  Functions
The integral types are char, wchar_t(C++ only), and int of all sizes. Floating-point numbers can have types float, double, or long double. You can collectively refer to integral and floating-point types as arithmetic types. In C++ only, you can also derive the following:
  References
  Classes
  Pointers to Members
In C++, enumerations are not an integral type, but they can be subject to integral promotionThis is the base class that defines types in CMain.
  It provides a classification of instances through a set of Features it contains.
  Classifiers are defined largely by a composition of Features.
Derived from TDLangClassifier
Public Attributes:
name : String
Structured
This is the abstract class for structured types.
Derived from Classifier, TDLangComposedType, DerivableType, StructureContents
Struct
A structure contains an ordered group of data objects. Unlike the elements of an array, the data objects within a structure can have varied data types. Each data object in a structure is a member or field.
Use structures to group logically related objects. For example, to allocate storage for the components of one address, define the following variables:
  int street_no;
  char *street_name;
  char *city;
  char *prov;
  char *postal_code;
To allocate storage for more than one address, group the components of each address by defining a structure data type and as many variables as you need to have the structure data type.
In the following example, lines 1 through 7 declare the structure tag address:
  1 struct address {
  2 int street_no;
  3 char*street_name;
  4 char*city;
  5 char*prov;
  6 char*postal_code;
  7 };
  8 struct address perm_address;
  9 struct address temp_address;
  10 struct address *p_perm_address=&perm_address;
The variables perm_address and temp_address are instances of the structure data type address. Both contain the members described in the declaration of address. The pointer p_perm_address points to a structure of address and is initialized to point to perm_address.
Refer to a member of a structure by specifying the structure variable name with the dot operator (.) or a pointer with the arrow operator (→) and the member name. For example, both of the following assign a pointer to the string "Ontario" to the pointer prov that is in the structure perm_address:
  perm_address.prov="Ontario";
  p_perm_address→prov="Ontario";
All references to structures must be fully qualified. In the example, you cannot reference the fourth field by prov alone. You must reference this field by perm_address.prov.
Structures with identical members but different names are not compatible and cannot be assigned to each other. Structures are not intended to conserve storage. If you need direct control of byte mapping, use pointers.
Derived from Structured
Union
A union is an object that can hold any one of a set of named members.
The members of the named set can be of any data type. C/C++ overlays the members in storage.
The storage allocated for a union is the storage required for the largest member of the union (plus any padding that is required so that the union will end at a natural boundary of its strictest member).
  C++Notes:
    1. In C++, a union can have member functions, including constructors and destructors, but not virtual member functions. You cannot use a union as a base class nor derive it from a base class.
    2. A C++ union member cannot be a class object that has a constructor, destructor, or overloaded copy assignment operator. In C++, you cannot declare a member of a union with the keyword static.
Derived from Structured
BehavioralFeature
This defines a dynamic characteristic of the ModelElement that contains it. A BehavioralFeature is both a Feature and a Namespace.
Public Attributes:
name : String
TypedElement
This is the base class for attribute, parameter and constant whose definition requires a type specification. The TypeElement type is an abstraction of ModelElements that require a type as part of their definition.
A TypeElement does not itself define a type, but is associated with a Classifier.
Derived from TDLangElement
StructuralFeature
It defines a static characteristic of the ModelElement that contains it.
1
Derived from TypedElement, StructureContents
Public Attributes:
name : String
1 Parameter
A Parameter provides a means of communication with operations and other BehavioralFeatures. A parameter passes or communicates values of its defined type.
A function declarator contains an identifier that names a function, and a contains a list of the function parameters. You should always use prototype function declarators because you can check the function parameters with them. C++ functions must have prototype function declarators.

Prototype Function Declarators: You should declare each parameter within the function declarator. Any calls to the function must pass the same number of arguments as there are parameters in the declaration.

Nonprototype Function Declarators: You should declare each parameter in a parameter declaration list following the declarator. If you do not declare a parameter, it has type int.

The compiler widens char and short parameters to int, and widens float parameters to double. The compiler performs no type checking between the argument type and the parameter type for nonprototyped functions. As well, it does not check to ensure that the number of arguments matches the number of parameters.

You should declare each value that a function receives in a parameter declaration list for nonprototype function definitions that follows the declarator.

A parameter declaration determines the storage class specifier and the data type of the value.

The only storage class specifier that C/C++ allows is the register storage class specifier. It allows any type specifier for a parameter. If you do not specify the register storage class specifier, the parameter will have the auto storage class specifier. In C only, if you omit the type specifier and you are not using the prototype form to define the function, the parameter will have type int, as follows:
int func(i,j)
{
/* i and j have type int */
}

In C only, you cannot declare a parameter in the parameter declaration list if it is not listed within the declarator.
Derived from TypedElement
Public Attributes:
direction : Directionkind
Private Attributes:
name : String
Datatype
This is to represent data types and native types.
Derived from Classifier
Derived
Derived from DerivableType, Classifier
Field
Field is attribute.
Derived from StructuralFeature
Function
Derived from BehavioralFeature, DerivableType
Public Attributes:
isVarArg : Boolean
StructureContents
Structured
This is the abstract class for structured types.
Derived from Classifier, TDLangComposedType, DerivableType,
StructureContents
TypedElement
This is the base class for attribute, parameter and constant whose definition requires a type specification. The TypeElement type is an abstraction of ModelElements that require a type as part of their definition.
A TypeElement does not itself define a type, but is associated with a Classifier.

Derived from TDLangElement
Typedef
Derived from Derived
Derived
Derived from DerivableType, Classifier
Array
An array is an ordered group of data objects. Refer to each object as an element. All elements within an array have the same data type.
Use any type specifier in an array definition or declaration. Array elements can be of any data type, except function or, in C++, a reference. You can, however, declare an array of pointers to functions.
Derived from Derived
Public Attributes:
dimension Integer
Pointer
A pointer type variable holds the address of a data object or a function. A pointer can refer to an object of any one data type except to a bit field or a reference. Additionally, in C, a pointer cannot point to an object with the register storage class.
Some common uses for pointers are:
To access dynamic data structures such as linked lists, trees, and queues.
To access elements of an array, or members of a structure, or members of a C++ class.
To access an array of characters as a string.
To pass the address of a variable to a function. (In C++, you can also use a reference to do this.) By referencing a
variable through its address, a function can change the contents of that variable.
Derived from Derived
Function
Derived from BehavioralFeature, DerivableType
Public Attributes:
isVarArg : Boolean
DerivableType
5. d. C++ Metamodel
The C++ metamodel, based on the ANNOTATED C++ REFERENCE MANUAL book (authors: Margaret A. Ellis, Bjarne Stoustrup), 1990, is a MOF Class instance at the M2 level. The C++ metamodel consists of C++ Main, and Model Types described as follows:
5. d. i. C++ Main Metamodel:
This metamodel inherits from the C Main metamodel. FIG. 24 illustrates the C++ Main Metamodel, including Derived, Structured, BehavioralFeatures, Field, and DerivableTypes for the C++ Metamodel. FIG. 25 illustrates an enumeration of the visibility types for the C++ Metamodel. Note that C++ is an object oriented language, useful in object oriented programming, and supports public, private, and protected visibilities.
Model Types Metamodel:
5. d. ii. C++ Metamodel Speciriciation
C++
The C metamodel is used by enterprise application programs to define data structures which represent connector interfaces.
Class
The C++ class is an extension of the C-language structure. The only difference between a structure and a class is that structure members have public access by default and class members have private access by default. Consequently, you can use the keywords class or struct to define equivalent classes.

```
// In this example, class X is equivalent to struct Y
    class X
    {
    int a; // private by default
    public:
        int f() { return a = 5; };   // public member function
    };
    struct Y
    {
    int f() { return a = 5; };       // public by default
    private:
        int a; // private data member
    };
```

If you define a structure and then declare an object of that structure using the keyword class, the members of the object are still public by default. In the following example, main() has access to the members of X even though X is declared as using the keyword class:
Derived from Structured
Public Attributes:
isAbstract : Boolean
isVolatile : Boolean
Private Attributes:
visibility : VisibilityKind
Member
Data members include members that are declared with any of the fundamental types, as well as other types, including pointer, reference, array types, and user-defined types. You can declare a data member the same way as a variable. However, you cannot place explicit initializers inside the class definition.
If you declare an array as a nonstatic class member, you must specify all the array dimensions.
Derived from Field, DerivableType
Public Attributes:
isStatic : Boolean
Private Attributes:
isVolatile : Boolean
isRegister : Boolean
visibility : VisibilityKind
Reference
Derived from Derived
Operator
Derived from BehavioralFeature, StructureContents
Private Attributes:
isInline : Boolean
visibility : VisibilityKind
Operation
Derived from Function, StructureContents
Public Attributes:
isStatic : Boolean
isExtern : Boolean
isInline : Boolean
isVirtual : Boolean
isPure : Boolean
visibility : VisibilityKind
isCtor : Boolean
Private Attributes:
isDtor : Boolean
Extern
Extern is a kind of Derived type. It is used to associate with C.
Derived from Derived
Private Attributes:
linkage : String Generalization
Private Attributes:
visibility : VisibilityKind
isVirtual : Boolean
Const
Derived from Derived
Template
The declaration in a template declaration must define or declare one of the following:
A class
A function
A static member of a template class
The identifier of a type is a type_name in the scope of the template declaration. A template declaration can appear as a global declaration only.
The template arguments (within the < and > delimiters) specify the types and the constants within the template that you must specify when the template is instantiated.
Given the following template:
template<class L>class Key

```
                {
                    L k;
                    L* kptr;
                    int length;
            ]   public:
                    Key(L);
                    // ..;
            // ...
                };
```

The declarations create the following objects:
i of type Key<int>
c of type Key<char*>
m of type Key<mytype>
Note that these three classes have different names. The types that are contained within the angle braces are not arguments to the class names, but part of the class names themselves. Key<int> and Key<char*> are class names. Within the context of the example, a class that is called Key (with no template argument list) is undefined.
C++ permits default initializers in template arguments under the following conditions:
They only apply to nontype template arguments.
They only apply to trailing arguments, like functions.
Subsequent template declarations can add default initializers, but cannot redefine existing default initializers.
They only apply to class template declarations, not to function template declarations.
Note: C++ treats a template that defines a member function of a class template as a function template. Such a template cannot have default initializers.
Derived from Derived
5. e. HLASM (High Level Assembler)
This is HLASM for OS390. FIG. 32 illustrates a High Level Assembly Language (HLASM) metamodel to define data structure semantics which represent connector interfaces. FIG. 33 illustrates the associations between the HLASM metamodel with the TDLang base classes which are the TDLangClassifier, the TDLanguageComposedType, and the TDLangElement. FIG. 34 illustrates an enumeration of the HLASM usage values in the HLASM Metamodel.
hlasm HLASMDecimal
  HLASMDecimal types are used by decimal instructions
  Code is 'P' for decimal type (machine format: packed decimal format).
  Code is 'Z' for decimal type (machine format: zoned decimal format).
  Examples:

|      |    | AP      | AREA, PCON |
| ---- | -- | ------- | ---------- |
| PCON | DC | P'100'  |            |
| AREA | DS | P       |            |

Derived from HLASMSimpleType
Private Attributes:
exponent : int
  The exponent modifier specifies the power of 10 by which the nominal value of a decimal constant is to be multiplied before it is converted to its internal binary representation.
packed : boolean
  This boolean corresponds to the machine format for decimal type.
  True is Packed (Code is P)
  False is Zoned (Code is Z)
scale : int
  The scale modifier specifies the amount of internal scaling you want for decimal constants.
HLASMAddress
  HLASMAddress holds address information mainly for the use of fixed-point and other instructions Code is 'A' for address type (machine format: value of address; normally a fullword).
  Code is 'AD' for address type (machine format: value of address; normally a doubleword).
  Code is 'Y' for address type (machine format: value of address; normally a halfword).
  Code is 'S' for address type (machine format: base register and displacement value; a halfword).
  Code is 'V' for address type (machine format: space reserved for external symbol address; normally a fullword).
  Code is 'J' for address type (machine format: space reserved for length of class or DXD; normally a fullword).
  Code is 'Q' for address type (machine format: space reserved for external dummy section offset).
  Code is 'R' for address type (machine format: space reserved for PSECT addresses; normally a fullword).
  Example:

|       |    | L           | 5, ADCON |
| ----- | -- | ----------- | -------- |
| ADCON | DC | A(SOMWHERE) |          |

Derived from HLASMSimpleType
Private Attributes:
type : HLASMAddressType
  Specifies this element's address type.

HLASMBinary
  HLASMBinary defines bit patterns.
  Code is 'B' for binary type (machine format: binary format).
  Example:

|      |    | FLAG | DC | B'00010000' |
| ---- | -- | ---- | -- | ----------- |

Derived from HLASMSimpleType
Private Attributes:
exponent : int
  The exponent modifier specifies the power of 10 by which the nominal value of a binary constant is to be multiplied before it is converted to its internal binary representation.
scale : int
  The scale modifier specifies the amount of internal scaling you want for binary constants.
HLASMCharacter
  HLASMCharacter defines character strings or messages.
  Code is 'C' for character type (machine format: 8-bit for each character).
  Code is 'CU' for unicode character type (machine format: 16-bit code for each character).
  Code is G' for graphic type (machine format: 16-bit code for each character)
  Example:

|      |    | CHAR | DC | C'string of characters' |
| ---- | -- | ---- | -- | ----------------------- |

Derived from HLASMSimpleType
Private Attributes:
graphic : boolean
  Specifies whether the element is graphic or not.
  True for Graphic (Code is 'G').
  False for regular character type.
type : HLASMCharacterType
  Specifies this element's character type.
HLASMFixedPoint
  HLASMFixedPoint types are used by the fixed-point and other instructions.
  Code is 'F' for fixed-point type (machine format: signed, fixed-point binary format; normally a fullword).
  Code is 'FD' for fixed-point type (machine format: signed, fixed-point binary format; normally a doubleword).
  Code is 'H' for fixed-point type (machine format: signed, fixed-point binary format; normally a halfword).
  Example:

|      |    | L      | 3, FCON |
| ---- | -- | ------ | ------- |
| FCON | DC | F'100' |         |

Derived from HLASMSimpleType
Private Attributes:
exponent : int

The exponent modifier specifies the power of 10 by which the nominal value of a fixed-point constant (H, F) is to be multiplied before it is converted to its internal binary representation.

The exponent modifier is written as En, where n can be either a decimal self-defining term, or an absolute expression enclosed in parentheses.

The decimal self-defining term or the expression can be preceded by a sign: If no sign is present, a plus sign is assumed. The range for the exponent modifier is −85 to +75. If using the type extension to define a floating-point constant, the exponent modifier can be in the range −2(31) to 2(31)−1. If the nominal value cannot be represented exactly, a warning message is issued.

scale : int

The scale modifier specifies the amount of internal scaling you want for binary digits for fixed-point constants (H, F), i.e. the power of two by which the fixed-point constant must be multiplied after its nominal value has been converted to its binary representation, but before it is assembled in its final scaled form. Scaling causes the binary point to move from its assumed fixed position at the right of the extreme right bit position.

The range for each type of constant is:

Fixed-point constant H
−187 to 15

Fixed-point constant F
−187 to 30

The scale modifier is written as Sn, where n is either a decimal self-defining term, or an absolute expression enclosed in parentheses.

| Both forms of the modifier's value n can be preceded by a sign; if no sign is present, a plus sign is assumed.

Notes:

1. When the scale modifier has a positive value, it indicates the number of binary positions occupied by the fractional portion of the binary number.

2. When the scale modifier has a negative value, it indicates the number of binary positions deleted from the integer portion of the binary number.

3. When low-order positions are lost because of scaling (or lack of scaling), rounding occurs in the extreme left bit of the lost portion. The rounding is reflected in the extreme right position saved.

HLASMFloatingPoint

HLASMFloatingPoint types are used by floating-point instructions.

Code is 'E' for floating-point type (machine format: short floating-point format; normally a fullword).

Code is 'D' for floating-point type (machine format: long floating-point format; normally a doubleword).

Code is 'L' for floating-point type (machine format: extended floating-point format; normally doublewords).

Examples:

| | | |
|---|---|---|
| | LE | 2, ECON |
| ECON | DC | E'100.50' |

Derived from HLASMSimpleType
Private Attributes:
exponent : int

The exponent modifier specifies the power of 10 by which the nominal value of a floating-point constant (E, D, and L) is to be multiplied before it is converted to its internal binary representation.

The exponent modifier is written as En, where n can be either a decimal self-defining term, or an absolute expression enclosed in parentheses.

The decimal self-defining term or the expression can be preceded by a sign: If no sign is present, a plus sign is assumed. The range for the exponent modifier is −85 to +75. If using the type extension to define a floating-point constant, the exponent modifier can be in the range −2(31) to 2(31)−1. If the nominal value cannot be represented exactly, a warning message is issued.

round : HLASMFloatingPointRoundType
Specifies this element's floating point round type.

scale : int

The scale modifier specifies the amount of internal scaling you want for hexadecimal digits for floating-point constants (E, D, L), i.e. the power of two by which the fixed-point constant must be multiplied after its nominal value has been converted to its binary representation, but before it is assembled in its final scaled form. Scaling causes the binary point to move from its assumed fixed position at the right of the extreme right bit position.

The range for each type of constant is:

Floating-point constant E
0 to 5

Floating-point constant D
0 to 13

Floating-point constant L
0 to 27

The scale modifier is written as Sn, where n is either a decimal self-defining term, or an absolute expression enclosed in parentheses.

| Both forms of the modifier's value n can be preceded by a sign; if no sign is present, a plus sign is assumed.

Scale Modifier for Hexadecimal Floating-Point Constants: The scale modifier for hexadecimal floating-point constants must have a positive value. It specifies the number of hexadecimal positions that the fractional portion of the binary representation of a floating-point constant is shifted to the right. The hexadecimal point is assumed to be fixed at the left of the extreme left position in the fractional field. When scaling is specified, it causes an unnormalized hexadecimal fraction to be assembled (unnormalized means the leftmost positions of the fraction contain hexadecimal zeros). The magnitude of the constant is retained, because the exponent in the characteristic portion of the constant is adjusted upward accordingly. When non-zero hexadecimal positions are lost, rounding occurs in the extreme left hexadecimal position of the lost portion. The rounding is reflected in the extreme right position saved.

type : HLASMFloatingPointType
Specifies this element's floating point type.

HLASMHexadecimal

HLASMHexadecimal defines large bit patterns.

Code is 'X' for hexadecimal type (machine format: 4-bit code for each hexadecimal digit).

Example:

| | | |
|---|---|---|
| PATTERN | DC | X'FF00FF00' |

Derived from HLASMSimpleType
HLASMClassifier
   HLASMClassifier is the abstract parent class of HLASMComposedType and HLASMSimpleType.
Derived from TDLangClassifier
HLASMElement
   A HLASMElement represents every DC instruction in the HLASM program.
   For example:

| | | |
|---|---|---|
| CHAR | DC | C'string of characters' |
| PCON | DC | P'100' |
| PATTERN | DC | X'FF00FF00' |
| CHAR, PCON, and PATTERN are all DC instructions | | |

Derived from TDLangElement
HLASMSimpleType
   HLASMSimpleType is an abstract class that contains attributes shared by all simple types in the HLASM language.
Derived from HLASMClassifier
Private Attributes:
length : int
   The length modifier indicates the number of bytes of storage into which the constant is to be assembled. It is written as Ln, where n is either a decimal self-defining term or an absolute expression enclosed by parentheses. It must have a positive value.
   When the length modifier is specified:
   Its value determines the number of bytes of storage allocated to a constant.
   It therefore determines whether the nominal value of a constant must be padded or truncated to fit into the space allocated.
   No boundary alignment, according to constant type, is provided.
   Its value must not exceed the maximum length allowed for the various types of constant defined.
   The length modifier must not truncate double-byte data in a C-type constant.
   | The length modifier must be a multiple of 2 in a G-type or CU-type | constant.
   When no length is specified, for character and graphic constants (C and G), hexadecimal constants (X), binary constants (B), and decimal constants (P and Z), the whole constant is assembled into its implicit length.
size : HLASMSizeType
   Specifies this element's boundary alignment.
HLASMComposedType
   The HLASMComposedType class represents a nested declaration that contains additional elements. HLASMComposedType class is an aggregate of HLASMElements. HLASMComposedType is parent of HLASMUnion.
Derived from HLASMClassifier, TDLangComposedType
Private Attributes:
union : boolean
   Specifies whether the element is a union or not.
   True for union.
   False otherwise.
HLASMArray
   HLASMArray holds information for array instructions.
Private Attributes:
size : int
   Size denotes the one-dimensional size of the array that is allocated in memory.
HLASMElementInitialValue
   This class contains the initial value of the HLASMelement.
Derived from TDLangElement
Public Attributes:
initVal : String
   Specifies the initial value of the element, example: 'MIN', 'MAX', etc.
HLASMSourceText
   This class contains the entire source code (including comments) and its associated line number.
Public Attributes:
source : String
   Specify the source file string.
fileName : String
   Specifies the path of the source file.
TOTALS:
1 Logical Packages
14 Classes
LOGICAL PACKAGE STRUCTURE
Logical View
TDLang
hlasm
6. Application-Domain Interface Metamodel
6. a. IMS Transaction Message Metamodel
The IMS Transaction Message metamodel depicted as shownj in FIG. 26 (FIG. 26 illustrates the Metamodel for an IMS Transaction Message, containing three types of transaction messages, the IMS-OTA Messages with a prefix, IMS messages without a prefix where a default OTMA prefix can be built by IMS, and IMS basic messages to be sent to application programs, directly), containing three types of IMS transaction messages:
   IMS OTMA messages with prefix
   IMS messages without prefix—A default OTMA prefix can be built by IMS
   IMS basic messages to be sent to application programs directly
6. a. i. IMS OTMA Prefix
An IMS OTMA message prefix is composed of the following components, FIG. 27 illustrates the OTMA prefix metadata model. FIG. 28 illustrates the OTMA prefix in control data defined data types. FIG. 29 illustrates the OTMA prefix in state defined data types. FIG. 30 illustrates the OTMA prefix in security defined types. FIG. 31 illustrates the IMS Messages primitives in the IMS Metamodel.
   Control data: This section includes the transaction-pipe name, message type, sequence numbers, flags and indicators.
   State data: This section includes a destination override, map name, synchronization level, commit mode, tokens and server state.
   Security data: This section includes the user ID, user token, and security flags.
   User data: This section includes any special information needed by the client.
The OTMA prefix metamodel is characterized as follows.
1) OTMA Prefix—Control Data Defined Types
2) OTMA Prefix—State Data Defined Types 3) OTMA Prefix—Security Data Defined Types 6. a. ii. IMS Messages Primitive Types 6. a. i. a). IMSTransactionMessage Metamodel Specification IMSTransactionMessage metamodel includes the following IMS messages scenarios:
- IMS OTMA messages with the prefix
- IMS OTMA messages without the prefix
- IMS basic messages to be sent to the application program directly.

Private Attributes:
OTMAPrefixFormat : OTMAPrefixFormats=one
StandardFieldsFlag : boolean
OTMAPrefixFormats
Private Attributes:
one :
two :
StandardFields
StandardFields (consisting LL, ZZ and transaction code) are not included in the following scenarios:
- Sending XML documents directly to the IMS transaction application programs
- ACK or NAK messages to IMS applications Private Attributes:
Length : TwoByteField
Also known as LL.
ReservedField : TwoByteField
Also known as ZZ.
TransactionCode : VariableLengthField
The Transaction Code field can be from 1 to 8 bytes in length.
TransactionCode appears with first segment of input messages only.
TransactionCode comes after LLZZ.
OTMAPrefix
OTMAPrefix
An IMS OTMA prefix can appear either before all message segments, or only before the first segment of the message. However, the OTMA prefix is optional. If it is not specified, the IMS gateway will build a default one for the request.
ControlData
Control data is message-control information. It includes the transaction-pipe name, message type, sequence numbers, flags and indicators.

Private Attributes:
ArchitectureLevel : OneByteField
Specifies the OTMA architecture level. The client specifies an architecture level, and the server indicates in the response message which architecture level it is using. The architecture levels used by a client and a server must match.
With IMS Version 6, the only valid value is X'01'.
Mandatory for all messages.
MessageType : TMessageType
Specifies the message type. Every OTMA message must specify a value for the message type. The values are not mutually exclusive. For example, when the server sends an ACK message to a client-submitted transaction, both the transaction and response flags are set.
ResponseFlag : OneByteField
Specifies either that the message is a response message or that a response is requested.
Acknowledgements to transactions include attributes (for that transaction) in the application-data section of the message prefix only if the transaction specifies Extended Response Requested.
CommitConfirmationFlag : TCommitConfirmationFlag
Specifies the success of a commit request. Sent by the server to the client in a commit-confirmation message. These messages are only applicable for send-then-commit transactions, and are not affected by the synchronization-level flag in the state-data section of the message prefix.
CommandType : TCommandType
Specifies the OTMA protocol command type.
IMS MTO commands are specified in the application-data section of the mesage.
ProcessingFlag : TProcessingFlag
Specifies options by which a client or aserver can control message processing.
TpipeName : EightByteField
Specifies the transaction-pipe name. For IMS, this name is used to override the LTERM name on the I/O PCB. This field is applicable for all transaction, data, and commit-confirmation message types. It is also applicable for certain response and command message types.
ChainFlag : TChainFlag
Specifies how many segments are in the message. This flag is applicable to transaction and data message types, and it is mandatory for multi-segment messages.
PrefixFlag : TPrefixFlag
Specifies the sections of the message prefix that are attached to the OTMA message. Every message must have the message-control information section, but any combination of other sections can be sent with an OTMA message.
SendSequenceNumber : FourByteField
Specifies the sequence number for a transaction pipe. This sequence number is updated by the client and server when sending message or transactions.
Recommendation: Increment the number separately for each transaction pipe.
This number can also be used to match an ACK or NAK message with the specific message being acknowledged.
SenseCode : TwoByteField
Specifies the sense code that accompanies a NAK message.
ReasonCode : TwoByteField
Specifies the reason code that accompanies a NAK message. This code can further qualify a sense code.
RecoverableSequenceNumber : FourByteField
Specifies the recoverable sequence number for a transaction pipe.
Incremented on every send orf a recoverable message using a synchronized transaction pipe. Both the client and the server increment their recoverable send-sequence numbers and maintain them separately from the send-sequence number.
SegmentSequenceNumber : TwoByteField
Specifies the sequence number for a segment of a multi-segment message.
This number must be updated for each segment, because messages are not necessarily delivered sequentially by XCF.
This number must have a value of 0 (zero) if the message has only one segment.
Reserved : TwoByteField
DefinedTypes
TMessageType
Private Attributes:
Data : String Data (value X'80')
Specifies server output data sent to the client. If the client specifies synchronization level Confirm in the state-data section of the message prefix, the server also sets Response Requested for the response flag. If the client does not specify a synchronization level, the server uses the default, Confirm.
Transaction : String
Transaction (value X'40')
Specifies client input data to the server.
Response : String
Response (value X'20')
Specifies that the message is a response message, and is only set if the message for which this message is the response specified Response Requested for the response flag.
If this flag is set, the response flag specifies either ACK or NAK.
The send-sequence numbers must match for the original data message and the response message. Chained transaction input messages to the server must always request a response before the next transaction (for a particular transaction pipe) is sent.
Command : String
Command (value X'10')—Specifies an OTMA protocol command. OTMA commands must always specify Response Requested for the Response flag.
CommitConfirmation : String
CommitConfirmation (value X'08')—Specifies that commit is complete.
This is sent by the server when a sync point has completed, and is only applicable for send-then-commit transactions. The commit-confirmation flag is also set.
TResponseFlag
Private Attributes:
ACK: String
ACK (value X'80') Specifies a positive acknowledgement.
NAK: String
NAK (value X'40') Specifies a negative acknowledgement.
See the sense code field for more information on the reason for the NAK.
ResponseRequested : String
Response Requested (value X'20') Specifies that a response is requested for this message. This can be set for message types of Data, Transaction, or Command.
When sending send-then-commit IMS command output, IMS does not request an ACK regardless of the synchronization level.
ExtendedResponseRequested : String
Extended Response Requested (value X'10')—Specifies that an extended response is requested for this message. Can be set by a client only for transactions (or for transactions that specify an IMS command instead of a transaction code). If this flag is set for a transaction, IMS returns the architected attributes for that transaction in the application-data section of the ACK message. If this flag is set for a command, IMS returns the architected attributes in the application-data section of the ACK message.
This flag can be set for the IMS commands /DISPLAY TRANSACTION and /DISPLAY TRANSACTION ALL.
TCommitConfirmationFlag
Private Attributes:
Committed : String Committed (value X'80')—Specifies that the server committed successfully.
Aborted : String
Aborted (value X'40')—Specifies that the server aborted the commit.
TCommandType
Private Attributes:
ClientBid : String
Client-Bid (value X'04')—Specifies the first message a client sends to the OTMA server. This command must also set the response-requested flag and the security flag in the message-control information section of the message prefix. The appropriate stat-data fields (for example, Member Name) must also be set. The security-data prefix must specify a Utoken field so the OTMA server can validate the client's authority to act as an OTMA client. Because the server can respond to the client-bid request, this message should nto be sent until the client is ready to start accepting data messages.
ServerAvailable : String
Server Available (value X'08')—Specifies the first message the server sends to a client. It is sent when the server has connected to the XCF group before the client has connected. The client replies to the server Available message with a client-bid request. The appropriate state data fields (for example, Member Name) must also be set. If the client connects first, it is notified by XCF when the server connects, and begins processing with a client-bid request.
CBresynch : String
CBresynch (value X'0C')—Specifies a client-bid message with a request by the client for resynchronization. This command is optional and causes the server to send an SRVresynch message to the client. The CBresynch command is the first messag ethat a client sends to the OTMA server when it attempts to resynchronize with IMS and existing synchronized Tpipes exist for the client. Other than the CBresynch message indicator in the message prefix, the information required for the message prefix should be identical to the client-bid command. If IMS receives a client-bid request for them client and IMS is aware of existing synchronized Tpipes, IMS issues informational message DFS23941 to the MTO. IMS resets the recoverable send- or receive-sequence numbers to 0 (zero) for all the synchronized Tpipes.
SuspendProcessingForAllTpipes String
Suspend Processing for All Tpipes (value X'14')—Specifies that the server is suspending all message activity with the client. All subsequent data input receives a NAK message from the server. Similarly, the client should send a NAK message for any subsequent server messages. If a client wishes to suspend processing for a particular transaction pipe, it must submit a /STOP TPIPE command as an OTMA message.
ResumeProcessingForAllTpipes : String
Resume processing for All Tpipes (value X'18')—Specifies that the server is resuming message activity with the client. If a client wishes to resume processing for a particular transaction pipe that has been stopped, it must submit a /START TPIPE command as an OTMA message.
SuspendInputForTpipe : String
Suspend Input for Tpipe (value X'1C')—Specifies that the server is overloaded and is temporarily suspending input for the transaction pipe.

All subsequent client input receive NAK messages for the transation pipe specified in the message-control information section of the message prefix. A response is not requested for this command. This architected command is also sent by IMS when the master terminal operator enters a /STOP TPIPE command.

ResumeInputForTpipe : String

Resume Input for Tpipe (value X'20') Specifies that the server is ready to resume client input following an earlier Suspend Input for Tpipe command. A response is not requested for this command. This command is also sent by IMS when the IMS master terminal operator issues a /START TPIPE command.

SRVresynch : String

SRVresynch (value X'2C')—Specifies the server's response to a client's CBresynch command. This command specifies the states of synchronized transaction pipes within the server (the send- and receive-sequence numbers). This command is sent as a single message (with single or multiple segments), and an ACK is requested.

REQresynch : String

REQresynch (value X'30')—Specifies the send-sequence number and the receive sequence for a particular Tpipe. REQresynch is send from IMS to a client.

REPresynch : String

REPresynch (value X'34')—Specifies the client's desired state information for a Tpipe. A client sends the REPresynch comand to IMS in response to the REQresynch command received from IMS.

TBresynch : String

TBresynch (value X'38')—Specifies that the client is ready to receive the REQresynch command from IMS.

TProcessingFlag

Private Attributes:

SynchronizedTpipe : String

Synchronized Tpipe (value X'40')—Specifies that the transaction pipe is to be synchronized. Allows the client to resynchronize a transaction pipe if there is a failure. Only valid for commit-then-send transactions. This flag causes input and output sequence numbers to be maintained for the transaction pipe. All transactions routed through the transaction pipe must specify this flag consistently (either on or off).

1 AsynchronousOutput : String

Asynchronous output (value X'20')—Specifies that the server is sending unsolicited queued output to the client. This can occur when IMS inserts a message to an alternate PCB. Certain IMS commands, when submitted as commit-then-send, can cause IMS to send the output to a client with this flag set. In this case, the OTMA prefixes contain no identifying information that the client can use to correlate the output to the originating command message. These command output data messages simply identify the transaction-pipe name. IMS can also send some unsolicited error messages with only the transaction-pipe name.

ErrorMessageFollows : String

Error Message Follows (value X'10')—Specifies that an error message follows this message. This flag is set for NAK messages from the server.

An additional error message is then sent to the client. The asynchronous-output flag is not set in the error data message, because the output is not generaed by an IMS application.

TChainFlag

Private Attributes:

FirstInChain : String

First-In-Chain (value X'80')—Specifies the first segment in a chain of segments which comprise a multi-segment message. Subsequent segments of the message only need the message-control information section of the message prefix. Other applicable prefix segments (for example, those specified by the client on the transaction message) are sent only with the first segment (with the first-in-chain flag set). If the OTMA message has only one segment, the last-in-chain flag should also be set.

MiddleInChain : String

Middle-In-Chain (value X'40')—Specifies a segment that is neither first nor last in a chain of segments that comprise a multi-segment message.

These segments only need the message-control information section of the message prefix.

Restriction: Because the client and server tokens are in the state-data section of the message prefix, they cannot be used to correlate and combine segmented messages. The transaction-pipe name and send-sequence numbers can be used for this purpose; they are in the message-control information section of the message prefix for each segment.

LastInChain : String

Last-In-Chain (value X'20')—Specifies the last segment of a multi-segment message.

DiscardChain : String

Discard Chain (value X'10')—Specifies that the entire chain of a multi-segment message is to be discarded. The last-in-chain flag must also be set.

TPrefixFlag

Private Attributes:

StateData : String

State Data (value X'80')—Specifies that the message includes the state-data section of the message prefix.

SecurityData : String

Security (value X'40')—Specifies that the message includes the security-data section of the message prefix.

UserData : String

User Data (value X'20')—Specifies that the message includes the user-data section of the message prefix.

ApplicationData : String

Application Data (value X'10')—Specifies that the message includes the application-data section of the message prefix.

StateData

StateData

This includes a destination override, map name, synchronization level, commit mode, tokens and server state. Note that this is state data for a transaction. OTMA also supports state data headers for the following: Server Available Command, Client Bid Command, SRVresynch Command, REQresynch Command, REPresynch Command. However, these commands would never be generated by a client device, and so command messages would never come into the IMS Connect interface, and so we do not need to model them.

Private Attributes:

Length : TwoByteField

ServerState : TServerState Specifies the mode in which the transaction is running.

SynchronizationFlag : TSynchronizationFlag—Specifies the commit mode of the transaction. This flag controls and synchronizes the flow of data between the client and server.

SynchronizationLevel : TSynchronizationLevel—Specifies the transaction synchronization level, the way in which the client and server transaction program (for example, IMS application program) interacts with program output messages. The default is Confirm. IMS always requests a response when sending commit-then-send output to a client.

Reserved : OneByteField

MapName : EightByteField—Specifies the formatting map used by the server to map output data streams (for example, 3270 data streams).

Although OTMA does not provide MFS support, you can use the map name to define the output data stream. The name is an 8-byte MOD name that is placed in the I/O PCB. IMS replaces this field in the prefix with the map name in the I/O PCB when the message is inserted.

The map name is optional.

ServerToken : SixteenByteField—Specifies the server name. The Server Token must be returned by the client to the server on response messages (ACKs or NAKs). For conversational transactions, the Server Token must also be returned by the client on subsequent conversational input.

CorrelatorToken : SixteenByteField—Specifies a client token to correlate input with output. This token is optional and is not used by the server.

Recommendation : Clients should use this token to help manage their transactions.

ContextID: SixteenByteField

Specifies the RRS/MVS token that is used with SYNCLVL=02 and protected conversations.

DestinationOverride : EightByteField—Specifies an LTERM name used to override the LTERM name in the IMS application program's I/O PCB.

This override is used if the client does not want to override the LTERM name in the I/O PCB with the transaction-pipe name. This optional override is not used if it begins with a blank.

ServerUserDataLength : TwoByteField—Specifies the length of the server user data, if any. The maximum length of the server use data is 256 bytes.

ServerUserData : VariableLengthField—Specifies any data needed by the server. If included in a transaction message by the client, it is returned by the server in the output data messages.

DefinedTypes

TServerState

Private Attributes:

ConversationalState : String

Conversational State (value X'80')—Specifies a conversational mode transaction. The server sets this state when processing a conversational-mode transaction. This state is also set by the client when sending subsequent IMS conversational data messages to IMS.

ResponseMode : String

Response Mode (value X'40')—Specifies a response-mode transaction.

Set by the server when processing a response-mode transaction. This state has little significance for an OTMA server, because OTMA does not use sessions or terminals.

TSynchronizationFlag

Private Attributes:

1CommitThenSend : String

Commit-then-Send (value X'40')—Specifies a commit-then-send transaction. The server commits output before sending it; for example, IMS inserts the output to the IMS message queue.

SendThenCommit : String

Send-then-Commit (value X'20')—Specifies a send-then-commit transaction. The server sends output to the client before committing it.

TSynchronizationLevel

Private Attributes:

None : String

None (value X'00')—Specifies that no synchronization is requested. The server application program does not request an ACK message when it sends output to a client. None is only valid for send-then-commit transactions.

Confirm : String

Confirm (value X'01')—Specifies that synchronization is requested. The server sends transaction output with the response flag set to Response Requested in the message-control information section of the message prefix. Confirm can be used for either commit-then-send or send-then-commit transactions.

SYNCPT: String

SYNCPT (value X'02')—Specifies that the programs participate in coordinated commit processing on resources updated during the conversion under the RRS/MVS recovery platform. A conversation with this level is also called a protected conversation.

SecurityData

SecurityData

This includes the user ID, user token, and security flags.

The security-data section is mandatory for every transaction, and can be present for OTMA command messages.

Private Attributes:

Length : TwoByteField—Specifies the length of the security data section of the message prefix, including the length field.

SecurityFlag : TSecurityFlag—Specifies the type of security checking to be performed. It is assumed that the user ID and password are already verified.

LengthOfSecurityFields : OneByteField—Specifies the length of the security data fields : User ID, Profile, and Utoken. These three fields can appear in any order, or they can be omitted. Each has the following structure : Length field, then Field type, then Data field. The actual length of the User ID or Profile should not be less than the value specified for the length of each field. Length can be 0.

tokenLength : OneByteField

Specifies the length of the user token.

Length does not include length field itself.

UtokenType : OneByteField—Specifies that this field contains a user token. (Value X'00')

Utoken : VariableLengthField—Specifies the user token. The user ID and profile are used to create the user token. The user token is passed along to the IMS dependent region. If the client has already called FACF, it should pass the Utoken with field type X'00' so that RACF is not called again.

Variable length, from 1 to 80 bytes.

UserIDLength : OneByteField—Specifies the length of the user ID.

Length does not include length field itself.

UserIDType : OneByteField. Specifies that this field contains a user ID. (Value X'02').

UserID: VariableLengthField—Specifies the actual user ID. Variable length, from 1 to 10 bytes.

ProfileLength : OneByteField. Specifies the length of the profile. Length does not include length field itself.

ProfileType : OneByteField Specifies that this field contains a profile. (Value X'03').

Profile : VariableLengthField. Specifies the system authorization facility (SAF) profile. For RACF, thiis is the group name.

Variable length, from 1 to 10 bytes.

DefinedTypes

TSecurityFlag

Private Attributes:

NoSecurity : String

No Security (value X'N')—Specifies that no security checking is to be done.

Check : String

Check (value X'C')—Specifies that transaction and command security checking is to be performed.

Full : String

Full (value X'F')

Specifies that transaction, command, and MPP region security checking is to be performed.

UserData

UserData

This includes any special information needed by the client.

The user-data section is variable length and follows the security-data section of the message prefix. It can contain any data.

Private Attributes:

Length : TwoByteField

Specifies the length of the user-data section of the message prefix, including the length field. The maximum length of the user data is 1024 bytes.

UserData : VariableLengthField

Specifies the optional user data. This data is managed by the client, and can be created and updated using the DFSYDRUO exit routine. The server returns this section unchanged to the client as the first segment of any output messages.

Primitives

OneByteField

TwoByteField

FourByteField

EightByteField

SixteenByteField

SixByteField

VariableLengthField

ApplicationData

ApplicationData

The application data class contains all the message data except for LL, ZZ, and the transaction code.

Note: this model does not capture the notion of message segments. When using this model you have to bear in mind whether the system you are using has any limitations such as a maximum segment size. IMS connectors (via OTMA or SNA) must support the capability of breaking the "application data" into IMS message segments. For instance, if you are sending this XML message directly to the IMS message queue and if the message queue has a 32 k limit, then you have to take your XML message and break it up into 32 k chunks. The application on IMS will then have to gather up the 32 k chunks one by one. IMS new applications that receive XML documents directly, must be capable of receiving XML documents in multiple segments. For ACK or NAK messages, there is no application data included in the message.

Field

Each data field, defined in a copybook for the application data, will be associated with type descriptor for data types.

6. b. CICS BMS (Basic Mapping Support) Metamodel

FIG. 35 illustrates a BMS language metamodel, which is usable by application programs to define data structures which represent connector interfaces. FIG. 36 illustrates attributes, fields, attribute values, maps, and attributes of the BMS Language Model. FIG. 36 illustrates attributes, fields, attribute values, maps, and attributes of the BMSMetamodel.

BMSFieldAttributes

Private Attributes:

justify : justifyvValues attrb : attrbValues color : colorValue="DEFAULT"

hiLight : hiLightValue="OFF"

validn : validnValues outline : outlineValues sosi : yesno="NO"

transp : yesno="YES"

caSe: caseValue ps : psValue="BASE"

BMSMap

Implemented by DFHMDI macro

MAPNAME is the name of the map and consists of 1-7 characters.

COLUMN specifies the column in a line at which the map is to be placed, that is, it establishes the left or right map margin.

JUSTIFY controls whether map and page margin selection and column counting are to be from the left or right side of the page. The columns between the specified map margin and the page margin are not available for subsequent use on the page for any lines included in the map.

NUMBER is the column from the left or right page margin where the left or right map margin is to be established.

NEXTindicates that the left or right map margin is to be placed in the next available column from the left or right on the current line.

SAME indicates that the left or right map margin is to be established in the same column as the last non-header or nontrailer map used that specified COLUMN=number and the same JUSTIFY operands as this macro. For input operations, the map is positioned at the extreme left-hand or right-hand side, depending on whether JUSTIFY=LEFT or JUSTIFY=RIGHT has been specified.

LINE specifies the starting line on a page in which data for a map is to be formatted.

NUMBER is a value in the range 1-240, specifying a starting line number. A request to map, on a line and column, data that has been formatted in response to a preceding BMS command, causes the current page to be treated as though complete. The new data is formatted at the requested line and column on a new page.

NEXT specifies that formatting of data is to begin on the next available completely empty line. If LINE=NEXT is specified in the DFHMDI macro, it is ignored for input operations and LINE=1 is assumed.

SAME specifies that formatting of data is to begin on the same line as that used for a preceding BMS command. If COLUMN=NEXT is specified, it is ignored for input operations and COLUMN=1 is assumed. If the data does not fit on the same line, it is placed on the next available line that is completely empty.

SIZE(arg1,arg2) specifies the size of a map. arg2=line is a value in the range 1-240, specifying the depth of a map as a number of lines. arg1=column is a value in the range 1-240, specifying the width of a map as a number of columns.

This operand is required in the following cases:

An associated DFHMDF macro with the POS operand is used.

The map is to be referred to in a SEND MAP command with the ACCUM option.

The map is to be used when referring to input data from other than a 3270 terminal in a RECEIVE MAP command.

SOSI indicates that the field may contain a mixture of EBCDIC and DBCS data. The DBCS subfields within an EBCDIC field are delimited by SO (shift out) and SI (shift in) characters. SO and SI both occupy a single screen position (normally displayed as a blank). They can be included in any non-DBCS field on output, if they are correctly paired. The terminal user can transmit them inbound if they are already present in the field, but can add them to an EBCDIC field only if the field has the SOSI attribute.

TIOAPFX specifies whether BMS should include a filler in the symbolic description maps to allow for the unused TIOA prefix. This operand overrides the TIOAPFX operand specified for the DFHMSD macro.

YES specifies that the filler should be included in the symbolic description maps. If TIOAPFX=YES is specified, all maps within the mapset have the filler. TIOAPFX=YES should always be used for command-level application programs.

NO is the default and specifies that the filler is not to be included.

Derived from BMSStatement
Private Attributes:
column : String
color : BMSColorType
control : BMSControlType
cursorLocation : boolean
data : BMSDataType
descriptionAttributes : BMSMapAttributesType
extendedAttributes : BMSExtendedAttributesType
fields : boolean
fieldSeparator : String
header : boolean
highlighting : BMSHighlightingType
justify : BMSJustifyType
line : String
mapAttributes : BMSMapAttributesType
outboardFormatting : boolean
outlining : BMSOutliningType
partition : String
programmedSymbol : String
shiftOutShiftIn : boolean
size : BMSSizeType
terminal : String
tioaPrefix : boolean
trailer : boolean
transparent : boolean
validation : BMSValidationType BMSMapset
Implemented by the DFHMSD macro
Programming attributes in this class
type=DSECT|MAP|FINAL. Mandatory, this generates the two bits of a BMS entity
mode=OUT|IN|INOUT. OUT is default. INOUT says do both IN and OUT processing. With IN, I is appended to mapname, with OUT, O is appended to mapname
lang=ASM|COBOL|COBOL2|PLI|C. ASM is default.
fold=LOWER|UPPER. LOWER is default. Only applies to C.
dsect=ADS|ADSL. ADS is default. ADSL requires lang=C.
trigraph=YES only applies to lang=C.
BASE specifies that the same storage base is used for the symbolic description maps from more than one mapset. The same name is specified for each mapset that is to share the same storage base.

Because all mapsets with the same base describe the same storage, data related to a previously used mapset may be overwritten when a new mapset is used. Different maps within the same mapset also overlay one another.

This operand is not valid for assembler-language programs, and cannot be used when STORAGE=AUTO has been specified.

term=type. Each terminal type is represented by a character. 3270 is default and is a blank. Added to MAPSET name, or, suffix=numchar which is also added to mapset name.

CURSLOC indicates that for all RECEIVE MAP operations using this map on 3270 terminals, BMS sets a flag in the application data structure element for the field where the cursor is located.

STORAGE
The meaning of this operand depends upon the language in which application programs are written, as follows:

For a COBOL program, STORAGE=AUTO specifies that the symbolic description maps in the mapset are to occupy separate (that is, not redefined) areas of storage. This operand is used when the symbolic description maps are copied into the working-storage section and the storage for the separate maps in the mapset is to be used concurrently.

For a C program, STORAGE=AUTO specifies that the symbolic description maps are to be defined as having the automatic storage class.

If STORAGE=AUTO is not specified, they are declared as pointers. You cannot specify both BASE=name and STORAGE=AUTO for the same mapset.

If STORAGE=AUTO is specified and TIOAPFX is not, TIOAPFX=YES is assumed.

For a PL/I program, STORAGE=AUTO specifies that the symbolic description maps are to be declared as having the AUTOMATIC storage class. If STORAGE=AUTO is not specified, they are declared as BASED. You cannot specify both BASE=name and STORAGE=AUTO for the same mapset. If STORAGE=AUTO is specified and TIOAPFX is not, TIOAPFX=YES is assumed.

For an assembler-language program, STORAGE=AUTO specifies that individual maps within a mapset are to occupy separate areas of storage instead of overlaying one another.

Derived from BMSStatement
Private Attributes:
base : String
color : BMSColorType
control : BMSControlType
cursorLocation : boolean
data : BMSDataType
descriptionAttributes : BMSMapAttributesType
extendedAttributes : BMSExtendedAttributesType
fieldSeparator : String
fold : BMSFoldType
highlighting : BMSHighlightingType
horizontalTabs : int
language : BMSLanguageType
logicalDeviceCode : int
mapAttributes : BMSMapAttributesType
mode : BMSModeType
outboardFormatting : boolean
outlining : BMSOutliningType
partition : String
programmedSymbol : String
shiftOutShiftIn : boolean
storage : boolean
suffix : String
terminal : String
tioaPrefix : boolean
transparent : boolean
trigraph : boolean
type : BMSMapsetType
validation : BMSValidationType
verticalTabs : int
BMSField
  Implemented by the DFHMDF macro.
    GRPNAME is the name used to generate symbolic storage definitions and to combine specific fields under one group name. The same group name must be specified for each field that is to belong to the group. The length of the name is up to 30 characters though you should refer to your compiler manual to make sure that there are no other restrictions on the length.
    If this operand is specified, the OCCURS operand cannot be specified.
    The fields in a group must follow on; there can be gaps between them, but not other fields from outside the group. A field name must be specified for every field that belongs to the group, and the POS operand must also be specified to ensure that the fields follow each other. All the DFHMDF macros defining the fields of a group must be placed together, and in the correct order (ascending numeric order of the POS value).
    For example, the first 20 columns of the first six lines of a map can be defined as a group of six fields, as long as the remaining columns on the first five lines are not defined as fields.
    The ATTRB operand specified on the first field of the group applies to all of the fields within the group.
    LENGTH specifies the length (1-256 bytes) of the field or group of fields. This length should be the maximum length required for application program data to be entered into the field; it should not include the one-byte attribute indicator appended to the field by CICS for use in subsequent processing. The length of each individual subfield within a group must not exceed 256 bytes. LENGTH can be omitted if PICIN or PICOUT is specified, but is required otherwise. You can specify a length of zero only if you omit the label (field name) from the DFHMDF macro.
    That is, the field is not part of the application data structure and the application program cannot modify the attributes of the field. You can use a field with zero length to delimit an input field on a map.
    The map dimensions specified in the SIZE operand of the DFHMDI macro defining a map can be smaller than the actual page size or screen size defined for the terminal.
    If the LENGTH specification in a DFHMDF macro causes the map-defined boundary on the same line to be exceeded, the field on the output screen is continued by wrapping.
    OCCURS specifies that the indicated number of entries for the field are to be generated in a map, and that the map definition is to be generated in such a way that the fields are addressable as entries in a matrix or an array. This permits several data fields to be addressed by the same name (subscripted) without generating a unique name for each field.
    OCCURS and GRPNAME are mutually exclusive; that is, OCCURS cannot be used when fields have been defined under a group name. If this operand is omitted, a value of OCCURS=1 is assumed.
    PICIN (COBOL and PL/I only) specifies a picture to be applied to an input field in an IN or INOUT map; this picture serves as an editing specification that is passed to the application program, thus permitting the user to exploit the editing capabilities of COBOL or PL/I. BMS checks that the specified characters are valid picture specifications for the language of the map.
    However, the validity of the input data is not checked by BMS or the high-level language when the map is used, so any desired checking must be performed by the application program. The length of the data associated with "value" should be the same as that specified in the LENGTH operand if LENGTH is specified. If both PICIN and PICOUT are used, an error message is produced if their calculated lengths do not agree; the shorter of the two lengths is used. If PICIN or PICOUT is not coded for the field definition, a character definition of the field is automatically generated regardless of other operands that are coded, such as ATTRB=NUM.
  Note: The valid picture values for COBOL input maps are:
  A P S V X 9 / and (
  The valid picture values for PL/I input maps are:
  A B E F G H I K M P R S T V X Y and Z
  1 2 3 6 7 8 9/+−,. * $ and (
  For PL/I, a currency symbol can be used as a picture character. The symbol can be any sequence of characters enclosed in<and>, for example<DM>.
  Refer to the appropriate language reference manual for the correct syntax of the PICTURE attribute.
  PICOUT (COBOL and PL/I only) is similar to PICIN, except that a picture to be applied to an output field in the OUT or INOUT map is generated.

The valid picture values for COBOL output maps are:
A B E P S V X Z 0 9 ,. +−$ CR DB/ and (
The valid picture values for PL/I output maps are:
A B E F G H I K M P R S T V X Y and Z
1 2 3 6 7 8 9/+−,. * $ CR DB and (
For PL/I, a currency symbol can be used as a picture character. The symbol can be any sequence of characters enclosed in<and>, for example<DM>.
Refer to the appropriate language reference manual for the correct syntax of the PICTURE attribute.
Note: COBOL supports multiple currency signs and multi-character currency signs in PICTURE specifications.
The default currency picture symbol is the dollar sign ($),which represents the national currency symbol; for example the dollar ($), the pound (£), or the yen (¥).
The default currency picture symbol may be replaced by a different currency picture symbol that is defined in the SPECIAL NAMES clause. The currency sign represented by the picture symbol is defined in the same clause. For example:
SPECIAL NAMES.
CURRENCY SIGN IS '$' WITH PICTURE SYMBOL '$'.
CURRENCY SIGN IS '£' WITH PICTURE SYMBOL '£'.
CURRENCY SIGN IS 'EUR' WITH PICTURE SYMBOL '#'.
WORKING STORAGE SECTION.
  01 USPRICE PIC $99.99.
  01 UKPRICE PIC £99.99.
  01 ECPRICE PIC #99.99.
  LENGTH must be specified when PICOUT specifies a COBOL picture containing a currency symbol that will be replaced by a currency sign of length greater than 1.
  POS specifies the location of a field. This operand specifies the individually addressable character location in a map at which the attribute byte that precedes the field is positioned.
  number specifies the displacement (relative to zero) from the beginning of the map being defined.
  (line,column) specify lines and columns (relative to one) within the map being defined.
  The location of data on the output medium is also dependent on DFHMDI operands.
  The first position of a field is reserved for an attribute byte. When supplying data for input mapping from non-3270 devices, the input data must allow space for this attribute byte. Input data must not start in column 1 but may start in column 2.
  The POS operand always contains the location of the first position in a field, which is normally the attribute byte when communicating with the 3270. For the second and subsequent fields of a group, the POS operand points to an assumed attribute-byte position, ahead of the start of the data, even though no actual attribute byte is necessary. If the fields follow on immediately from one another, the POS operand should point to the last character position in the previous field in the group.
  When a position number is specified that represents the last character position in the 3270, two special rules apply:
    ATTRIB=IC should not be coded. The cursor can be set to location zero by using the CURSOR option of a SEND MAP, SEND CONTROL, or SEND TEXT command.
    If the field is to be used in an output mapping operation with MAP=DATAONLY on the SEND MAP command, an attribute byte for that field must be supplied in the symbolic map data structure by the application program.
  PS specifies that programmed symbols are to be used. This overrides any PS operand set by the DFHMDI macro or the DFHMSD macro.
  BASE is the default and specifies that the base symbol set is to be used.
  psid specifies a single EBCDIC character, or a hexadecimal code of the form X'nn', that identifies the set of programmed symbols to be used.
  The PS operand is ignored unless the terminal supports programmed symbols.
  SOSI indicates that the field may contain a mixture of EBCDIC and DBCS data. The DBCS subfields within an EBCDIC field are delimited by SO (shift out) and SI (shift in) characters. SO and SI both occupy a single screen position (normally displayed as a blank). They can be included in any non-DBCS field on output, if they are correctly paired. The terminal user can transmit them inbound if they are already present in the field, but can add them to an EBCDIC field only if the field has the SOSI attribute.
  TRANSP determines whether the background of an alphanumeric field is transparent or opaque, that is, whether an underlying (graphic) presentation space is visible between the characters.
Derived from BMSStatement
Private Attributes:
attributes : BMSAttributesType
case : boolean
color : BMSColorType
group : String
highlighting : BMSHighlightingType
initialValue : String
justify : BMSjustifyType
length : int
occurs : int
outlining : BMSOutliningType
pictureInput : String
pictureOutput : String
position : BMSPositionType
programmedSymbol : String
shiftOutShiftIn : String
transparent : boolean
validation : BMSValidationType
BMSStatement
  Private Attributes:
  label : String
  comments : String
TOTALS
1 Logical Packages
4 Classes
LOGICAL PACKAGE STRUCTURE
Logical View
bms 6. c. IMS MFS (Messaging Formatting Service)

FIG. 37 illustrates a MFS language metamodel, which is usable by application programs to define data structures which represent connector interfaces. FIG. 38 illustrates the associations between the MFS metamodel with the TDLang base classes which are the TDLang-Classifier, the TDLanguageComposedType, and the TDLanguageElement for the MFS Metamodel. FIG. 39 illustrates enumerations of Mode Values, Base Values, LengthTypes, and StringTypeValues for the MFS Metamodel.

Package Documention for MFS

The following device types are supported:
   3270 and 3270-An
   3270P

The following device types are not supported:
   2740 or 2741
   3600 or 4700
   FIN
   FIDS, FIDS3, FIDS4 or FIDS7
   FIJP, FIPB or FIFP
   SCS1
   SCS2
   DPM-An
   DPM-Bn Statements implicitly supported through parser:
   ALPHA
   COPY
   DO
   END
   ENDDO
   EQU
   FMTEND
   MSGEND
   RESCAN
   TABLEEND Tolerated statements:
   EJECT
   PD
   PDB
   PDBEND
   PPAGE
   PRINT
   RCD
   SPACE
   STACK
   TITLE
   UNSTACK MFSDeviceType
  DEV statement
    The DEV statement defines device characteristics for a specific device or data formats for a specific device type. The DFLD statements following this DEV statement are mapped using the characteristics specified until the next DEV or FMTEND statement is encountered.
  Unsupported attributes:
    ERASE
    FTAB
    FORMS
    HT
    HTAB
    LDEL
    MODE
    SLD
    VERSID
    VT
    VTAB Derived from MFSStatement Private Attributes:

card : String
  CARD attribute
    Defines the input field name to receive operator identification card data when that data is entered. This name can be referenced by an MFLD statement and must not be used as the label of a DFLD statement within this DEV definition. This operand is valid only if a 3270 display is specified. If FEAT=NOCD is specified for a 3270 display, it is changed to CARD. All control characters are removed from magnetic card input before the data is presented to the input MFLD that refers to this card field name.
    For 3270 displays, an unprotected field large enough to contain the magnetic card data and control characters must be defined through a DFLD statement. Position the cursor to this field and insert the card in the reader to enter card information. The card data is logically associated with the CARD=field name, not the name used in the DFLD statement.

dsca : String
  DSCA attribute
    Specifies a default system control area (DSCA) for output messages using this device format. The DSCA supersedes any SCA specified in a message output descriptor if there are conflicting specifications. Normally, the functions specified in both SCAs are performed. If the DSCA=operand is specified for 3270P, it is ignored, except for the bit setting for "sound device alarm." If this bit is specified on the DSCA/SCA option, it is sent to the device.
    The value specified here must be a decimal number not exceeding 65535 or X'hhhh'. If the number is specified, the number is internally converted to X'hhhh'.
    If byte 1 bit 5 is set to B'1' (unprotect screen option) for a 3275 display, and both input and output occur simultaneously (contention), the device is disconnected. For non-3275 devices, the SCA option is ignored. If byte 1 bit 5 is set to B'0', the application program can request autopaged output by setting the SCA value to B'1'. This request is honored only if present in the first segment of the first LPAGE of the output message.
    If a nonzero value is specified for byte 0, or for bit 6 or 7 in byte 1, MFS overrides the specified value with zero.

features : MFSFeatureType
  FEAT attribute
    Specifies features for this device or program group.
  IGNORE
    Specifies that device features are to be ignored for this device.
  120|126|132
    Specifies line length for 3284, and 3286 device types (TYPE=3270P).
  CARD
    Specifies that the device has a 3270 operator identification card reader.
    NOCD specifies the absence of the CARD feature.
  DEKYBD
    Specifies data entry keyboard feature. This feature implies PFK feature; therefore, PFK is invalid if DEKYBD is specified. NOPFK implies the absence of PFK and DEKYBD features.

PFK

Specifies that the device has program function keys. NOPFK specifies the absence of the PFK and DEKYBD features.

PEN

Specifies the selector light pen detect feature. NOPEN specifies the absence of the PEN feature.

1|2|3|4|5|6|7|8|9|10

Specifies customer-defined features for the 3270P device type.

For 3270P devices, FEAT=allows grouping of devices with special device characteristics. For example, FEAT=1 could group devices with a maximum of 80 print positions and no VFC, and FEAT=2 could group devices with 132 print positions and the VFC feature. FEAT=IGNORE should be specified to group together devices with a minimum set of device capabilities. When WIDTH=is specified, FEAT=(1 . . . 10) must also be specified. If FEAT=(1 . . . 10) is specified but WIDTH=is not specified, WIDTH=defaults to 120.

When IGNORE is specified, no other values should be coded in the FEAT=operand. When FEAT=IGNORE is not specified in the TERMINAL macro during system definition, the MSG statement must specify IGNORE in the SOR=operand for the device format with the IGNORE specification. Unless FEAT=IGNORE is used, FEAT=must specify exactly what was specified in the TERMINAL macro during IMS system definition. If it does not, the DFS057 error message is issued. When FEAT=IGNORE or 1-10 is specified for 3270 devices, the operands PEN=, CARD=, and PFK=can still be specified. When TYPE=3270P and FEAT=IGNORE, MFS allows a line width of 120 characters.

CARD, PFK, DEKYBD, and PEN feature values are valid only for 3270 displays. If the FEAT=operand is omitted, the default features are CARD, PFK, and PEN for 3270 displays; the default line width is 120 for TYPE=3270P.

1, 2, 3, 4, 5, 6, 7, 8, 9, and 10 are valid values only for 3270, 3270P and 3270-An. For 3270 displays, the FEAT=specifications of 1 to 5 can be used to group devices with specific features or hardware data stream dependencies.

Restriction: This keyword is optional and cannot be used with any other feature specification for 3270 displays.

Feature operand values can be specified in any order, and only those values desired need be specified. The underlined values do not have to be specified because they are defaults. Only one value in each vertical list can be specified.

page : MFSPageType

PAGE attribute

Specifies output parameters as follows:

number

For printer devices, number defines the number of print lines on a printed page; for card devices, number defines the number of cards to be punched per DPAGE or physical page (if pp parameter is used in the DFLD statements). This value is used for validity checking. The number specified must be greater than or equal to 1 and less than 256. The default is 55.

DEFN

Specifies that lines/cards are to be printed/punched as defined by DFLD statements (no lines/cards are to be removed or added to the output page).

SPACE

Specifies that each output page contains the exact number of lines/cards specified in the number parameter.

FLOAT

Specifies that lines/cards with no data (all blank or NULL) after formatting are to be deleted.

For 3270P devices, some lines having no data (that is, all blank or null) must not be deleted under the following circumstances:

The line contains one or more set line density (SLDx=) specifications.

A field specified as having extended attributes spans more than one line.

pen : String

PEN attribute

Defines an input field name to contain literal data when an immediate light pen detection of a field with a space or null designator character occurs. The literal data is defined on the DFLD statement with the PEN=operand. (See PEN=operand on the DFLD statement.) This name can be referred to by an MFLD statement and must not be used as the label of a DFLD statement within this DEV definition. The PEN=operand is valid only for 3270 displays. If FEAT=NOPEN is specified, it is changed to PEN.

If an immediate detect occurs on a field defined with a space or null designator character, and either another field has been selected or modified or has the MOD attribute, or the PEN=operand is not defined for the DFLD, a question mark (?) is inserted in the PEN=field name.

If no immediate detection occurs or the immediate detect occurs on a field defined with an ampersand (&) designator character, the PEN=operand is padded with the fill specified in the MFLD statement.

pfk : MFSFunctionKeyType

PFK attribute

Defines an input field name to contain program function key literal or control function data (first subparameter) and, in positional or keyword format, either the literal data to be placed in the specified field, or the control function to be performed when the corresponding function key is entered (remaining subparameters).

The name of the first subparameter (the input field name that will contain the program function key literal or control function data) can be referred to by an MFLD statement and must not be used as the label of a DFLD statement within this DEV definition. The remaining subparameters can be specified in positional or keyword format. If the subparameters are in keyword format, the integer specified must be from 1 to 36, inclusive, and not duplicated. Only one PFK=operand format (positional or keyword) can be specified on a DEV statement. This operand is valid only for 3270 displays. At the time the actual format blocks are created, each literal is padded on the right with blanks to the length of the largest literal in the list. The maximum literal length is 256 bytes.

If the device supports the IMS copy function, then PFK 12 invokes the copy function and the definition of PFK 12 in the DEV statement is ignored; otherwise, the definition of PFK 12 is honored.

If FEAT=NOPFK is specified, it is changed to PFK. The maximum number of user-defined PFKs is 36.

Control functions that can be specified are:

NEXTPP—PAGE ADVANCE
Specifies a request for the next physical page in the current output message. If no output message is in progress, no explicit response is made.

NEXTMSG—MESSAGE ADVANCE
Specifies a request to dequeue the output message in progress (if any) and to send the next output message in the queue (if any).

NEXTMSGP—MESSAGE ADVANCE PROTECT
Specifies a request to dequeue the output message in progress (if any), and send the next output message or return an information message indicating that no next message exists.

NEXTLP—NEXT LOGICAL PAGE
Specifies a request for the next logical page of the current message.

ENDMPPI—END MULTIPLE PAGE INPUT
Specifies the end of a multiple physical page input message.

substitution : String
  SUB attribute
  Specifies the character used by MFS to replace any X'3F' characters in the input data stream. No translation occurs if this parameter is specified as X'3F' or this parameter is not specified, or the input received bypasses MFS editing. The specified SUB character should not appear elsewhere in the data stream; therefore, it should be nongraphic.
  X'hh'
  Character whose hexadecimal representation is 'hh' replaces all X'3F' in the input data stream.
  C'c'
  Character 'c' replaces all X'3F' in the input data stream.

type : String
  TYPE attribute
  Specifies the device type and model number of a device using this format description. The 3284-3 printer attached to a 3275 is supported only as TYPE=3270P. The model number specified when defining a format for a 3284-3 is the model number of the associated 3275.
  TYPE=3270-An specifies a symbolic name for 3270 and SLU 2 displays with the screen size defined during IMS system definition, feature numbers n=1-15. This specification causes the MFS Language utility to read the MFS device characteristics table (DFSUDT0x) to extract the screen size.

width : int
  WIDTH attribute
  Specifies the maximum line width for this DEV type as one of:
    Number of print positions per line of input or output data
    Number of punch positions per card of input or output data
    Card width for card reader input data
  The default is 120 for 3270P output. Line width is specified relative to column 1, regardless of whether a left margin value is specified in the HTAB=keyword. The width specified must be greater than or equal to 1.
  For 3270P devices, if WIDTH is specified, then FEAT=(1 . . . 10) must also be specified. If FEAT=(1 . . . 10) is specified, and WIDTH=is not specified, WIDTH=defaults to 120.

MFSMessageDescriptor
  MSG statement
  The MSG statement initiates and names a message input or output definition.
  Unsupported attributes:
    All attributes are supported
  Derived from MFSStatement
  Private Attributes:
  fill : String
    FILL attribute
    Specifies a fill character for output device fields. This operand is valid only if TYPE=OUTPUT. The default is C' '. The fill specification is ignored unless FILL=NONE is specified on the DPAGE statement in the FMT definition. For 3270 output when EGCS fields are present, only FILL=PT or FILL=NULL should be specified. A FILL=PT erases an output field (either a 1- or 2-byte field) only when data is sent to the field, and thus does not erase the DFLD if the application program message omits the MFLD.
    C'c'
    Character 'c' is used to fill device fields. For 3270 display devices, any specification with a value less than X'3F' is changed to X'00' for control characters or to X'40' for other nongraphic characters. For all other devices, any FILL=C'c' specification with a value less than X'3F' is ignored and defaulted to X'3F' (which is equivalent to a specification of FILL=NULL).
    NULL
    Specifies that fields are not to be filled.
    PT
    Is identical to NULL except for 3270 display. For 3270 display, PT specifies that output fields that do not fill the device field (DFLD) are followed by a program tab character to erase data previously in the field.

ignoreSource : boolean
    SOR attribute
    Specifies the source name of the FMT statement which, with the DEV statement, defines the terminal or remote program data fields processed by this message descriptor. Specifying IGNORE for TYPE=OUTPUT causes MFS to use data fields specified for the device whose FEAT=operand specifies IGNORE in the device format definition. For TYPE=INPUT, IGNORE should be specified only if the corresponding message output descriptor specified IGNORE. If you use SOR=IGNORE, you must specify IGNORE on both the message input descriptor and the message output descriptor.

option : int
    OPT attribute
    Specifies the message formatting option used by MFS to edit messages.
    The default is 1.

paging : boolean
    PAGE attribute
    Specifies whether (YES) or not (NO) operator logical paging (forward and backward paging) is to be provided for messages edited using this control block. This operand is valid only if TYPE=OUTPUT. The default is NO, which means that only forward paging of physical pages is provided.

type : MFSDescriptorType

TYPE attribute

Defines this definition as a message INPUT or OUTPUT control block.

The default is INPUT.

MFSLogicalPage

LPAGE statement

The optional LPAGE statement defines a group of segments comprising a logical page. It is implied if not present.

Unsupported attributes:

All attributes are supported

Derived from MFSStatement

Private Attributes:

condition : MFSConditionType

COND attribute

Describes a conditional test that, if successful, specifies that the segment and field definitions following this LPAGE are to be used for output editing of this logical page. The specified portion of the first segment of a logical page is examined to determine if it is greater than (>), less than (<), greater than or equal to (°), less than or equal to (°), equal to (=), or not equal to (ne) the specified literal value to determine if this LPAGE is to be used for editing. COND= is not required for the last LPAGE statement in the MSG definition.

The area examined can be defined by a field name (mfldname), an offset in a field (mfldname(pp) where pp is the offset in the named field), or an offset in the segment (segoffset). If the mfldname(pp) form is used, pp must be greater than or equal to 1. The length of the compare is the length of the specified literal. If OPT=3 is specified on the previous MSG statement, the area to be examined must be within one field as defined on an MFLD statement.

If segoffset is used, it is relative to zero, and the specification of that offset must allow for LLZZ of the segment (that is, the first data byte is at offset 4).

If pp is used, the offset is relative to 1 with respect to the named field (that is, the first byte of data in the field is at offset 1, not zero).

If the mfldname specified is defined with ATTR=YES, the pp offset must be used. The minimum offset specified must be 3. That is, the first byte of data in the field is at offset 3, following the two bytes of attributes.

If ATTR=nn is specified, the minimum offset must be one plus twice nn. Thus, if ATTR=2 is specified, pp must be at least 5, and, if ATTR=(YES,2) is specified, pp must be at least 7.

If the conditional tests for all LPAGEs fail, the last LPAGE in this MSG definition is used for editing.

If LPAGE selection is to be specified using the command data field, that is, /FORMAT modname . . . (data), the MFLD specified in the LPAGE COND=mfldname parameter should be within the first 8 bytes of the associated LPAGEs of the MOD.

promptValue : String

MFSSegment

SEG statement

The SEG statement delineates message segments and is required only if multisegment message processing is required by the application program. Output message segments cannot exceed your specified queue buffer length. Only one segment should be defined for TYPE=INPUT MSGs when the input message destination is defined as a single segment command or transaction. If more than one segment is defined, and the definition is used to input a single segment command or transaction, care must be used to ensure that your input produces only one segment after editing. It is implied if not present.

Unsupported attributes:

All attributes are supported

Derived from MFSStatement

Private Attributes:

exit : MFSExitType

EXIT attribute

Describes the segment edit exit routine interface for this message segment. exitnum is the exit routine number and exitvect is a value to be passed to the exit routine when it is invoked for this segment. exitnum can range from 0 to 127. exitvect can range from 0 to 255. The SEG exit is invoked when processing completes for the input segment.

graphic : boolean

GRAPHIC attribute

Specifies for MSG TYPE=INPUT whether (YES) or not (NO) IMS should perform upper case translation on this segment if the destination definition requests it (see the EDIT=parameter of the TRANSACT or NAME macro). The default is YES. If input segment data is in nongraphic format (packed decimal, EGCS, binary, and so forth), GRAPHIC=NO should be specified. When GRAPHIC=NO is specified, FILL=NULL is invalid for MFLDs within this segment.

The list below shows the translation that occurs when GRAPHIC=YES is specified and the input message destination is defined as requesting upper case translation:

Before Translation After Translation a through z

A through Z

X'81' through X'89'

X'C1' through X'C9'

X'91' through X'99'

X'D1' through X'D9'

X'A2' through X'A9'

X'E2' through X'E9'

If FILL=NULL is specified for any MFLD in a segment defined as GRAPHIC=YES, the hexadecimal character X'3F' is compressed out of the segment. If GRAPHIC=NO and FILL=NULL are specified in the SEG statement, any X'3F' in the non-graphic data stream is compressed out of the segment and undesirable results might be produced. Non-graphic data should be sent on output as fixed length output fields and the use of FILL=NULL is not recommended in this case.

For MSG TYPE=OUTPUT, the GRAPHIC=keyword applies only for DPM. It specifies whether (YES) or not (NO) nongraphic control characters (X'00' to X'3F') in the data from the IMS application program are to be replaced by blanks. The default value is YES. If NO is specified, MFS allows any bit string received from an IMS application program to flow unmodified through MFS to the remote program.

Restriction : When GRAPHIC=NO is specified, IMS application programs using options 1 and 2 cannot omit segments in the middle of an LPAGE, or truncate or omit fields in the segment using the null character (X'3F').

MFSMessageField

MFLD statement

The MFLD statement defines a message field as it will be presented to an application program as part of a message output segment. At least one MFLD statement must be specified for each MSG definition.

Unsupported attributes:

All attributes are supported

Derived from MFSStatement

Private Attributes:

attributes : boolean

ATTR attribute

Specifies whether (YES) or not (NO) the application program can modify the 3270 attributes and the extended attributes (nn). If YES, 2 bytes must be reserved for the 3270 attribute data to be filled in by the application program on output and to be initialized to blanks on input. These 2 bytes must be included in the LTH=specification.

The value supplied for nn is the number of extended attributes that can be dynamically modified. The value of nn can be a number from 1 to 6. An invalid specification will default to 1. Two additional bytes per attribute must be reserved for the extended attribute data to be filled in by the application program on output and to be initialized to blanks on input. These attribute bytes must be included in the MFLD LTH=specification.

Example: Shown below are valid specifications for ATTR=and the number of bytes that must be reserved for each different specification:

MFLD,ATTR=(YES,nn)
    2+(2×nn)
MFLD ,ATTR=(NO,nn)
    2×nn
MFLD ,ATTR=(nn)
    2×nn
MFLD,ATTR=YES
    2
MFLD ,ATTR=NO
    0

ATTR=YES and nn are invalid if a literal value has been specified through the positional parameter in an output message.

The attributes in a field sent to another IMS ISC subsystem are treated as input data by MFS regardless of any ATTR=specifications in the format of the receiving subsystem. For example, a message field (MFLD) defined as ATTR=(YES, 1),LTH=5 would contain the following:

00A0C2F1C8C5D3D3D6

If the MFLD in the receiving subsystem is defined as LTH=9 and without ATTR=, the application program receives:

00A0C2F1C8C5D3D3D6

If the MFLD in the receiving subsystem is defined as LTH=13 and ATTR=(YES, 1), the application program receives:

4040404000A0C2F1C8C5D3D3D6

If the MFLD in the receiving subsystem is defined as LTH=5 and ATTR=(YES, 1), the application program receives:

4040404000A0C2F1C8

The input SEG statement should be specified as GRAPHIC=NO to prevent translation of the attribute data to uppercase.

exit : MFSExitType

EXIT attribute

Describes the field edit exit routine interface for this message field. The exit routine number is specified in exitnum, and exitvect is a value to be passed to the exit routine when it is invoked for this field. The value of exitnum can range from 0 to 127. The value of exitvect can range from 0 to 255. The address of the field as it exists after MFS editing, (but before NULL compression for option 1 and 2), is passed to the edit exit routine, along with the vector defined for the field. (If NOFLDEXIT is specified for a DPM device, the exit routine will not be invoked.) The exit routine can return a code with a value from 0 to 255. MFS maintains the highest such code returned for each segment for use by the segment edit routine. EXIT=is invalid if 'literal' is specified on the same MFLD statement.

extendedAttributes : int

ATTR attribute

Specifies whether (YES) or not (NO) the application program can modify the 3270 attributes and the extended attributes (nn).

If YES, 2 bytes must be reserved for the 3270 attribute data to be filled in by the application program on output and to be initialized to blanks on input. These 2 bytes must be included in the LTH=specification.

The value supplied for nn is the number of extended attributes that can be dynamically modified. The value of nn can be a number from 1 to 6. An invalid specification will default to 1. Two additional bytes per attribute must be reserved for the extended attribute data to be filled in by the application program on output and to be initialized to blanks on input. These attribute bytes must be included in the MFLD LTH=specification.

Example: Shown below are valid specifications for ATTR=and the number of bytes that must be reserved for each different specification:

MFLD ,ATTR=(YES,nn)
    2+(2×nn)
MFLD,ATTR=(NO,nn)
    2×nn
MFLD ,ATTR=(nn)
    2×nn
MFLD,ATTR=YES
    2
MFLD,ATTR=NO
    0

ATTR=YES and nn are invalid if a literal value has been specified through the positional parameter in an output message.

The attributes in a field sent to another IMS ISC subsystem are treated as input data by MFS regardless of any ATTR=specifications in the format of the receiving subsystem. For example, a message field (MFLD) defined as ATTR=(YES,1),LTH=5 would contain the following:

00A0C2F1C8C5D3D3D6

If the MFLD in the receiving subsystem is defined as LTH=9 and without ATTR=, the application program receives:

00A0C2F1C8C5D3D3D6

If the MFLD in the receiving subsystem is defined as LTH=13 and ATTR=(YES, 1), the application program receives:

4040404000A0C2F1C8C5D3D3D6

If the MFLD in the receiving subsystem is defined as LTH=5 and ATTR=(YES, 1), the application program receives:

4040404000A0C2F1 C8

The input SEG statement should be specified as GRAPHIC=NO to prevent translation of the attribute data to uppercase.

fill : String
FILL attribute
Specifies a character to be used to pad this field when the length of the data received from the device is less than the length of this field. This character is also used to pad when no data is received for this field (except when MSG statement specifies option 3.) This operand is only valid if TYPE=INPUT. The default is X'40'.

X'hh'
Character whose hexadecimal representation is hh is used to fill fields.
FILL=X'3F' is the same as FILL=NULL.

C'c'
Character c is used to fill fields.

NULL
Causes compression of the message segment to the left by the amount of missing data in the field.

justify : MFSjustifyType
JUST attribute
Specifies that the data field is to be leftjustified (L) or rightjustified (R) and right- or left-truncated as required, depending upon the amount of data expected or presented by the device format control block. The default is L.

length : MFSLengthType
LTH attribute
Can be omitted if a literal is specified in the positional operand (TYPE=INPUT), in which case, length specified for literal is used. If LTH= is specified for a literal field, the specified literal is either truncated or padded with blanks to the specified length. If the MFLD statement appears between a DO and an ENDDO statement, a length value is printed on the generated MFLD statement, regardless of whether LTH= is specified in the MFLD source statement.

value : String
value attribute
This corresponds to the 'literal' field in the following description.
The device field name is specified via the 'device-Fields' relationship.
Specifies the device field name (defined via the DEV or DFLD statement) from which input data is extracted or into which output data is placed. If this parameter is omitted when defining a message output control block, the data supplied by the application program is not displayed on the output device. If the repetitive generation function of MFS is used (DO and ENDDO statements), dfldname should be restricted to 6 characters maximum length. When each repetition of the statement is generated, a 2-character sequence number (01 to 99) is appended to dfldname. If the dfldname specified here is greater than 6 bytes and repetitive generation is used, dfldname is truncated at 6 characters and a 2-character sequence number is appended to form an 8-character name. No error message is provided if this occurs. This parameter can be specified in one of the following formats:

dfldname
Identifies the device field name from which input data is extracted or into which output data is placed.

'literal'
Can be specified if a literal value is to be inserted in an input message.

(dfldname,'literal')
If TYPE=OUTPUT, this describes the literal data to be placed in the named DFLD. When this form is specified, space for the literal must not be allocated in the output message segment supplied by the application program.
If TYPE=INPUT, this describes the literal data to be placed in the message field when no data for this field is received from the device. If this dfldname is used in the PFK parameter of a DEV statement, this literal is always replaced by the PF key literal or control function. However, when this dfldname is specified in the PFK parameter, but the PF key is not used, the literal specified in the MFLD statement is moved into the message field. When physical paging is used, the literal is inserted in the field but is not processed until after the last physical page of the logical page has been displayed.
In both cases, if the LTH=operand is specified, the length of the literal is truncated or padded as necessary to the length of the LTH=specification. If the length of the specified literal is less than the defined field length, the literal is padded with blanks if TYPE=OUTPUT and with the specified fill character (FILL=) if TYPE=INPUT. If no fill character is specified for input, the literal is padded with blanks (the default). The length of the literal value cannot exceed 256 bytes.

(dfldname,system-literal)
Specifies a name from a list of system literals. A system literal functions like a normal literal except that the literal value is created during formatting prior to transmission to the device. The LTH=, ATTR=, and JUST=operands cannot be specified. When this form is specified, space for the literal must not be allocated in the output message segment supplied by the application program.

(,SCA)
Defines this output field as the system control area which is not displayed on the output device. There can be only one such field in a logical page (LPAGE) and it must be in the first message segment of that page. If no logical pages are defined, only one SCA field can be defined and it must be in the first segment of the output message. This specification is valid only if TYPE=OUTPUT was specified on the previous MSG statement.

MFSDevicePage
DPAGE statement
The DPAGE statement defines a logical page of a device format. This statement can be omitted if none of the message descriptors referring to this device format (FMT) contains LPAGE statements and if no specific device option is required. It is implied if not present.
Unsupported attributes:
ACTVPID
COND

OFTAB

ORIGIN

PD

SELECT

Derived from MFSStatement

Private Attributes:

cursor : MFSCursorType

CURSOR attribute

Specifies the position of the cursor on a physical page. Multiple cursor positions may be required if a logical page or message consists of multiple physical pages. The value lll specifies line number, ccc specifies column; both lll and ccc must be greater than or equal to 1. The cursor position must either be on a defined field or defaulted. The default lll,ccc value for 3270 displays is 1,2. For Finance display components, if no cursor position is specified, MFS will not position the cursor—the cursor is normally placed at the end of the output data on the device. For Finance display components, all cursor positioning is absolute, regardless of the ORIGIN=parameter specified.

The dfld parameter provides a method for supplying the application program with cursor information on input and allowing the application program to specify cursor position on output.

Recommendation: Use the cursor attribute facility (specify ATTR=YES in the MFLD statement) for output cursor positioning.

The dfld parameter specifies the name of a field containing the cursor position. This name may be referenced by an MFLD statement and must not be used as the label of a DFLD statement in this DEV definition. The format of this field is two binary halfwords containing line and column number, respectively. When this field is referred to by a message input descriptor, it will contain the cursor position at message entry. If referred to by a message output descriptor, the application program places the desired cursor position into this field as two binary halfwords containing line and column, respectively. Binary zeros in the named field cause the specified lll,ccc to be used for cursor positioning during output. During input, binary zeros in this field indicate that the cursor position is not defined. The input MFLD referring to this dfld should be defined within a segment with GRAPHIC=NO specified or should use EXIT=(0,2) to convert the binary numbers to decimal.

fill : String

FILL attribute

Specifies a fill character for output device fields. Default value for all device types except the 3270 display is X'40'; default for the 3270 display is PT. For 3270 output when EGCS fields are present, only FILL=PT or FILL=NULL should be specified. A FILL=PT erases an output field (either a 1- or 2-byte field) only when data is sent to the field, and thus does not erase the DFLD if the application program message omits the MFLD.

NONE

Must be specified if the fill character from the message output descriptor is to be used to fill the device fields.

X'hh'

Character whose hexadecimal representation is 'hh' will be used to fill the device fields.

C'c'

Character 'c' will be used to fill the device fields.

NULL

Specifies that fields are not to be filled. For devices other than the 3270 display, 'compacted lines' are produced when message data does not fill the device fields.

PT

Specifies that output fields that do not fill the device field (DFLD) are followed by a program tab character to erase data previously in the field; otherwise, this operation is identical to FILL=NULL.

For 3270 display devices, any specification with a value less than X'3F' is changed to X'00' for control characters or to X'40' for other nongraphic characters.

multiplePages : boolean

MULT attribute

Specifies that multiple physical page input messages will be allowed for this DPAGE.

MFSDeviceField

DFLD statement

The DFLD statement defines a field within a device format which is read from or written to a terminal or remote program. Only those areas which are of interest to the IMS or remote application program should be defined. Null space in the format does not need to be defined.

Unsupported attributes:

SLD

Derived from MFSStatement

Private Attributes:

attributes : MFSAttributeType

ATTR attribute extendedAttributes : MFSExtendedAttributeType

EATTR attribute length : int

LTH attribute

Specifies the length of the field. This operand should be omitted if 'literal' is specified in the positional parameter, in which case the length of literal is used as the field length. Unpredictable output formatting can occur if this operand is used in conjunction with a 'literal' and the two lengths are different. The specified LTH=cannot exceed the physical page size of the device.

The maximum allowable length for all devices except 3270, 3604 display, and DPM with RCDCT=NOSPAN is 8000 characters. For 3270 displays, the maximum length is one less than screen size. For example, for a 480-character display, the maximum length is 479 characters. A length of 0 must not be specified. If SCA and LTH=are both specified, LTH must be 2.

POS=and LTH=do not include the attribute character position reserved for a 3270 display device or a DFLD with ATTR=YES specified. The inclusion of this byte in the design of display/printer formats is necessary because it occupies the screen/printed page position preceding each displayed/printed field even though it is not accessible by an application program.

When defining DFLDs for 3270 printers, a hardware ATTRIBUTE character is not used. Therefore, fields must be defined with a juxtaposition that does not allow for the attribute character unless ATTR=YES is specified. However, for printers defined as 3270P the last column of a print line (based on FEAT=, WIDTH=, or the device default width) cannot be used. The last column of the line is reserved for carriage control operations performed by IMS. Thus, if the print line specifies 120 (FEAT=120) and the DFLD specifies POS=(1, 1),LTH=120 then 119 characters are printed on line 1 and one character on line 2.

Detectable fields (DET or IDET) must include four positions in POS and LTH for a 1-byte detection designator character and 3 pad characters, unless the detectable field is the last field on a display line, in which case only one position for the detection designator character is required. The detection designator character must precede field data, and pad characters (if required) follow field data. Detection designator and required pad characters must be supplied by the application program or MFLD literal with the field data. Pad characters can also be required in the preceding field on the device.

pen : String
  PEN attribute
  Specifies a literal to be selected or an operator control function to be performed when this field is detected. If (1) 'literal' is specified, (2) the field is defined as immediately detectable (ATTR=operand), and (3) contains the null or space designator character, the specified literal is placed in the field referred to by the PEN operand of the preceding DEV statement when the field is detected (if no other device fields are modified). If another field on the device is modified, a question mark (?) is provided instead of the literal. Literal length must not exceed 256 bytes.
  If (1) a control function is specified, (2) the field is defined as immediately detectable (ATTR=operand), and (3) contains the null or space designator character, the specified control function is performed when the field is detected and no other device fields are modified. If another field on the device is modified, a question mark (?) is provided and the function is not performed. Control functions that can be specified are:
NEXTPP—PAGE ADVANCE
  Specifies a request for the next physical page in the current output message. If no output message is in progress, no explicit response is made.
NEXTMSG—MESSAGE ADVANCE
  specifies a request to dequeue the output message in progress (if any) and to send the next output message in the queue (if any).
NEXTMSGP—MESSAGE ADVANCE PROTECT
  Specifies a request to dequeue the output message in progress (if any), and send the next output message or return an information message indicating that no next message exists.
NEXTLP—NEXT LOGICAL PAGE
  Specifies a request for the next logical page of the current message.
ENDMPPI—END MULTIPLE PAGE INPUT
  Specifies the end of a multiple physical page input message.
  ENDMPPI is valid only if data has been received and will not terminate multiple page input (MPPI) in the absence of data entry.

position : MFSPositionType
  POS attribute
  Defines the first data position of this field in terms of line (lll), column (ccc), and physical page (pp) of the display format. If pp is omitted, 1 is assumed.
  For DEV TYPE=3270, 3270-An, or 3270P
  lll,ccc,pp
  Specifies the line, column, and optionally, the physical page number for an output field. lll, ccc, and pp must be greater than or equal to 1.
  For 3270 displays, POS=(1,1) must not be specified. Fields must not be defined such that they wrap from the bottom to the top.
  Restriction: On some models of 3270s, the display screen cannot be copied when a field starting on line 1, column 2, has both alphabetic and protect attributes.
value : String
MFSTable
  TABLE statement
  The TABLE statement initiates and names an operator control table that can be referred to by the OPCTL keyword of the DFLD statement. The TABLE statement, and the IF and TABLEEND statements that follow, must be outside of a MSG or FMT definition.
  Unsupported attributes:
    All attributes are supported
Derived from MFSStatement
MFSDeviceDivision
  DIV statement
  The DIV statement defines device formats within a DIF or DOF. The formats are identified as input, output, or both input and output, and can consist of multiple physical pages. Only one DIV statement per DEV is allowed.
  Unsupported attributes:
    RCDCTL
    HDRCTL
    OPTIONS
    OFTAB
    DPN
    PRN
    RDPN
    RPRN
Derived from MFSStatement
Private Attributes:
type : MFSDescriptorType
  TYPE attribute
  Describes an input only format (INPUT), an output only format (OUTPUT), or both (INOUT).
  If DIV TYPE=OUTPUT or TYPE=INPUT is specified, certain DEV statement keywords are applicable.
compression : MFSCompressionType
  COMPR attribute
  Requests MFS to remove trailing blanks from short fields, fixed-length fields, or all fields presented by the application program.
MFSIfCondition
  IF statement
  The IF statement defines an entry in the table named by the previous TABLE statement. Each IF statement defines a conditional operation and an associated control or branching function to be performed if the condition is true.

Unsupported attributes:
  All attributes are supported
Derived from MFSStatement
Private Attributes:
condition : MFSConditionType
  condition attribute
  Condition has the following format:
  IF (DATA|LENGTH) (=,<,>, ¬, °, °)
  (literal|data-length) function
  DATA
  Specifies that the conditional operation is to be performed against the data received from the device for the field.
  LENGTH
  Specifies that the conditional operation is testing the number of characters entered for the field. The size limit for this field is the same as for DFLDs (see "DFLD Statement" in topic 2.5.1.5.8).
  =,<,>, ¬, °, °
  Specify the conditional relationship that must be true to invoke the specified control function.
  'literal'
  Is a literal string to which input data is to be compared. The compare is done before the input is translated to upper case. If 'literal' is specified, DATA must be specified in the first operand. If the input data length is not equal to the literal string length, the compare is performed with the smaller length, unless the conditional relationship is ¬and the data length is zero, in which case the control function is performed. If the input is in lowercase, the ALPHA statement should be used and the literal coded in lowercase.
  data-length
  Specifies an integer value to which the number of characters of input data for the field is compared.
  NOFUNC
  Specifies that conditional function testing is to be terminated.
  NEXTPP—PAGE ADVANCE
  Specifies a request for the next physical page in the current output message. If no output message is in progress, no explicit response is made.
  NEXTMSG—MESSAGE ADVANCE
  Specifies a request to dequeue the output message in progress (if any) and to send the next output message in the queue (if any).
  NEXTMSGP—MESSAGE ADVANCE PROTECT
  Specifies a request to dequeue the output message in progress (if any), and either send the next output message or return an information message indicating that no next message exists.
  NEXTLP—NEXT LOGICAL PAGE
  Specifies a request for the next logical page of the current message.
  PAGEREQ—LOGICAL PAGE REQUEST
  Specifies that the second through last characters of input data are to be considered as a logical page request.
  ENDMPPI—END MULTIPLE PAGE INPUT
  Specifies the end of multiple physical page input (this input is the last for the message being created).
action : String
MFSPassword
  PASSWORD statement
  The PASSWORD statement identifies one or more fields to be used as an IMS password. When used, the PASSWORD statement and its associated MFLDs must precede the first SEG statement in an input LPAGE or MSG definition. Up to 8 MFLD statements can be specified after the PASSWORD statement but the total password length must not exceed 8 characters. The fill character must be X '40'. For option 1 and 2 messages, the first 8 characters of data after editing are used for the IMS password. For option 3 messages, the data content of the first field after editing is used for the IMS password.
  A password for 3270 input can also be defined in a DFLD statement. If both password methods are used, the password specified in the MSG definition is used.
  Unsupported attributes:
    All attributes are supported
  Derived from MFSStatement
MFSDeviceDescriptor
  FMT statement
  The FMT statement initiates and names a format definition that includes one or more device formats differing only in the device type and features specified in the DEV statement. Each device format included in the format definition specifies the layout for data sent to or received from a device or a remote program.
  Unsupported attributes:
    All attributes are supported
  Derived from MFSStatement
MFSFunctionKeyType
  Private Attributes:
  fieldName : String
MFSFunctionKeyValueType
  Private Attributes:
  index : int
  function : String
MFSFormatLibrary
  This class is designed to duplicate the effects of a FORMATLIB. In other words, it acts as a central point around which MFS sources files are grouped.
  This class was introduced to address the problem of MSG and LPAGE statements referring to MSG statements in other source files. Rather to force the user to parse every source file in a given formatlib at once, this class was added to act as a container to MSG pointers. Please see MFSMessagePointer documentation for more information.
  Private Attributes:
  name : String
MFSMessagePointer
  This class is designed to act as a placeholder for MSG statements. Rather than point to actual MSG statements from the NXT attribute (nextMessage relationship), MSG and LPAGE statements will point to an instance of this class.
  A new instance of this class will be created when a MSG or LPAGE statement points to a MSG statement that is not represented in this particular FORMATLIB. A new instance will also be created when an MSG statement is parsed, if that statement is not already represented here.

Private Attributes:
name : String
TOTALS
1 Logical Packages
16 Classes
LOGICAL PACKAGE STRUCTURE
Logical View
mfs 7. Illustrative Applications of the Common Application Metamodel and System Various complex transaction, occurring across a plurality of individual platforms require the seamlessness and transparency of the Common Application Metamodel. These transactions include "rich" transactions, high level group ware, and financial transactions.

FIG. 40 illustrates a simplified network configuration for a "rich" transaction where, for example, an order is entered at a terminal, and is passed to and through a Web server to a manufacturer's application server. The manufacturer's application server searches through it's own database server, as well as its vendors' dissimilar and incompatible database servers and databases, transparently connected by the connectors described herein, querying for statuses, prices, and delivery dates, of components, and placing orders for needed components to satisfy the order.

Strictly for purposes of illustration and not limitation, a rich transaction is illustrated with the purchase of an automobile, from configuring and ordering the new automobile through financing the automobile, collecting the elements and components the new automobile, assembling the automobile, and delivering it to the customer. In configuring the automobile, consider the inclusion of, e.g., a traction control module, which may require the inclusion of one sub-set of engines, while precluding the inclusion of another sub-set of engines, for example, for technical or performance reasons. Similarly, the selection of one color may preclude the selection of certain upholstery combinations, for example, for reasons of inventory or availability. Of course, if you don't select an engine and a transmission, you don't have an automobile. Certain choices must be made. The problem is one of "If you pick 'X', you must also pick 'Y' and 'Z', but if you pick 'Y', you can not get 'A' or 'B', and you have already selected 'A'." That is, selection of one component or sub-system may remove some previously selected components or sub-systems from the system. After configuring the car, frequently based on the availability of selected elements in the supply pipeline, the order is sent to the manufacturer's server for fulfillment, including manufacturing scheduling. The manufacturer would query the vendors in the supply chain, for example, a transmission vendor, who would, in turn, query controller vendors, gear vendors, housing vendors, hydraulic conduit vendors, and the like. These vendors would, in turn query their sub-vendors.

Using the connector method and system, the dealer and customer would configure and order the car at a terminal 3901. The configuration and order entry would be sent to the manufacturer's server 3911. The manufacturer's server queries the servers 3921, 3931, and 3441, (where server 3921 could be the server for the manufacturer's in house components business and for its purchasing function) or its direct vendors, who in turn query third sub-vendors, 3923, 3933, and 3933. The queries could be in the form of "fill in the blank" SQL queries, subject to access authorizations. The sub-vendor servers, 3923, 3933, and 3443 specialized views to the vendor's servers 3921, 3931, 3441, as clients, which in turn would present specialized views to the manufacturer's server 3911 as a client. The data returned to the manufacturer's server 3911 could be optimized with optimization and production scheduling applications, to present a serial number and delivery date to the buyer at the dealer's server.

A further application of the connectors of the present invention is in connection with groupware, and especially linking "islands of groupware" together. "Groupware" is a broad term applied to technology that is designed to facilitate the work of groups. Groupware technology may be used to communicate, cooperate, coordinate, solve problems, compete, or negotiate. A Groupware suite of applications is comprised of programs that help people work together collectively, even if located remotely from each other. Groupware services can include the sharing of calendars, collective writing, e-mail handling, shared database access, electronic meetings, video conferencing, and other activities.

FIG. 41 illustrates a group ware session spread across multiple group ware applications running on multiple, disparate platforms, and connected by the connectors described herein. Specifically illustrated are two groupware systems 4010 and 4020. Each system contains e-mail enables applications, 4013 and 4023, such as e-mail, schedule/calendar, word processor, spread sheet, graphics, and CTI (computer telephony integration). These are supported by message API's 4015, 4025 and operating systems, 4017 and 4027, and local groupware servers 4011 and 4021. Each of the local groupware servers, 401 1 and 4021, has a connector of the present invention, an e-mail server, an e-mail data base, a directory server, and a replication database. The two groupware servers 4011 and 4021 communicate over a telecommunications medium, as the Net, a LAN, a WAN, or even the PSTN.

E-mail is by far the most common and basic groupware application. While the basic technology is designed to pass simple messages between people, even relatively simple e-mail systems today typically include features for forwarding messages, filing messages, creating mailing groups, and attaching files with a message. Other features that have been explored include content based sorting and processing of messages, content based routing of messages, and structured communication (messages requiring certain information).

Workflow systems are another element of groupware. Work flow systems allow documents to be routed through organizations through a relatively-fixed process. A simple example of a workflow application is an expense report in an organization: an employee enters an expense report and submits it, a copy is archived then routed to the employee's manager for approval, the manager receives the document, electronically approves it and sends it on and the expense is registered to the group's account and forwarded to the accounting department for payment. Workflow systems may provide features such as routing, development of forms, and support for differing roles and privileges.

Hypertext is a system for linking text documents to each other, with the Web being an obvious example. However, whenever multiple people author and link documents, the system becomes group work, constantly evolving and responding to others' work. Another common multi-user feature in hypertext (that is not found on the Web) is allowing any user to create links from any page, so that others can be informed when there are relevant links that the original author was unaware of.

Group calendaring is another aspect of groupware and facilitates scheduling, project management, and coordination among many people, and may provide support for scheduling equipment as well. Typical features detect when schedules conflict or find meeting times that will work for everyone. Group calendars also help to locate people.

Collaborative writing systems may provide both realtime support and non-realtime support. Word processors may provide asynchronous support by showing authorship and by allowing users to track changes and make annotations to documents. Authors collaborating on a document may also be given tools to help plan and coordinate the authoring process, such as methods for locking parts of the document or linking separately-authored documents. Synchronous support allows authors to see each other's changes as they make them, and usually needs to provide an additional communication channel to the authors as they work.

Group may be synchronous or real time, such as shared whiteboards that allow two or more people to view and draw on a shared drawing surface even from different locations. This can be used, for instance, during a phone call, where each person can jot down notes (e.g. a name, phone number, or map) or to work collaboratively on a visual problem. Most shared whiteboards are designed for informal conversation, but they may also serve structured communications or more sophisticated drawing tasks, such as collaborative graphic design, publishing, or engineering applications. Shared whiteboards can indicate where each person is drawing or pointing by showing telepointers, which are color-coded or labeled to identify each person.

A further aspect of groupware is video conferencing. Video conferencing systems allow two-way or multi-way calling with live video, essentially a telephone system with an additional visual component, with time stamping for coordination.

Decision support systems are another aspect of groupware and are designed to facilitate groups in decision-making. They provide tools for brainstorming, critiquing ideas, putting weights and probabilities on events and alternatives, and voting. Such systems enable presumably more rational and evenhanded decisions. Primarily designed to facilitate meetings, they encourage equal participation by, for instance, providing anonymity or enforcing turn-taking.

Multi-player games have always been reasonably common in arcades, but are becoming quite common on the Internet. Many of the earliest electronic arcade games were multi-user, for example, Pong, Space Wars, and car racing games. Games are the prototypical example of multi-user situations "non-cooperative", though even competitive games require players to cooperate in following the rules of the game. Games can be enhanced by other communication media, such as chat or video systems.

Some product examples of groupware include Lotus Notes and Microsoft Exchange, both of which facilitate calendar sharing, e-mail handling, and the replication of files across a distributed system so that all users can view the same information.

What makes the connectors of the present invention particularly attractive for groupware applications is the diversity of groupware offerings and group server architectures, implementations, and platforms. The connector of the invention can act as a front end or gateway to the groupware server.

FIG. 42 illustrates a commercial transaction where real goods are shipped from a seller to a buyer, and various forms of electronic payment and secured electronic payment are used by the buyer to pay the seller, with banks and financial institutions connected through the connectors described herein. Specifically, a merchant or manufacturer 4101 sells a product to a customer 4103 that he has no "history" with. The product is shipped 4605. However, the buyer 4103 does not wish to be parted from his money until the goods are received, inspected, approved, and "accepted", while the seller 4101 does not want to give up control of the goods until he has been paid. This fundamental commercial conflict has led to various paradigms, most involving hard copy "near moneys" or instruments of one form or another. Today, the financial transactions are most frequently those involving electronic fund transfers, and electronic versions of notes, instruments, negotiable instruments, documentary drafts, payment orders, letters of credit, warehouse receipts, delivery orders, bills of lading, including claims on goods, that is, documents of title that purport to transfer title or physical custody of goods to the bearer or to a named person, and security interests in goods. Typically, the customer 4103 executes an instrument in favor of the seller 4101, directing the buyer's bank 4121 to pay buyer's money to the seller 4101 through seller's bank 4125. Normally, this is a simple electronic transaction between buyers and sellers who have dealt with each other before, dealing through banks or financial intermediaries who have dealt with each other before, and who are using the same or compatible software applications. However, in the extraordinary case where these preconditions are not satisfied, the connectors of the invention facilitate the electronic, bank-to-bank, side of the transaction.

While the invention has been described and illustrated with respect to applications having a single level of application program interfaces or converters, it is, of course, to be understood that such application program interfaces or converters may be present at various levels in the processing hierarchy, for example between Web Clients and Web servers, between web servers and application servers, between application servers and database servers, and between application servers or database servers or both and various specialized repositories.

It is also to be understood, that while the invention has been described and illustrated with respect to certain preferred embodiments and exemplification having individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

While the invention has been described with respect to certain preferred embodiments and exemplifications, it is not intended to limit the scope of the invention thereby, but solely by the claims appended hereto.

We claim:

1. A method of processing an application request on an end user application and an application server comprising the steps of:
   a) initiating the application request on the end user application in a first source language with a first application program;
   b) transmitting the application request to the server and converting the application request from the first source language of the first end user application to a first target language running on the application server;
   c) processing said application request on the application server;
   d) transmitting a response to the application request from the application server to the end user application, and converting the response to the application request from the first target language running on the application server to the first language of the first end user application; and c) wherein the end user application and the application server have at least one connector therebetween, and the steps of (i) converting the application request from the first source language of the first end user application as a source language to the first target language running on the application server as a target language, and (ii) converting a response to the application request from the language running on the application server as a second source language to the first language of the first end user application as a second target language, each comprise the steps of:
1) invoking connector metamodels of respective source and target languages;
2) populating the connector metamodels with metamodel data of each of the respective source and target languages, wherein the application domain interface metamodel metadata comprises input parameter signatures, output parameter signatures, and return types; and
3) converting the source language to the target language.

2. The method of claim 1 wherein the end user application is a web browser.

3. The method of claim 2 wherein the end user application is connected to the application server through a web server, and the web server comprises a connector.

4. The method of claim 1 wherein the invocation metamodel metadata is chosen from the group consisting of message control information, security data, transactional semantics, trace and debug information, pre-condition and post-condition resources, and user data.

5. The method of claim 1 wherein the application domain interface metamodel metadata further includes language metamodel metadata.

6. The method of claim 5 wherein the language metamodel metadata includes mappings between source and target languages.

7. The method of claim 6 wherein one of the source or target languages is object oriented, the other of the target or source languages is not object oriented, and the language metamodel metadata maps encapsulated objects into code and data.

8. The method of claim 7 wherein the language metamodel metadata maps object inheritances into references and pointers.

9. The method of claim 6 wherein the source language and the target language are different object oriented languages, and the language metamodel metadata maps encapsulated code and data between the languages.

10. The method of claim 1 wherein the type descriptor metamodel metadata defines physical realizations; storage mapping, data types, data structures, and realization constraints.

11. The method of claim 1 wherein the transaction is a rich transaction comprising a plurality of individual transactions, and further comprising processing the plurality of individual transactions on one end user application and a plurality of application servers.

12. The method of claim 11 comprising passing individual transactions among individual application servers.

13. The method of claim 1 wherein one of the source language or the target language is chosen from the group consisting of C and C++.

14. A transaction processing system comprising a client, a server, and at least one connector therebetween,
a) the client having an end user application, and being controlled and configured to initiate an application request with the server in a first source language with a first application program and to transmit the application request to the server;
b) the connector being configured and controlled to receive the application request from the client, convert the application request from the first source language of the first end user application running on the client to a first target language running on the server;
c) the server being configured and controlled to receive the converted application request from the connector and processing the said application request in the first target language with a second application program residing on the server, and to thereafter transmit a response to the application request through the connector back to the first application program on the client;
d) the connector being configured and controlled to receive a response to the application request from the server, to convert a response to the application request from the first_target language running on the application server to the first source language of the first application program running on the client; and
e) wherein connector between the client and the server is configured and controlled to (i) convert the application request from the first source language of the client application on the client as a source language to the first target language running on the application server as a target language, and (ii) convert the response to the application request from the first target language running on the application server as a source language to the first source language of the client application running on the client as a target language, each by a method comprising the steps of:
1) retrieving connector metamodels of respective source and target languages from a metamodel metadata repository;
2) populating the connector metamodels with metamodel data from the metamodel metadata repository far each of the respective source and target languages, wherein the application domain interface metamodel metadata comprises input parameter signatures, output parameter signatures, and return types and
3) invoking the retrieved, populated connector metamodels and converting the source language to the target language.

15. The system of claim 14 wherein the end user application is a web browser.

16. The system of claim 15 wherein the end user application is connected to the application server through a web server, and the web server comprises a connector.

17. The system of claim 14 wherein the invocation metamodel metadata is chosen from the group consisting of message control information, security data, transactional semantics, trace and debug information, pre-condition and post-condition resources, and user data.

18. The system of claim 17 wherein the type descriptor metamodel metadata defines physical realizations, storage mapping, data types, data structures, and realization constraints.

19. The system of claim 14 wherein the application domain interface metamodel metadata further includes language metamodel metadata.

20. The system of claim 14 wherein the language metamodel metadata includes mappings between source and target languages.

21. The system of claim 20 wherein one of the source or target languages is object oriented, the other of the target or source languages is not object oriented, and the language metamodel metadata maps encapsulated objects into code and data.

22. The system of claim 21 wherein the language metamodel metadata maps object inheritances into references and pointers.

23. The system of claim 21 wherein the source language and the target language are different object oriented languages, and the language metamodel metadata maps encapsulated code and data between the languages.

24. The system of claim 14 wherein said system has a plurality of application servers and is configured and controlled to process rich transactions.

25. The system of claim 14 wherein one of the source or target languages is chosen from the group consisting of C and C++.

26. A transaction processing system configured and controlled to interact with a client application, and comprising a server, and at least one connector between the server and the client application, where the client has an end user application, and is controlled and configured to initiate an application request with the server in a first source language with a first application program and to transmit the application request to the server, wherein:
  a) the connector being configured and controlled to receive an application request from the client, convert the application request from the first source language of the first end user application running on the client to a first target language running on the server;
  b) the server being configured and controlled to receive the convened application request from the connector and process the said application request in the first target language with a second application program residing on the server, and to thereafter transmit a response to the application request through the connector back to the first application program on the client;
  c) the connector being configured and controlled to receive the application request from the server, to convert a response to the application request from the first target language running on the application server to the first source language of the first application program running on the client; and
  d) wherein connector between the client and the server is configured and controlled to (i) convert the application request from the first source language of the client application on the client as a source language to the first target language running on the application server as a target language, and (ii) convert the response to the application request from the first target language running on the application server as a second source language to the first source language of the client application running on the client as a second target language, each by a method comprising the steps of:
    1) retrieving connector metamodel metadata of respective source and target languages from a metamodel metadata repository;
    2) populating the connector metamodels with metamodel data of each of the respective source and target languages from the metamodel metadata repository and invoking the retrieved, populated connector metamodels, wherein the application domain interface metamodel metadata comprises input parameter signatures, output parameter signatures, and return types; and
    3) converting the source language to the target language.

27. The system of claim 26 wherein the end user application is a web browser.

28. The system of claim 27 wherein the end user application is connected to the application server through a web server, and the web server comprises a connector.

29. The system of claim 26 wherein the invocation metamodel metadata is chosen from the group consisting of message control information, security data, transactional semantics, trace and debug information, pre-condition and post-condition resources, and user data.

30. The system of claim 26 wherein the application domain interface metamodel metadata further includes language metamodel metadata.

31. The system of claim 26 wherein the language metamodel metadata includes mappings between source and target languages.

32. The system of claim 31 wherein one of the source or target languages is object oriented, the other of the target or source languages is not object oriented, and the language metamodel metadata maps encapsulated objects into code and data.

33. The method of claim 31 wherein the source language and the target language are different object oriented languages, and the language metamodel metadata maps encapsulated code and data between the languages.

34. The system of claim 33 wherein the language metamodel metadata maps object inheritances into references and pointers.

35. The system of claim 26 wherein the type descriptor metamodel metadata defines physical realizations, storage mapping, data types, data structures, and realization constraints.

36. The system of claim 26 wherein said system has a plurality of application servers and is configured and controlled to process rich transactions.

37. The system of claim 26 wherein one of the source or target languages is chosen from the group consisting ore and C++.

38. A groupware system having a plurality of end user applications, said end user applications each comprising an e-mail client, a content database client, and a content replication client, said system further comprising an e-mail server, a content database server, and a content replication server, said groupware system being configured and controlled to communicate between disparate end user applications, said groupware system comprising at least one connector between a server and an end user application, wherein the end user application is controlled and configured to participate with a server in a first source language with a first application program and the sewer is configured and controlled to participate with the client in a first target language, and wherein:
  a) the connector is configured and controlled to receive an application request from the end user application, convert the application request from the first source language of the first end user application to the first target language running on the server;
  b) the server being configured and controlled to receive the convened application request from the connector and process the said application request in a second language with a second application program residing on the server, and to thereafter transmit the response to the application request through the connector back to the end user application;

c) the connector being configured and controlled to receive the response to the application request from the server, to convert a response to the application request from the language running on the application server as a second source language to the first source language of the end user application as a second target language; and d) wherein connector between the end user application program and the server is configured and controlled to (i) convert the application request from the first source language of the end user application as a source language to the first target language running on the application server as a target language, and (ii) convert the response to the application request from the first target language running on the application server as a second source language to the source language of the end user application as a second target language, each by a method comprising the steps of:

1) retrieving connector metamodel metadata of respective source and target languages from a metamodel metadata repository;

2) populating the connector metamodels with metamodel data of each of the respective source and target languages from the metamodel metadata repository and invoking the retrieved, populated connector metamodels, wherein the application domain interface metamodel metadata comprises input parameter signatures, output parameter signatures, and return types; and 3) converting the source language to the target language.

39. The groupware system of claim 38 wherein the invocation metamodel metadata is chosen from the group consisting of message control information, security data, transactional semantics, trace and debug information, pre-condition and post-condition resources, and user data.

40. The groupware system of claim 38 wherein the application domain interface metamodel metadata further includes language metamodel metadata.

41. The groupware system of claim 40 wherein the language metamodel metadata includes mappings between source and target languages.

42. The groupware system of claim 41 wherein one of the source or target languages is object oriented, the other of the target or source languages is not abject oriented, and the language metamodel metadata maps encapsulated objects into code and data.

43. The groupware system of claim 41 wherein the source language and the target language are different object oriented languages, and the language metamodel metadata maps encapsulated code and data between the languages.

44. The system of claim 41 wherein the language metamodel metadata maps object inheritances into references and pointers.

45. The system of claim 38 wherein the type descriptor metamodel metadata defines physical realizations, storage mapping, data types, data structures, and realization constraints.

46. The system of claim 38 wherein one of the source or target languages is chosen from the group consisting of C and C++.

47. A program product comprising a storage medium having invocation metamodel metadata, application domain interface metamodel metadata, and language metamodel metadata, computer instructions for building a metamodel metadata repository of source and target language metamodel metadata further comprising computer instructions to build a connector for carrying out the steps of:

1) retrieving connector metamodel metadata of respective source and target languages from the metamodel metadata repository;

2) populating the connector metamodels with metamodel data of each of the respective source and target languages from the metamodel metadata repository and invoking the retrieved, populated connector metamodels, wherein the application domain interface metamodel metadata comprises input parameter signatures, output parameter signatures, and return types and 3) converting the source language to the target language.

48. The program product of claim 47 further comprising computer instructions for building connector stubs from said metamodel metadata.

49. The program product of claim 47 wherein the invocation metamodel metadata is chosen from the group consisting of message control information, security data, transactional semantics, trace and debug information, pre-condition and post-condition resources, and user data.

50. The program product of claim 47 wherein the application domain interface metamodel metadata further includes language metamodel metadata.

51. The program product of claim 50 wherein the language metamodel metadata includes mappings between source and target languages.

52. The program product of claim 51 wherein one of the source or target languages is object oriented, the other of the target or source languages is not object oriented, and the language metamodel metadata maps encapsulated objects into code and data.

53. The program product of claim 51 wherein the source language and the target language are different object oriented languages, and the language metamodel metadata maps encapsulated code and data between the languages.

54. The program product of claim 53 wherein the language metamodel metadata maps object inheritances into references and pointers.

55. The program product of claim 47 wherein the type descriptor metamodel metadata defines physical realizations, storage mapping, data types, data structures, and realization constraints.

56. The program product of claim 47 wherein one of the source and target languages is chosen from the group consisting of C and C++.

* * * * *